US011851099B2

United States Patent
Nieuwenhuizen et al.

(10) Patent No.: US 11,851,099 B2
(45) Date of Patent: Dec. 26, 2023

(54) FOLDABLE STROLLER, FOLDABLE BASSINET, FOLDABLE SEAT, STROLLER AND STROLLER AND LUGGAGE SYSTEM

(71) Applicant: Royalty Bugaboo GmbH, Zug (CH)

(72) Inventors: Marco Willem Hendricus Nieuwenhuizen, Zug (CH); Mattijs Hogeland, Zug (CH); Daan Jans Vos, Zug (CH)

(*) Notice: Subject to any disclaimer, the term of this patent is extended or adjusted under 35 U.S.C. 154(b) by 0 days.

(21) Appl. No.: 17/554,270

(22) Filed: Dec. 17, 2021

(65) Prior Publication Data

US 2022/0194456 A1 Jun. 23, 2022

(30) Foreign Application Priority Data

Dec. 18, 2020 (NL) .................................... 2027160

(51) Int. Cl.
*B62B 7/06* (2006.01)
*B62B 9/12* (2006.01)
(Continued)

(52) U.S. Cl.
CPC .............. *B62B 7/066* (2013.01); *A47D 9/005* (2013.01); *A47D 9/016* (2022.08); *B62B 7/06* (2013.01);
(Continued)

(58) Field of Classification Search
CPC .... B62B 7/06; B62B 7/10; B62B 9/10; B62B 9/12; B62B 2205/24; B62B 9/102; B62B 9/104; B62B 9/26; B62B 9/20; B62B 2205/003; B62B 2205/04; B62B 2205/12; B62B 2205/22; B62B 2205/26; B62B 2206/003; B62B 2301/04; B62B 7/08;
(Continued)

(56) References Cited

U.S. PATENT DOCUMENTS 2,174,268 A 9/1939 Kroll et al.
2,488,450 A 11/1949 Underwood
(Continued)

FOREIGN PATENT DOCUMENTS

CN 101306695 B 11/2010
CN 201822387 U 5/2011
(Continued)

OTHER PUBLICATIONS

Translated CN-110710828-A (Year: 2023).*
(Continued)

*Primary Examiner* — James A Shriver, II
*Assistant Examiner* — Ian Bryce Shelton
(74) *Attorney, Agent, or Firm* — Kagan Binder, PLLC

(57) ABSTRACT

The present application discloses a foldable bassinet. The foldable bassinet includes a foldable frame which may be moved between an unfolded condition and a folded condition and a support surface on which a passenger may recline or sit when the foldable frame is in its unfolded condition. The foldable frame can include a base frame on which the support surface is provided, an upper frame which is spaced from the base frame when the foldable frame is in its unfolded condition, and at least one connecting arm which is pivotally connected relative to the base frame and to the upper frame to permit the foldable frame to be moved to its folded condition.

4 Claims, 43 Drawing Sheets

(51) Int. Cl.
   *B62B 7/10* (2006.01)
   *B62B 9/10* (2006.01)
   *A47D 9/00* (2006.01)
(52) U.S. Cl.
   CPC ............... *B62B 7/10* (2013.01); *B62B 9/10* (2013.01); *B62B 9/12* (2013.01); *B62B 2205/24* (2013.01)
(58) Field of Classification Search
   CPC .......... B62B 7/142; B62B 7/066; B62B 9/00; A47D 9/005; A47D 1/02; A47D 13/02
   See application file for complete search history.

(56) References Cited

U.S. PATENT DOCUMENTS

| | | | |
|---|---|---|---|
| 10,479,389 B2 | 11/2019 | Zhong | |
| 11,292,500 B2 * | 4/2022 | Fan | B62B 9/12 |
| 11,369,210 B2 * | 6/2022 | Smith | B62B 9/102 |
| 2016/0101802 A1 * | 4/2016 | Zhong | A47D 11/005 |
| | | | 280/47.4 |
| 2019/0283790 A1 | 9/2019 | Cheng et al. | |
| 2019/0322304 A1 * | 10/2019 | Zhong | B62B 7/142 |
| 2020/0239058 A1 | 7/2020 | Zhang | |
| 2021/0347403 A1 * | 11/2021 | Yi | A47D 13/02 |
| 2022/0161838 A1 * | 5/2022 | Li | B62B 9/12 |
| 2022/0312986 A1 * | 10/2022 | Holper | A47D 9/005 |

FOREIGN PATENT DOCUMENTS

| | | | | |
|---|---|---|---|---|
| CN | 201822387 U | * | 5/2011 | |
| CN | 201905579 U | | 7/2011 | |
| CN | 202225900 U | | 5/2012 | |
| CN | 202518320 U | | 11/2012 | |
| CN | 202518320 U | * | 11/2012 | |
| CN | 202686428 U | | 1/2013 | |
| CN | 203681622 U | | 7/2014 | |
| CN | 203698382 U | | 7/2014 | |
| CN | 104512448 B | | 4/2015 | |
| CN | 104797174 B | | 7/2015 | |
| CN | 204432728 U | | 7/2015 | |
| CN | 204599959 U | * | 9/2015 | |
| CN | 204599959 U | | 9/2015 | |
| CN | 102342691 B | | 10/2015 | |
| CN | 205327141 U | | 6/2016 | |
| CN | 205801207 U | | 12/2016 | |
| CN | 106394644 A | * | 2/2017 | |
| CN | 106428182 B | | 2/2017 | |
| CN | 206374785 U | | 8/2017 | |
| CN | 206384007 U | | 8/2017 | |
| CN | 206734378 U | | 12/2017 | |
| CN | 108433443 A | | 8/2018 | |
| CN | 108433443 A | * | 8/2018 | A47D 13/02 |
| CN | 109131520 A | | 1/2019 | |
| CN | 208602553 U | | 3/2019 | |
| CN | 209202562 U | * | 8/2019 | |
| CN | 209202562 U | | 8/2019 | |
| CN | 110386178 A | | 10/2019 | |
| CN | 110626414 A | | 12/2019 | |
| CN | 110710828 A | * | 1/2020 | |
| CN | 110710828 A | | 1/2020 | |
| CN | 111086549 A | | 5/2020 | |
| CN | 210680885 U | | 6/2020 | |
| CN | 210882282 U | | 6/2020 | |
| CN | 210961210 U | * | 7/2020 | |
| CN | 210961210 U | | 7/2020 | |
| CN | 211154782 U | | 8/2020 | |
| CN | 211324039 U | | 8/2020 | |
| CN | 211324040 U | | 8/2020 | |
| CN | 211731519 U | | 10/2020 | |
| DE | 1580196 A1 | * | 3/1971 | |
| DE | 1580196 A1 | | 3/1971 | |
| DE | 8418222 U1 | | 10/1984 | |
| DE | 202005019191 U1 | * | 3/2006 | B62B 7/123 |
| DE | 102016200811 A1 | * | 7/2016 | B60N 2/2854 |
| DE | 202019106759 U1 | | 1/2020 | |
| EP | 1493361 A1 | * | 1/2005 | A47D 9/005 |
| EP | 1640240 A2 | * | 3/2006 | B62B 7/123 |
| EP | 1640240 A2 | | 3/2006 | |
| EP | 1762461 A2 | * | 3/2007 | B62B 7/142 |
| EP | 1762461 B1 | | 3/2007 | |
| EP | 2096016 A2 | | 9/2009 | |
| EP | 2572957 A2 | | 3/2013 | |
| EP | 2401942 B1 | | 7/2015 | |
| EP | 2965969 A1 | | 1/2016 | |
| EP | 3159239 A1 | | 4/2017 | |
| EP | 3571108 B1 | * | 11/2020 | B62B 7/008 |
| EP | 3828056 A1 | | 6/2021 | |
| FR | 2181349 A5 | | 11/1973 | |
| GB | 2489488 A | | 10/2012 | |
| GB | 2496225 A | | 5/2013 | |
| KR | 20130051302 A | * | 5/2013 | |
| NL | 3285 C | | 6/1919 | |
| NL | 2023257 B1 | | 12/2020 | |
| NL | 2023260 B1 | | 12/2020 | |
| WO | 2014071987 A1 | | 5/2014 | |
| WO | WO-2014071987 A1 | * | 5/2014 | A47D 13/02 |
| WO | 2018051202 A1 | | 3/2018 | |
| WO | 2019126570 A1 | | 6/2019 | |

OTHER PUBLICATIONS

Translated CN-108433443-A (Year: 2023).*
Partial EP International Search Report for co-pending EP21215303.5, 14 pages, dated May 19, 2022.
EP Search Invitation for co-pending EP21215303.5, 4 pages, dated May 11, 2022.
European Search Report and Written Opinion for co-pending NL2027160, 15 pages, dated Oct. 28, 2021.
"Cybex for all tomorrow's people", downloaded from https://cybex-online.com/en-gb/platinum-strollers/mios, on Nov. 12, 2020, 29 pages.
"Joolz" main website for Joolz Aer, (video links within web page), downloaded from https://www.joolz.com/nl/en/campaign-page.html, on Dec. 15, 2021, 13 pages.
"Joolz Aer easy does it", (video links within web page), downloaded from https://www.joolz.com/nl/en/sets/joolz-aer-set.html, on Dec. 15, 2021, 7 pages.
"Joolz Aer Buggy Lightweight & Compact Folding Buggy", downloaded from https://www.joolz.com/uk/en/buggy/joolz-aer/309100-M.html, on Dec. 15, 2021, 15 pages.
"Instruction manual, Joolz Aer, designed I the Netherlands", downloaded from https://www.joolz.com/uk/en/manuals.html on Dec. 15, 2021, 35 pages.
"Joolz Official Webshop" archived website downloaded from https://web.archive.org/web/20200920044656/https:/www.joolz.com/nl/en/home on Dec. 15, 2021, dated Sep. 20, 2020, 2 pages.
"Joolz" archived website downloaded from https://link.edgepilot.com/s/550bbc4c/liU5k88DKEuYCOVxd3hblA?u=http://web.archive.org/web/20200927031120/https://www.joolz.com/nl/en/buggy/joolz-aer/309000-M.html, on Dec. 15, 2021, dated Sep. 27, 2020, 3 pages.
Netherlands Search Report for co-pending NL2032196, 9 pages, dated Feb. 6, 2023.
Extended European Search Report for co-pending EP21215288.8, 10 pages, dated Mar. 31, 2023.
1 Chinese Office Action for co-pending CN202111556794.6, 11 pages, dated Aug. 30, 2023.

* cited by examiner

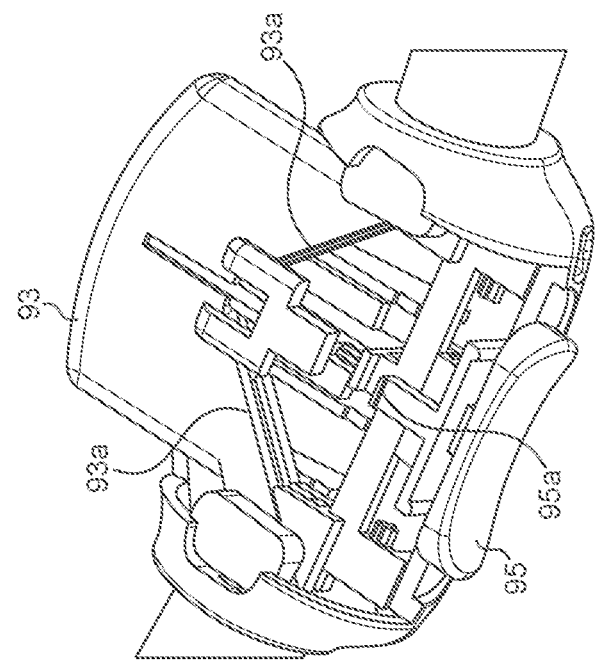
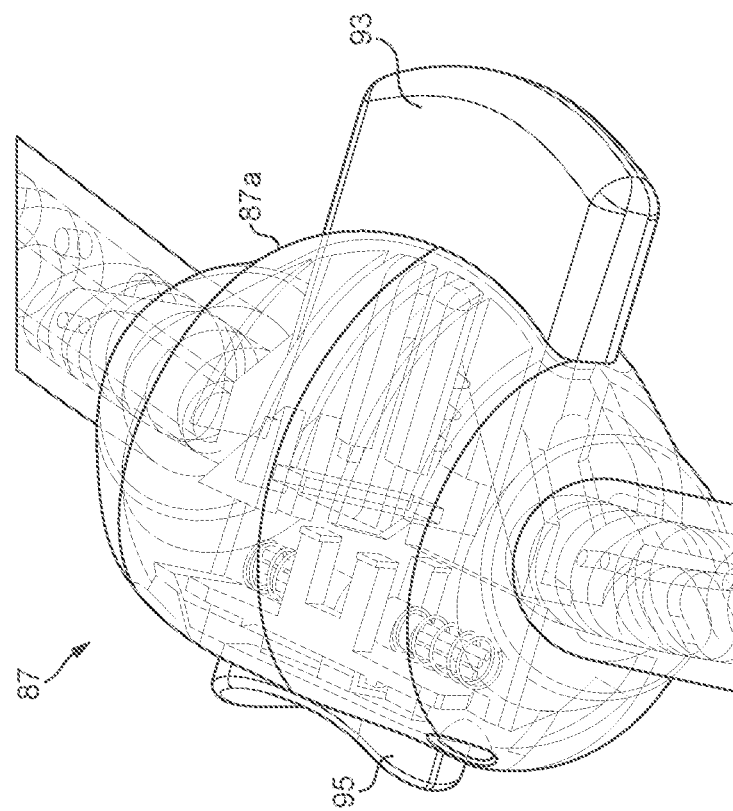
FIG. 7B
FIG. 7A

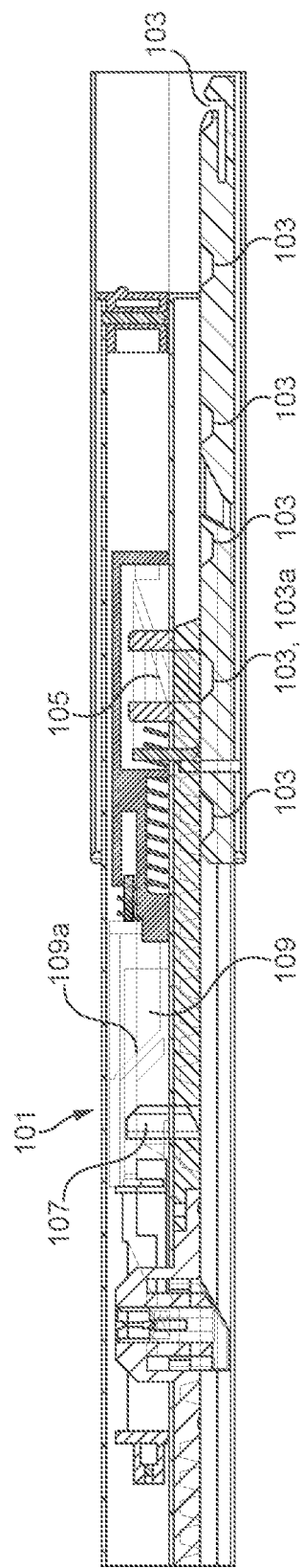

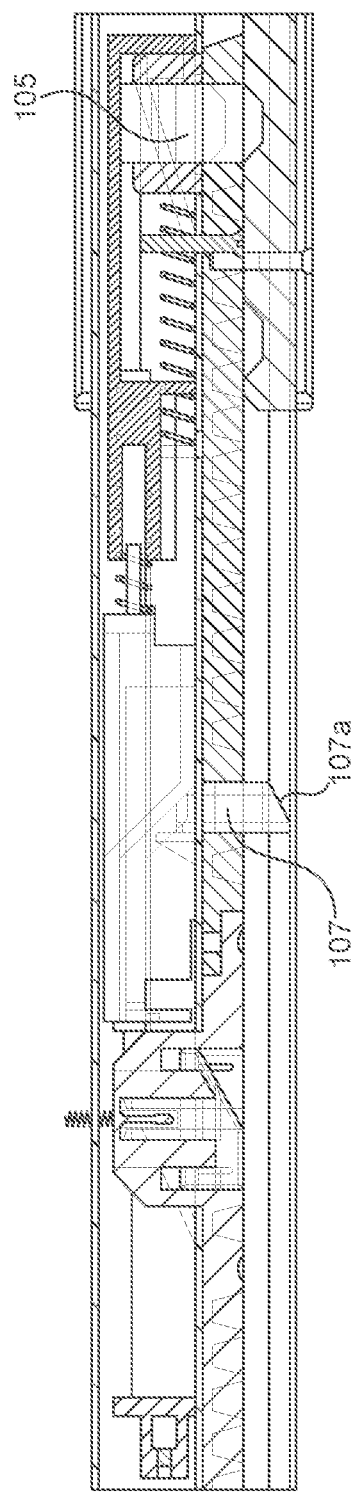

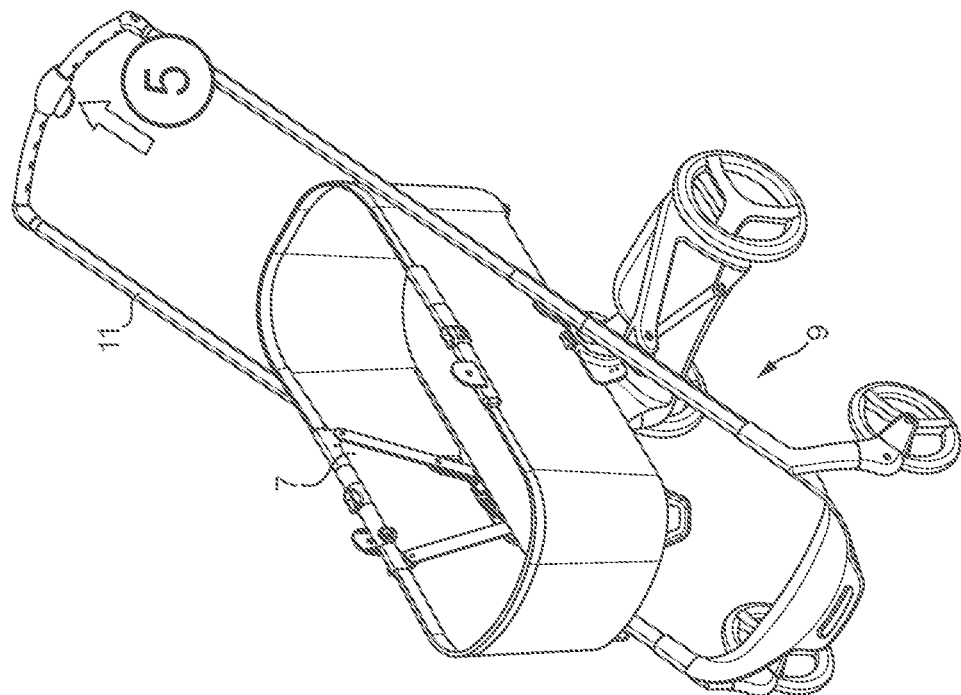
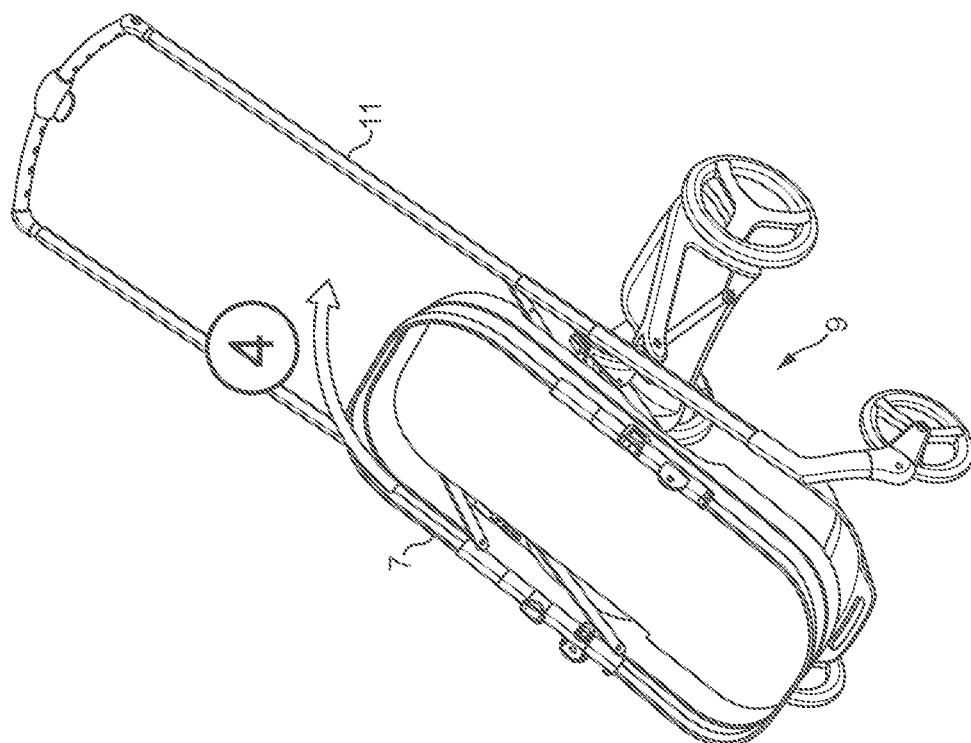
FIG. 16E
FIG. 16D

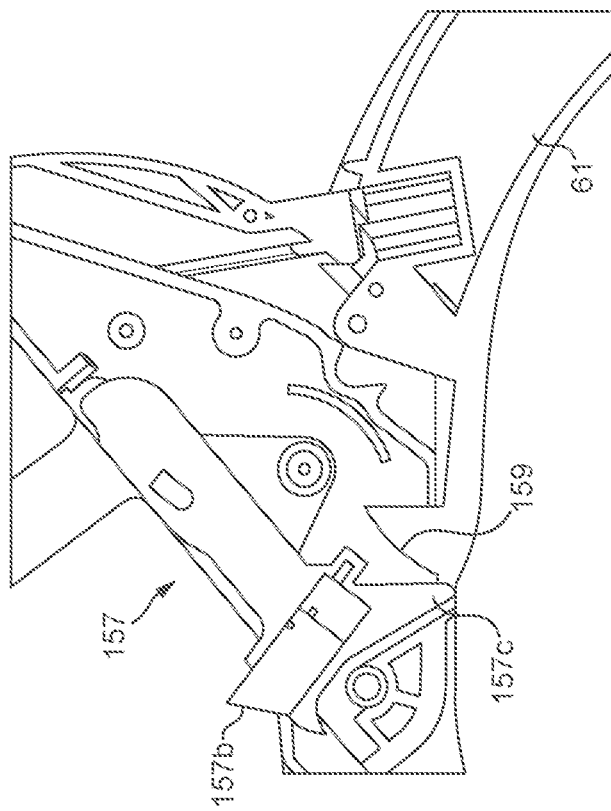
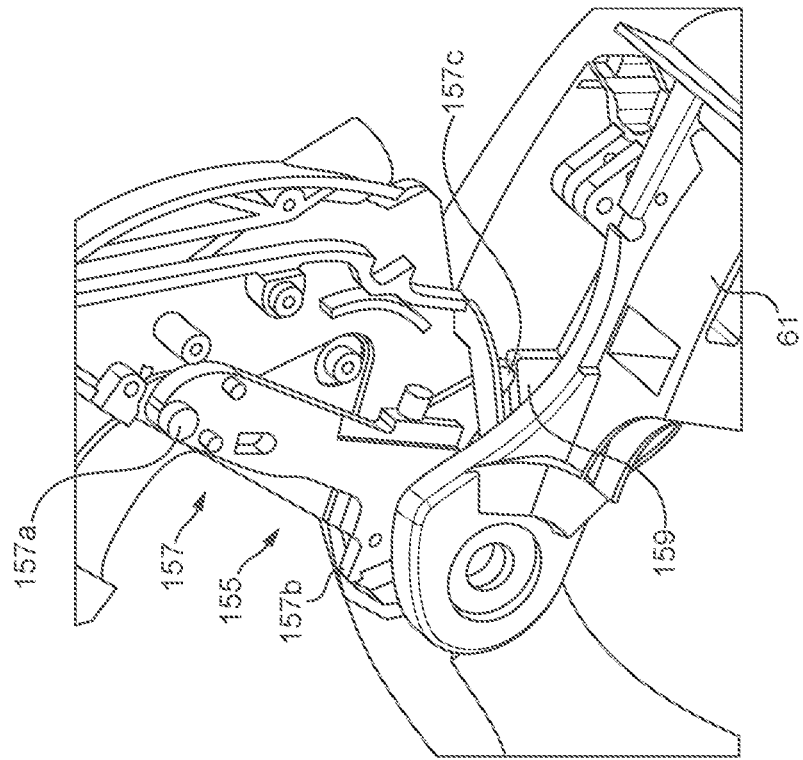

FOLDABLE STROLLER, FOLDABLE BASSINET, FOLDABLE SEAT, STROLLER AND STROLLER AND LUGGAGE SYSTEM

PRIORITY CLAIM

This application claims priority to Netherlands Application No. 2027160, filed Dec. 18, 2020 wherein the contents of said application are incorporated herein by reference in their entireties.

FIELD OF THE INVENTION

The present invention relates to a foldable stroller, foldable bassinet, foldable seat, stroller and stroller and luggage system.

BACKGROUND

Strollers provide a convenient means for a parent or other carer to transport a child (whether a new born, toddler or small child). Strollers are however typically relatively large and bulky. Foldable stroller designs have therefore been put forward, to permit the stroller to be folded and therefore occupy less space and generally be more manageable by a user e.g. for storage or transport of the folded stroller.

For example, foldable strollers are known in which a foldable bassinet or seat is mounted on a foldable wheeled chassis frame. When both bassinet and wheeled chassis frame are unfolded, a user may safely transport an infant using the stroller. After use the stroller may be folded e.g. for storage or transport.

In some designs, it is first necessary to remove the bassinet or seat from the chassis, before the bassinet/seat and chassis frame are each individually folded. This is however inconvenient for a user. Firstly, once folded, the user is required to transport and safely stow two separate items i.e. the folded bassinet/seat on the one hand, and the folded chassis frame on the other. Secondly, a number of operations are required to move the stroller from its unfolded state to its folded state i.e. removal of bassinet/seat, folding of bassinet/seat and folding of chassis frame. These difficulties may also be further amplified in the event of a user also needing to monitor and ensure the safety of the infant who has just vacated the stroller, in addition to folding the stroller.

In another design, a folding bassinet is provided on a folding chassis, but it is not necessary to remove the bassinet to move to the folded state of the stroller. Rather, the user first folds the bassinet, still mounted on the frame, and then folds the frame, to lead to a single folded bassinet/frame entity. Hence, the first problem above (i.e. transport and stowage of two separate items) is avoided. However, at least part of the second problem remains—in moving the stroller from its unfolded state to its folded state, the user is still required to perform two separate operations i.e. folding the bassinet and then folding the frame.

STATEMENTS OF INVENTION

According to a first aspect of the present invention, there is provided a foldable stroller, comprising:
a foldable chassis movable between an unfolded condition and a folded condition;
a foldable bassinet or seat supported by the foldable chassis and movable between an unfolded condition and a folded condition, and which has a support surface on which a passenger may recline or sit when the foldable bassinet or seat is in its unfolded condition; and
a first locking mechanism which when engaged prevents the foldable bassinet or seat from moving from its unfolded condition to its folded condition and which when released permits the foldable bassinet or seat to move from its unfolded condition to its folded condition,
wherein movement of the foldable chassis from its unfolded condition towards its folded condition releases the first locking mechanism.

Preferably, the stroller further comprises a second locking mechanism which when engaged prevents the foldable chassis from moving from its unfolded condition to its folded condition and which when released permits the foldable chassis to move from its unfolded condition to its folded condition.

Preferably, the foldable chassis comprises a first chassis subframe and a second chassis subframe which are pivotally mounted relative to each other such that tilting the foldable stroller in a predetermined tilting direction with the second locking mechanism released causes the first chassis subframe to move under gravity relative to the second chassis subframe so as to move the foldable chassis to its folded condition and release the first locking mechanism.

Preferably, the foldable bassinet or seat is configured such that tilting the stroller in the predetermined tilting direction also causes the foldable bassinet or seat to move under gravity from its unfolded condition to its folded condition when the first locking mechanism is released.

Preferably, the stroller further comprises a handle attached to the foldable chassis, wherein the handle is movable between an extended condition and a compact condition, and wherein moving the handle from its extended condition towards its compact condition releases the second locking mechanism.

Preferably, the stroller further comprises a third locking mechanism which when engaged prevents the handle from moving from its extended condition towards its compact condition and which when released permits the handle to move from its extended condition towards its compact condition, and wherein a control mechanism is provided on the handle for actuation by a user to release the third locking mechanism.

Preferably, the handle is provided with a movable element which is configured to be moved to protrude from a part of the handle by user actuation of the control mechanism to contact and release the second locking mechanism as the handle is moved from its extended condition towards its compact condition.

Preferably, the foldable stroller further comprises a fourth locking mechanism which when engaged prevents the handle from moving from its compact condition to its extended condition and which when released permits the handle to move from its compact condition to its extended condition, and wherein the control mechanism provided on the handle is configured to release the fourth locking mechanism.

Preferably, the foldable stroller further comprises a fifth locking mechanism which is movable between a first position which lies at an intermediate point on a path taken by a part of the handle in moving to its compact condition, such that movement to the compact condition is prevented, and a second position not lying on the path of the handle such that movement of the handle to its compact condition is enabled, and wherein a part of the fifth locking mechanism is in contact with a surface of the foldable chassis, such that movement of the foldable chassis from its unfolded condition towards its folded condition moves the fourth locking mechanism to its second position.

Preferably, the foldable stroller further comprises an actuator which is configured to move with the folding movement of the foldable chassis to contact and release the first locking mechanism.

Preferably, the actuator comprises a lever having a first end in contact with a surface of the foldable chassis and a second end for contacting the locking mechanism.

Preferably, the chassis further comprises a chassis stand which is movable between a retracted condition and an extended condition, and wherein movement of the foldable chassis from its unfolded condition towards its folded condition results in the chassis stand moving to its extended condition, to assist in supporting the stroller during its folding and after it has been folded.

Preferably, the foldable stroller further comprises a biasing element to bias the chassis stand into its extended condition, wherein the stand is connected to a part of the foldable chassis which moves when the foldable chassis is being folded, wherein the connection holds the stand in its retracted condition, against the bias of the biasing element, when the foldable chassis is in its unfolded condition, and wherein the stand is released to move under the bias of the biasing element when the foldable chassis is moved towards its unfolded condition.

Preferably, the foldable stroller further comprises a sixth locking mechanism which when engaged prevents the foldable chassis from moving from its folded condition to its unfolded condition and which when released permits the foldable chassis to move from its folded condition to its unfolded condition.

Preferably, the foldable bassinet or seat is removably mounted on the foldable chassis.

Preferably, the foldable bassinet or seat comprises a foldable frame which may be moved between an unfolded condition corresponding to the unfolded condition of the foldable bassinet or seat and a folded condition corresponding to the folded condition of the foldable bassinet or seat, wherein the support surface is provided on the foldable frame, and wherein the locking mechanism, when engaged, prevents the foldable frame from moving from its unfolded condition to its folded condition and, when released, permits the foldable frame of the bassinet or seat to move from its unfolded condition to its folded condition.

According to a second aspect of the present invention, there is provided a foldable bassinet comprising a foldable frame which may be moved between an unfolded condition and a folded condition and a support surface on which a passenger may recline or sit when the foldable frame is in its unfolded condition, wherein the foldable frame comprises a base frame on which the support surface is provided, an upper frame which is spaced from the base frame when the foldable frame is in its unfolded condition, and at least one connecting arm which is pivotally connected relative to the base frame and to the upper frame to permit the foldable frame to be moved to its folded condition, and wherein the pivotal connection of the connecting arm relative to the base frame and/or the upper frame is a movable connection which is itself movable relative to the foldable frame.

Preferably, the foldable bassinet is elongate to define a longitudinal axis, and wherein the movable connection is movable relative to the foldable frame in a direction which is parallel to the longitudinal axis.

Preferably, the movable connection is provided on a joint for mounting the foldable bassinet on to a stroller chassis.

Preferably, the joint is slidably mounted to the foldable frame.

Preferably, the foldable bassinet further comprises a locking mechanism which when engaged prevents the connecting arm from pivoting relative to the base frame and upper frame and prevents the movable connection from moving relative to the foldable frame and which when released enables the connecting arm to pivot relative to the base frame and upper frame and permits the movable connection to move relative to the foldable frame.

Preferably, the locking mechanism has a button which when pressed releases the locking mechanism.

According to a third aspect of the present invention, there is provided a foldable seat comprising a seat base and seat back joined by a joint provided on a lateral side of the seat base, wherein the joint comprises a locking mechanism which when engaged fixes the seat back in position relative to the joint and which when released permits the seat back to move relative to the joint, wherein the locking mechanism is released by pressing a button located on a lateral end face of the joint.

Preferably, the seat base is planar and the lateral end face of the joint lies in a plane which is perpendicular to the plane of the seat base.

Preferably, the joint is configured to mount the foldable seat on a stroller.

Preferably, the button is located centrally on the lateral end face of the joint.

According to a fourth aspect of the present invention, there is provided a stroller, comprising:
  a bassinet or seat for a passenger, and
  a wheeled chassis supporting the bassinet or seat and comprising a foldable chassis movable between an unfolded condition and a folded condition,
    wherein the foldable chassis comprises a first frame portion and a second frame portion which are pivotally mounted relative to each other to enable the first frame portion to be moved relatively towards the second frame portion to place the foldable chassis into its folded condition,
    wherein the first frame portion and the second frame portion are each provided with at least one wheel for supporting the first frame portion and the second frame portion, respectively, when the foldable chassis is in its unfolded condition,
    wherein the hub of the at least one wheel of the second frame portion is rotatably attached to a mounting portion, and the mounting portion is attached to the second frame portion by a swivel mount which allows the mounting portion to rotate relative to the second frame portion,
    wherein the mounting portion is configured such that the hub of the at least one wheel of the second frame portion is horizontally offset from the swivel mount when the second frame portion is supported by its at least one wheel with the foldable chassis in its unfolded condition,
    and wherein the second frame portion is further provided with a stand for supporting the second frame portion, in place of the at least one wheel of the second frame portion, when the foldable chassis is being moved from its unfolded condition to its folded condition.

Preferably, the mounting portion comprises an elongate stem defining a longitudinal stem axis which is angled at non-zero angle relative to vertical when the second frame portion is supported by its at least one wheel with the foldable chassis in its unfolded condition.

Preferably, the angle is any non-zero, acute angle less than 90 degrees, preferably any acute angle greater than or equal to 10 degrees and less than or equal to 60 degrees, more preferably any acute angle greater than or equal to 20 degrees and less than or equal to 50 degrees, further more preferably any acute angle greater than or equal to 30 degrees and less than or equal to 40 degrees, and most preferably an angle of 35 degrees.

Preferably, the stand is movable between a retracted condition and an extended condition and has a connection to the first frame portion such that the relative movement of the first frame portion towards the second frame portion results in the stand moving to its extended condition.

Preferably, the stroller further comprises a biasing element to bias the stand into its extended condition, and wherein the connection between the stand and the first frame portion holds the stand in its retracted condition, against the bias of the biasing element, when the foldable chassis is in its unfolded condition, and releases the stand to move under the bias of the biasing element when the foldable chassis is moved towards its folded condition.

According to a fifth aspect of the present invention, there is provided a stroller and luggage system, comprising:
a stroller; and
an article of luggage,
wherein the stroller comprises a wheeled frame supporting a seat or bassinet, and a luggage storage area located underneath the seat or bassinet,
wherein the article of luggage may be placed on the luggage storage area, and
wherein the stroller is provided with at least one first releasable attachment element and the article of luggage is provided with at least one second releasable attachment element, the first and second releasable attachment elements co-operating with each other to form a releasable attachment between the article of luggage and the stroller when the article of luggage is placed on the luggage storage area.

Preferably, the releasable attachment between the at least one first and at least one second releasable attachment elements comprises a magnetic attachment.

Preferably, the stroller further comprises a handle provided at a rear end of the stroller for a user to move the stroller, and wherein the releasable attachment between the article of luggage and the stroller mounts the article of luggage at one end of the luggage storage area, being an end proximal the rear end of the stroller.

Preferably, the wheeled frame of the stroller comprises a front frame portion and a rear frame portion which are hingedly connected to enable the wheeled frame to fold, and wherein the releasable attachment between the article of luggage and the stroller mounts the article of luggage to the rear frame portion of the stroller such that the article of luggage is still accessible to a user when the stroller is folded.

Preferably, the article of luggage, when placed on the luggage storage area, provides a retaining surface which acts to retain other articles on the luggage storage area.

Preferably, the wheeled frame comprises two laterally-spaced legs, and the article of luggage bridges the gap between the two laterally-spaced legs when the article of luggage is placed on the luggage storage area.

Preferably, the article of luggage is expandable to increase the load carrying capacity of a compartment of the article of luggage, and to increase the size of an opening leading to the compartment.

Preferably, the article of luggage comprises a pair of panels joined by at least one further panel so that the pair of panels are spaced apart from each other and wherein a first of the pair of panels is movable relative to the second such that the first of the pair of panels may be moved to lie flat on a surface of the luggage storage area while the second of the pair of panels protrudes from the surface of the luggage storage area.

According to a sixth aspect of the present invention, there is provided the foldable chassis of the foldable stroller of the first aspect.

According to a seventh aspect of the present invention, there is provided the foldable bassinet or seat of the foldable stroller of the first aspect.

According to an eighth aspect of the present invention, there is provided the stroller of the stroller and luggage system of the fifth aspect.

According to a ninth aspect of the present invention, there is provided the article of luggage of the stroller and luggage system of the fifth aspect.

According to a tenth aspect of the present invention, there is provided a foldable stroller, comprising:
a foldable chassis movable between an unfolded condition and a folded condition;
a foldable bassinet or seat supported by the foldable chassis and movable between an unfolded condition and a folded condition, and which has a support surface on which a passenger may recline or sit when the foldable bassinet or seat is in its unfolded condition; and
a locking mechanism which when engaged prevents the foldable chassis from moving from its unfolded condition to its folded condition and which when released permits the foldable chassis to move from its unfolded condition to its folded condition,
wherein movement of the bassinet or seat from its unfolded condition towards its folded condition releases the locking mechanism.

According to an eleventh aspect of the present invention, there is provided a foldable stroller comprising three main components, the three main components being:
(i) a wheeled frame;
(ii) a bassinet or seat supported by the wheeled frame; and
(iii) a handle for moving the wheeled frame,
wherein each of the three main components is movable between a first condition for when the stroller is being used to transport a passenger and a second compact condition,
wherein each of the three main components has a respective locking mechanism which prevents the main component from moving from its first condition to its second condition, and
wherein movement of a first of the three main components from its first condition towards its second condition, with its respective locking mechanism released, releases the locking mechanism of a second of the main components to enable it to move from its first condition towards its second condition, and wherein movement of the second of the three main components from its first condition to its second condition releases the locking mechanism of the third of the main components to enable it to move from its first condition to its second condition.

According to a twelfth aspect of the present invention, there is provided a foldable stroller comprising three main components, the three main components being:
  (i) a wheeled frame;
  (ii) a bassinet or seat supported by the wheeled frame; and
  (iii) a handle for moving the wheeled frame,
    wherein each of the three main components is movable between a first condition for when the stroller is being used to transport a passenger and a second compact condition,
    wherein each of the three main components has a respective locking mechanism which prevents the main component from moving from its first condition to its second condition, and
    wherein movement of a first of the three main components from its first condition towards its second condition, with its respective locking mechanism released, releases the locking mechanisms of the second and third of the main components to enable them to move from their first conditions to their second conditions.

DESCRIPTION OF THE DRAWINGS

In order that the present invention may be more readily understood, embodiments thereof will now be described, by way of example only, with reference to the accompanying drawings, of which:

FIGS. 7A to 7E show a button housing of the stroller of FIG. 1;

FIGS. 8A to 8C show a locking mechanism of the stroller of FIG. 1;

FIGS. 16A to 16E show the process for unfolding the stroller with bassinet configuration;

FIGS. 20A to 20D show a further part of the joint of the stroller chassis; and

DESCRIPTION OF EXEMPLARY EMBODIMENTS

Figure 1C:
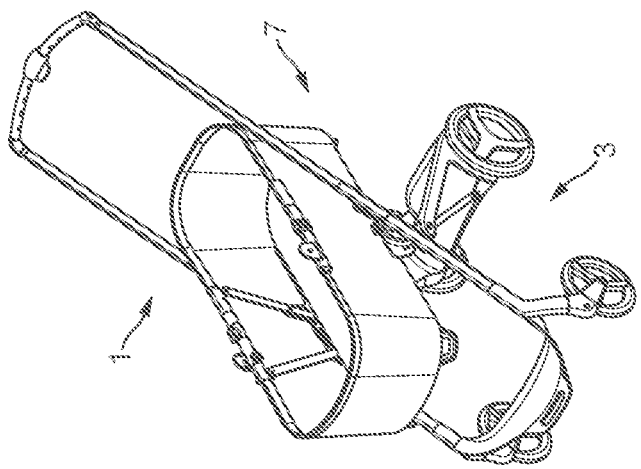
FIGS. 1A to 1C show an embodiment of a stroller aspect of the present invention in various configurations.
Figure 1B:
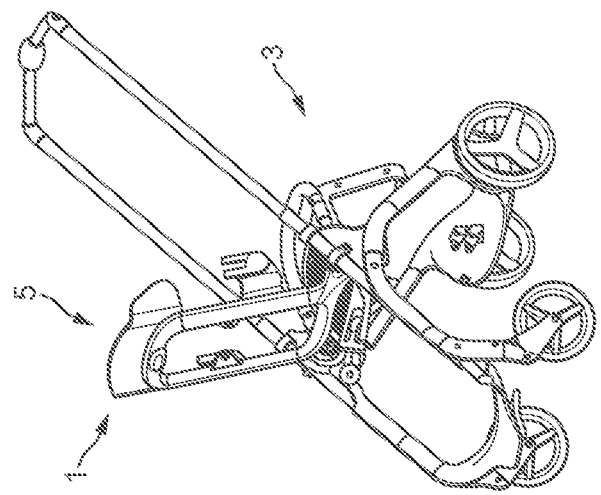
Figure 1A:
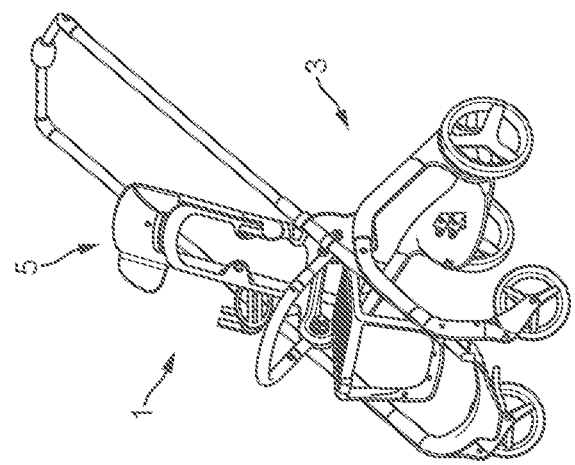

The various parts of FIG. 1 show an embodiment of a foldable stroller 1 according to an aspect of the present invention. In the present embodiment, the foldable stroller 1 comprises a wheeled chassis 3 and an interchangeable seat 5 and bassinet 7 which permit the stroller 1 to be placed into three main configurations, namely: i) stroller with seat facing world (seat facing forwardly/outwardly) configuration—see FIG. 1A, ii) stroller with seat facing parent/caregiver (seat facing rearwardly/inwardly) configuration—see FIG. 1B and iii) stroller with bassinet configuration—see FIG. 1C. Although the bassinet 7 may also be placed into both facing world and facing parent/caregiver configurations, it is envisaged that the facing parent/caregiver configuration would almost invariably be employed by a user.

In each of these configurations, the stroller 1 may be folded in a simple and convenient fashion, without the need to remove the seat/bassinet from the stroller 1, and with the folding processes of the wheeled chassis 3 and bassinet/seat 5, 7 linked into a single folding process, thus increasing user convenience as the user is not required to perform separate operations to a) fold the bassinet/seat 5, 7 and b) fold the chassis frame. As will be appreciated, this overcomes the drawbacks with the prior art noted above.

The configuration of the present embodiment increases user convenience still further, as a user may employ a simple one-handed user process to fold the stroller 1 of the present embodiment, leaving the other hand of the user free e.g. to hold the hand of an infant previously the passenger of the stroller 1.

It is noted for completeness that the three configurations shown in the various parts of FIG. 1 are not necessarily exhaustive, and the stroller 1 may potentially also be used in other ways. For example, in an embodiment, a car seat may be mounted to the wheeled chassis 3 via suitable mounting adaptors which e.g. interface with ISOFIX-type connectors on the car seat to permit it to be mounted to the wheeled chassis 3.

In the following, the stroller 1 of the present embodiment will first be described with reference to the stroller and bassinet configuration of FIG. 1C, which is shown in greater detail in FIG. 2, before going on to discuss the seat facing world/facing parent configurations.

Figure 2A:
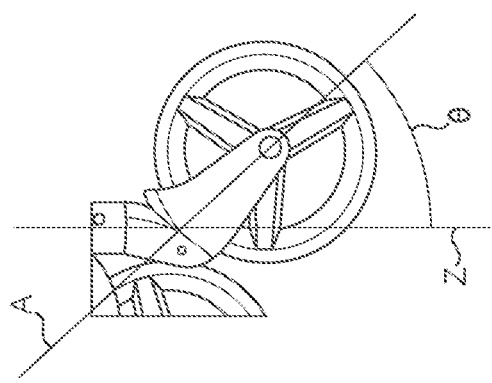
FIG. 2 shows the embodiment of FIG. 1 in a stroller with bassinet configuration and FIGS. 2A and 2B show a wheel of the stroller of FIG. 2 in greater detail.
Figure 2B:
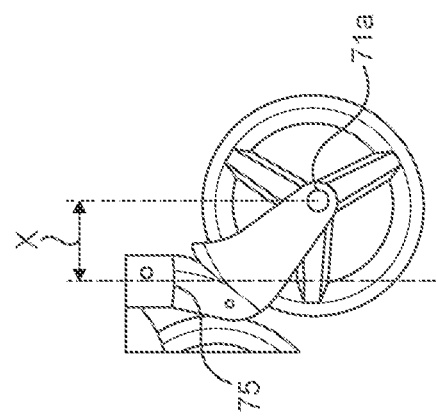
Figure 2:
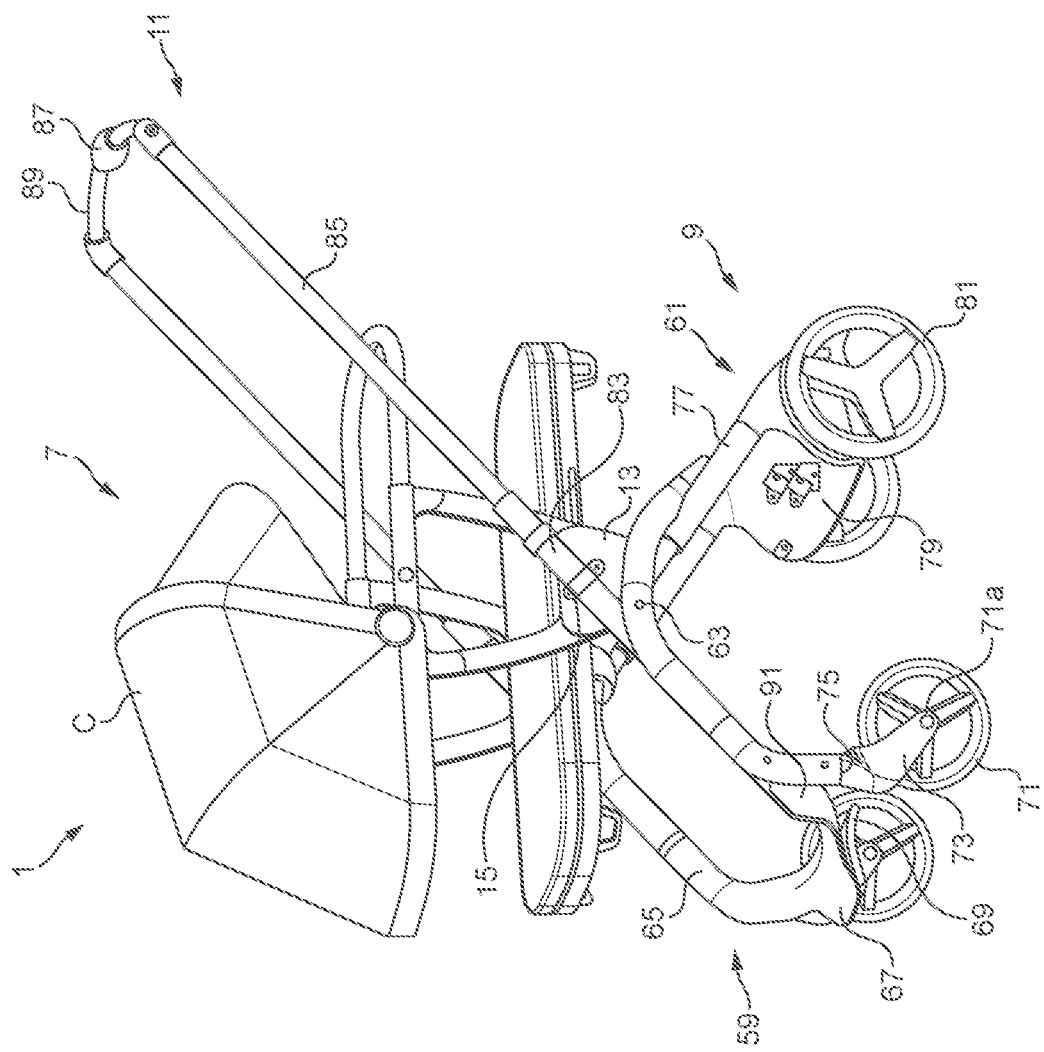

Referring to FIG. 2 (which omits the sidewalls of the bassinet 5, for clarity, and shows the bassinet 5 with optional canopy C attached), the wheeled chassis 3 of the stroller 1 supports the bassinet 5 and comprises, in outline, a foldable chassis 9 in the form of a foldable, wheeled base frame, a telescopic handle 11 for both moving (e.g. pushing, pulling and steering) and folding the stroller 1 and a pair of joints 13 on each lateral side of the foldable chassis 9, to enable the foldable chassis 9 to fold and also to make releasable connections with cooperating folding joints 15 on each lateral side of the bassinet 7.

When separated, the foldable chassis 9 and bassinet 7 are foldable independently of each other. Conveniently, however, the foldable chassis 9 and bassinet 7 may also be folded together in a single cooperative process, resulting in the overall stroller 1 being placed into a compact folded condition, and without the need to remove the bassinet 7 from the foldable chassis 9. Before discussing the components of the stroller 1 in further detail, the following gives an overview of the folding process, with reference to the various parts of FIG. 3.

Figure 3A:
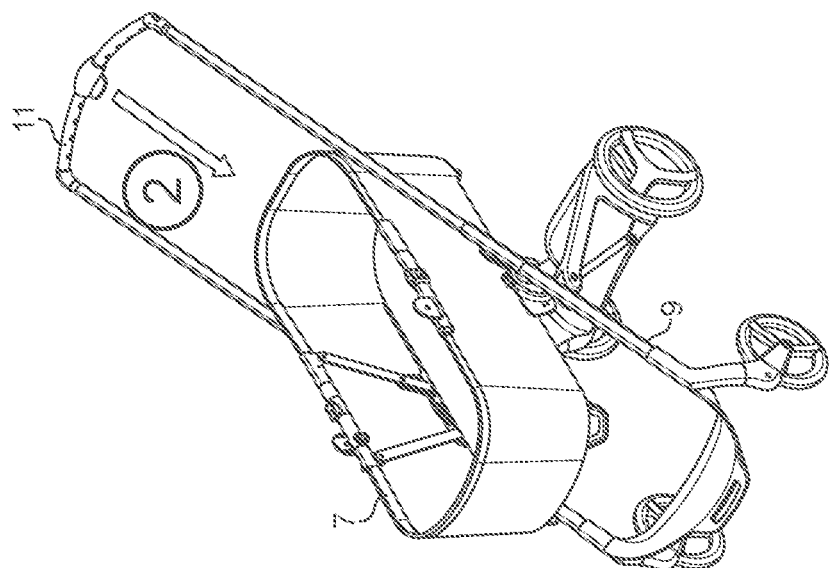
FIGS. 3A to 3E show the process for folding the stroller configuration of FIG. 1C.
Figure 3B:
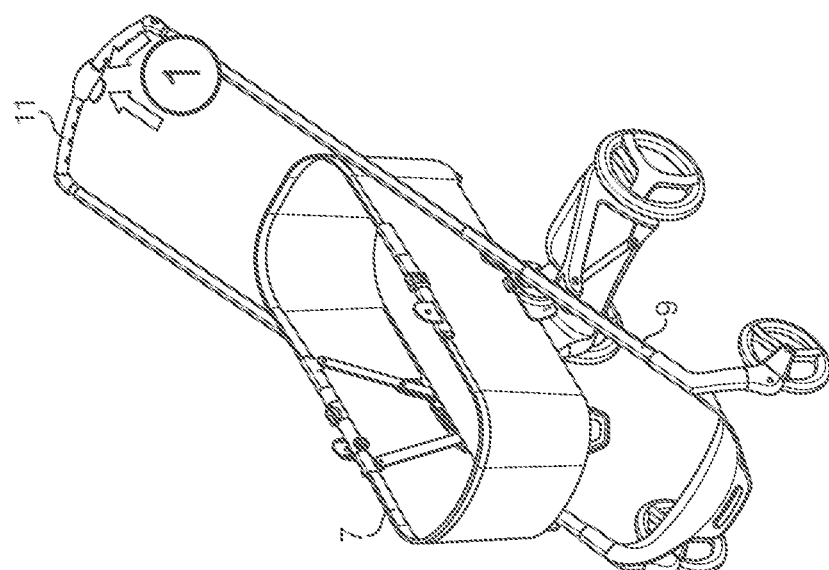
Figure 3E:
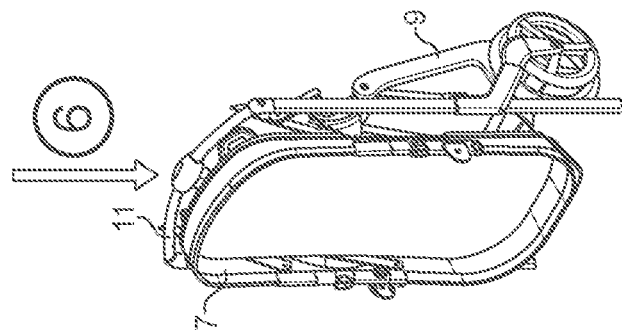
Figure 3D:
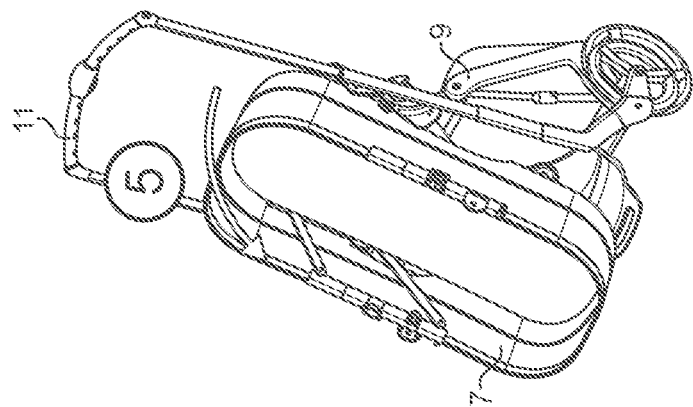
Figure 3C:
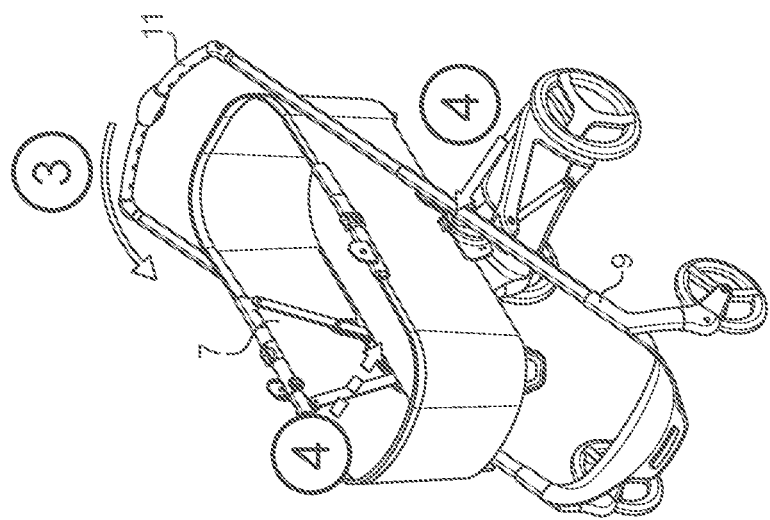

In the present embodiment, the folding process involves the following sequence of steps:

1. A user actuates buttons on the telescopic handle 11 (FIG. 3A), releasing the telescopic handle 11 from an initial locked position, and pushes downwardly to collapse the handle 11 (FIG. 3B), which in turn releases a chassis locking mechanism previously holding the foldable chassis 9 in its unfolded condition;
2. The user tilts the stroller 1 forwardly to lift the rear wheels of the stroller 1 off the ground, resulting in the rear wheels swinging forward under gravity to commence folding of the foldable chassis 9 (FIG. 3C). This folding motion of the foldable chassis 9 in turn releases a bassinet (or seat, as appropriate) locking mechanism previously holding the bassinet 7 (or seat 5) in its unfolded condition;
3. The bassinet 7 (or seat 5) is then itself free to fold under gravity to adopt a compact, folded configuration (FIG. 3D); and
4. The telescopic handle 11 is then fully collapsed by continued downward movement, resulting in the stroller 1 adopting its fully folded condition (FIG. 3E). In the present embodiment, the stroller 1 is stabilized in its folded condition by the forward ends of the telescopic handle 11, which protrude through apertures in the lower side of the folded foldable chassis 9 to support the stroller 1 on the floor surface (or other support surface), in tandem with the rear wheels of the wheeled chassis 3.

It will therefore be appreciated from the above that the present embodiment provides a stroller 1 capable of a convenient folding process in which both the foldable chassis 9 and bassinet 7 (or seat 3) may be folded without need to remove the bassinet 7 (or seat 5) from the foldable chassis 9, and in which the folding of the foldable chassis 9 and bassinet 7 (or seat 5) is performed in a single, integrated process. Additionally, the present embodiment further increases user convenience as the entire folding process may be conducted in a single-handed operation by the user, leaving the other hand free e.g. to hold the hand of an infant previously the passenger of the stroller 1.

The following sequentially describes the bassinet 7, wheeled chassis 3 and folding process in further detail.

Figure 4B:
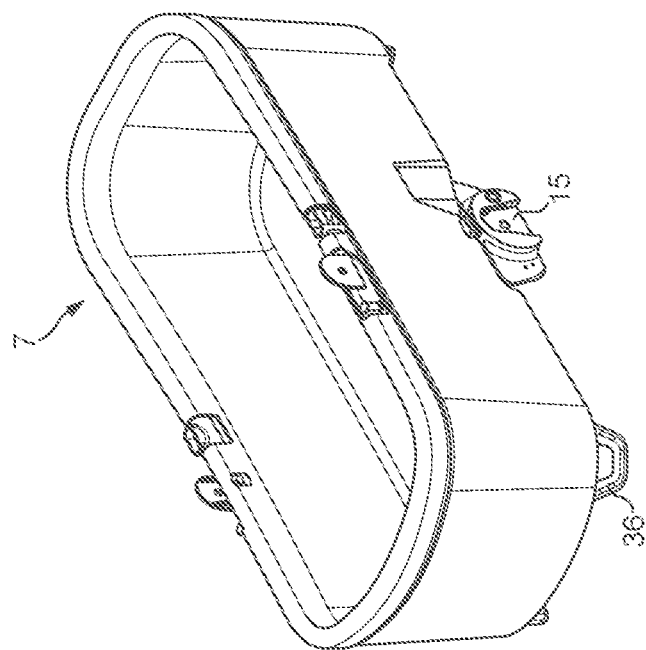
FIGS. 4A and 4B show the bassinet in isolation, the bassinet itself being an embodiment of a bassinet aspect of the present invention.
Figure 4A:
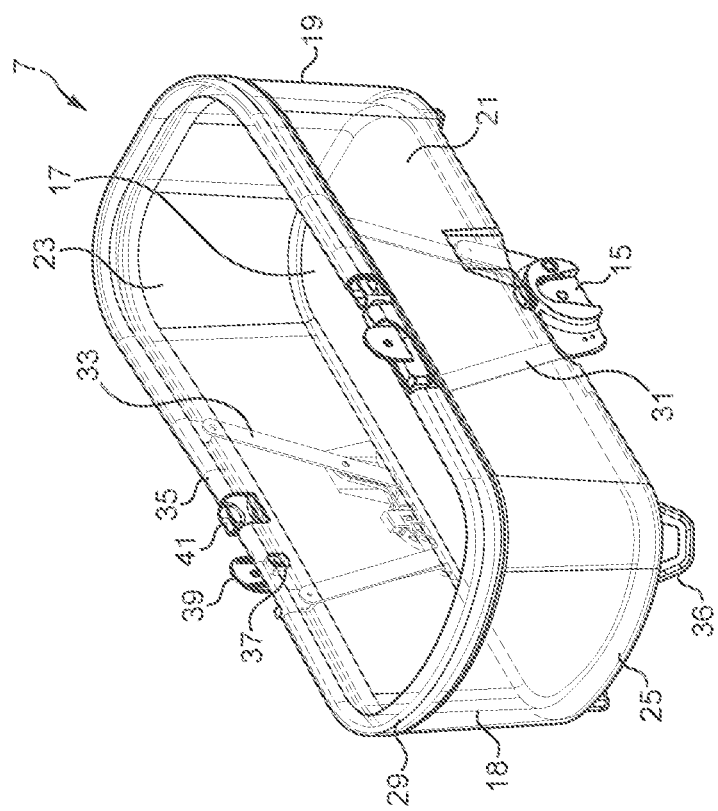

The bassinet 7, being also one embodiment of an independent foldable bassinet aspect of the present invention, is shown in greater detail in FIGS. 4A and 4B and comprises a cushioned base plate 17, on which an infant may be placed, surrounded by peripheral side walls 18 formed from a foldable frame 19 covered by inner and outer layers of fabric 21, 23 (the fabric layers being shown in phantom in FIG. 4A). The foldable frame 19 itself comprises a base frame 25 on which the base plate 17 is provided (the base frame 25 and the base plate 17 may be integrally formed as a single piece, such that the base frame 25 may be considered as part of the base plate 17) and to which bassinet joints 15 are slidably mounted on each lateral side by slotted mounting plates 27 (see FIG. 5B), an upper frame 29 and pairs of hinged first and second connecting arms 31, 33 on each lateral side of the bassinet 7. First (upper) ends of the connecting arms of each pair are pivotally mounted to a respective mounting sleeve 35 fixed to each lateral side of the upper frame 29 (see FIG. 5D); second (lower) ends of the connecting arms 31, 33 are mounted to the joints 15. Feet 36 are provided on the underside of the base frame 25 to stabilize the bassinet 7 on the floor (or other support surface) when the bassinet 7 is used independently of the foldable chassis 9. Parasol, canopy and carry handle interfaces 37, 39, 41 are also provided on the upper frame 29 of the bassinet 7, and to which a parasol, canopy and carry handle (not shown) may be removably attached by a user.

The joint 15 on a first lateral side of the frame 19 is shown in greater detail in FIG. 5; the joint 15 on the second lateral side of the frame 19 takes a corresponding configuration and hence is not described further.

Figure 5A:
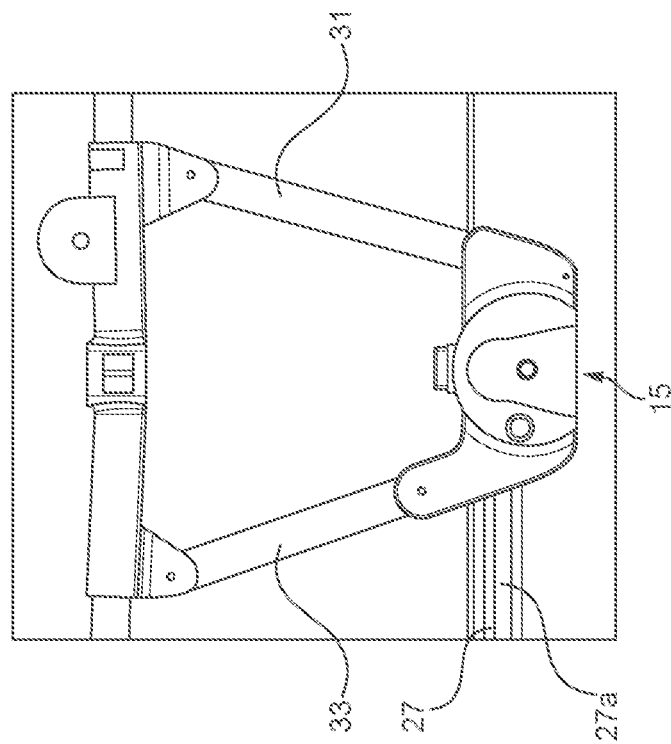
FIGS. 5A to 5E show a folding joint of the bassinet.

As best seen in FIG. 5A, the joint 15 comprises a joint body 43 having on its outer surface a mounting portion 45, which in the present embodiment comprises a generally triangular-shaped recess with a rounded apex uppermost, which co-operates with a mounting portion on the corresponding joint of the foldable chassis (described below) to mount the bassinet 7 on the foldable chassis. Protrusions (not shown) are provided on the reverse surface of the joint body 43, which fit into the laterally-extending slot 27a in the mounting plate 27, to slidably mount the joint body 43 relative to the bassinet frame 19.

Figure 5B:
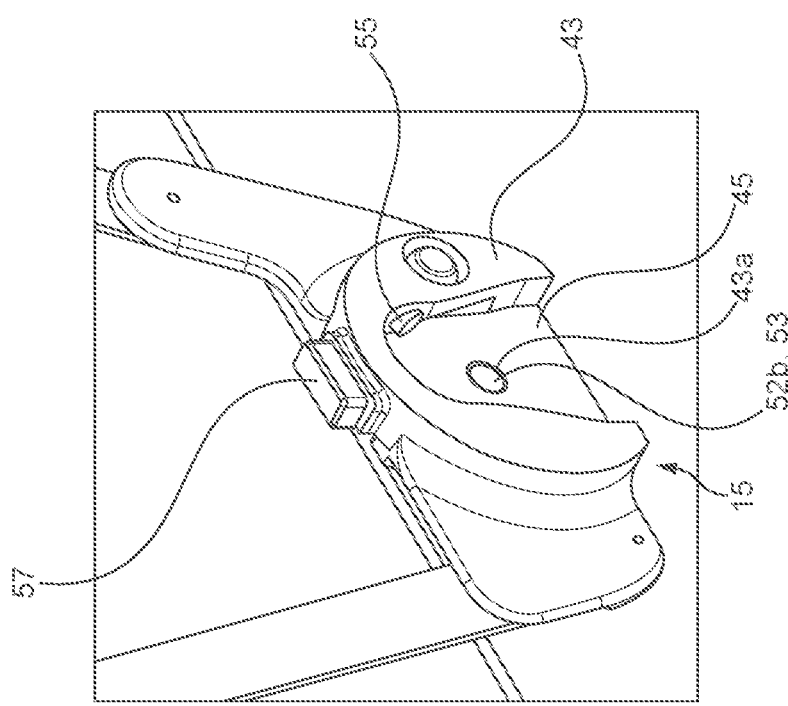
Figure 5D:
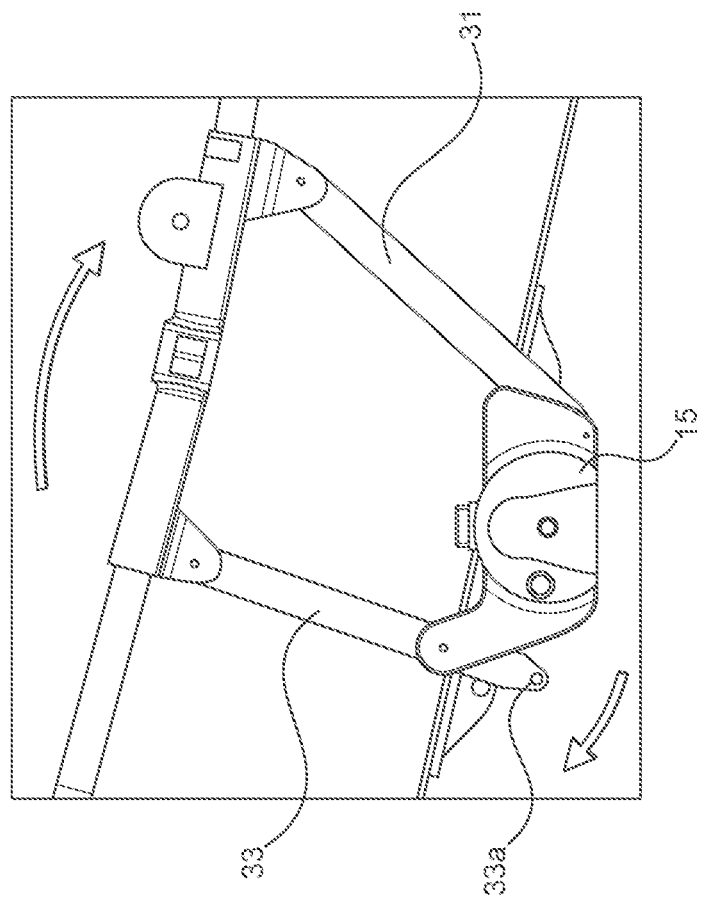
Figure 5C:
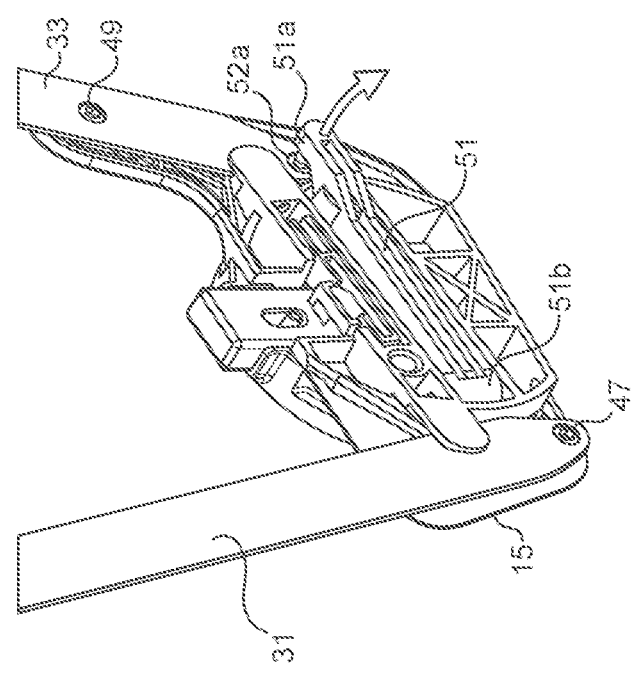
Figure 5E:
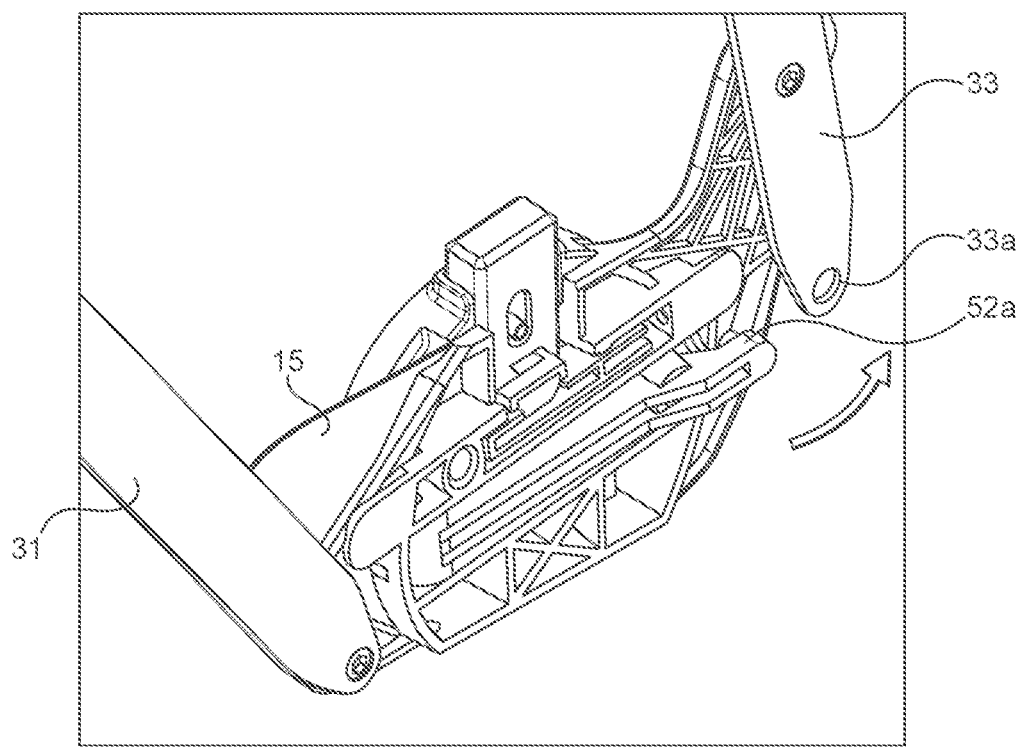

As best seen from FIGS. 5C to 5E, the second (lower) end of the first connecting arm 31 is pivotally mounted to the joint body 43 at pivot point 47. Similarly, the second connecting arm is pivotally mounted to the joint body at pivot point 49. However, in the unfolded state of the bassinet 7, a bassinet locking lever 51 is biased into locking engagement with the second connecting arm 33, preventing the second connecting arm 33 from pivoting relative to the joint body 43.

More specifically, in the present embodiment, the bassinet locking lever 51 is provided with two laterally-extending protrusions 52a, 52b. The first of these protrusions 52a (see FIG. 5C) is located at a first end 51a of the lever 51, distal from a pivotally mounted second end 51b, and is biased by a biasing element such as a spring (not shown) to protrude through and thus engage with an aperture 33a formed at the second (lower) end of the second connecting arm 33. The second of these protrusions 52b (see FIG. 5A) is provided between the first and second ends of the lever 51, and extends through and thus engages with an aperture 43a in the joint body 43. In this condition, the second connecting arm 33 is fixed in place relative to the joint body 43, as shown in FIGS. 5A and 5B. Because the second connecting arm 33 is fixed in place relative to the joint body 43, the first connecting arm 31 and joint body 43 are likewise held in a fixed position relative to the other parts of the bassinet frame 19, meaning that the bassinet 7 is rigidly held in the unfolded condition shown in FIG. 4A. The bassinet locking lever 51 and the apertures in the second connecting arm and the joint body 33a, 43a may therefore together be seen as a bassinet locking mechanism, which acts to prevent unintended folding of the bassinet 7.

Seen from the outside, the second laterally-extending protrusion 52b of the bassinet locking lever 51 defines a bassinet unlocking button 53 located to coincide with the position of the mounting portion 45. Pressing this button 53 causes the lever 51 to rotate in the direction of the arrow shown in FIG. 5C, against the bias of its associated biasing element, to move inwardly of the joint body 43. Sufficient pressure on the bassinet unlocking button 53 therefore disengages the second connecting arm 33 from the bassinet locking lever 51 and thus enables both the first and second connecting arms 31, 33 to pivot relative to the joint 15 and thus for the bassinet 7 to fold (see FIGS. 5D and 5E).

The disengagement of the second connecting arm 33 from the bassinet locking lever 51 also frees the joint 15 itself to move relative to the bassinet frame 19, which it does by sliding rearwardly along the slot of the mounting plate 27a (see FIGS. 5D and 5E). Without this relative movement of the joint 15, the pivotal connections of the first and second connecting arms 31, 33, relative to the upper frame 29 and base frame 25, would require the upper frame 29 to move longitudinally (forwardly) of the base frame 25 during collapse of the bassinet 7, resulting in an undesirably enlarged footprint for the folded bassinet 7 and also creating the possibility of the upper frame 29 of the folding bassinet 7 protruding forward to contact the floor before the stroller 1 is fully folded, thus interfering with the overall correct folding of the stroller 1. These problems are avoided in the present embodiment, which effectively absorbs the longitudinal (forward) movement which would otherwise be observed in the movement arc of the upper frame 29 by moving the bassinet joint 15 in the opposite (rearward) direction, and thus allows the bassinet 7 to form a longitudinally compact folded form in which the upper frame 29 collapses down directly on top of the bottom frame 25.

To initiate the folding of the bassinet 7, the bassinet unlocking button 53 may be pressed either a) by a moving part of the foldable chassis 9 (specifically, the secondary fold actuator lever described below) when the bassinet 7 is mounted on the foldable chassis 9—this corresponds to the folding process of FIG. 3, or b) by a user, employing their finger or an appropriate tool, when the bassinet 7 is used independently of the foldable chassis 9—this is the folding process of FIG. 6, also discussed below.

Lastly, a bassinet-to-chassis mounting lock 55 and corresponding release button 57 are further provided on the joint body 43, as shown in FIG. 5A. The bassinet-to-chassis mounting lock 55 automatically engages with a corresponding part of the foldable chassis joint 13 when the bassinet 7 is mounted on the foldable chassis 9, to lock the bassinet 7 in place and prevent its inadvertent release. This locking engagement is released by pressing the release button 57, when it is desired to remove the bassinet 7 from the foldable chassis 9.

The wheeled chassis 3 will now be described in detail, beginning with reference to FIG. 2.

The base frame of the foldable chassis 9 comprises front and rear frame portions 59, 61 which are hingedly connected to each other at pivot points 63 provided in each chassis joint 13, thus allowing the overall foldable chassis to fold. Locking mechanisms (described further below) are provided in each joint 13, to prevent inadvertent folding of the foldable chassis 9.

The front frame portion 59 has a generally "U"-shaped configuration and is formed by two parallel front frame arms 65 joined in the vicinity of their forward ends (i.e. the ends distal of the pivot points 63) by a transverse strut 67. A "self stand" 69, employed during the folding process, is located centrally on the transverse strut 67. The forward ends of the front frame arms 65 each serve as a mounting point for a respective one of a pair of front wheels 71 of the stroller 1. The front wheels 71 are connected to the front frame arms 65 by stems 73, which are themselves pivotally mounted to forward ends of the front frame arms 65 by swivel joints 75, to allow the front wheels 71 to turn relative to the central longitudinal axis of the stroller 1 and thus give steerage. The stems 73 are configured to offset the hub 71a of each front wheel 71 (and therefore the center of gravity of the wheel/stem combination) from its associated swivel joint 75, in the horizontal plane—this horizontal offset is labelled "X" in FIG. 2B. Hence, with the stroller 1 unfolded and placed with its wheels on the ground, and seen from directly above the stroller 1, the hub 71a of each front wheel 71 is observed at a different location from the swivel joint 75 associated with that wheel 71, because the hubs 71a are not positioned directly underneath their respective swivel joints 75, but are instead horizontally offset from the swivel joints 75. In the present embodiment, the stems 73 are configured such that when the stroller 1 is pushed forward, the hub 71a of each front wheel 71 adopts a position which is horizontally offset to be rearward (closer to the rear wheels) than the swivel joint 75.

The stems 73 may be shaped and/or configured in various ways to achieve this horizontally offset relationship between the center of gravity of the wheel/stem combination and the swivel joint 75 of the stem 73, and the precise manner in which this relationship is achieved is not important, but in the present embodiment this relationship is achieved by providing elongate stems 73 each defining a longitudinal stem axis A (see inset FIG. 2A) which is angled at non-zero angle Θ, relative to vertical Z, on the ground/lower side of the stem 73. The specific value of this angle is not particularly important as long as the foregoing relationship is observed, but may for example be any non-zero, acute angle less than 90 degrees, preferably any acute angle greater than or equal to 10 degrees and less than or equal to 60 degrees, more preferably any acute angle greater than or equal to 20 degrees and less than or equal to 50 degrees, further more preferably any acute angle greater than or equal to 30 degrees and less than or equal to 40 degrees, and most preferably an angle of around 35 degrees.

Returning to the foldable chassis 9, the rear frame portion 61 takes a generally "U"-shaped configuration formed by two parallel rear frame arms 77 joined in the vicinity of their rearward ends (i.e. the ends distal of the pivot points 63) by a transverse strut 79. The rearward ends of the rear frame arms 77 each serve as a mounting point for a respective one of a pair of rear wheels 81 of the stroller 1.

Although omitted from FIG. 2 for clarity of illustration, a luggage storage area is provided underneath the bassinet/seat mounting area—this luggage storage area is shown in FIG. 21 and discussed in greater detail below.

The telescopic handle 11 comprises a pair of outer tubes 83 fixed relative to the front frame arms 65 and within which a pair of inner tubes 85 are slidable upon appropriate actuation of buttons located within a button housing 87 mounted centrally on a handle crossbar 89 which joins the two inner tubes, and which buttons are used in the present embodiment to initiate both handle height adjustment and folding of the stroller 1.

The outer tubes 83 are fixed to and open into the (hollow) front frame arms 65, to permit the forward ends of the inner tubes 85 to penetrate forwards into the front frame arms 65 as the telescopic handle 11 is collapsed, before eventually exiting through apertures 91 in the front frame arms 65 when the handle 11 is fully collapsed, where they act to support the stroller 1 in its folded state (see FIG. 3E).

The button housing 87 of the handle 11 is shown in greater detail in the various parts of FIG. 7, in which an outer casing 87a of the housing 87 is shown in phantom in FIG. 7A, and omitted entirely in the remaining parts, for clarity of illustration. Housed within the button housing 87 are a primary handle adjustment button 93 and a secondary handle adjustment button 95, as well as a pair of movable sliding elements 97 which ride on respective angled inner faces 93a of the primary handle adjustment button 93.

Each of the sliding elements 97 is attached via a cable (not shown) to a respective one of a pair of handle locking systems, one of which is shown generally at 101 in FIG. 8A. The handle locking system 101 is located within the handle 11 and is distributed over the outer/inner tube pair 83, 85 on one side of the handle 11. The other handle locking system is distributed over the other outer/inner tube pair on the other side of the handle 11 and is identical to that shown in the various parts of FIG. 8.

The handle locking system 101 chiefly comprises a series of indents 103 on the inner surface of the (fixed position) outer tube 83, as well as a movable locking height adjustment tab 105, a chassis fold tab 107 and chassis fold tab actuator 109 all provided on the (movable) inner tube 85 of the handle 11. The indents 103 correspond to a plurality of predetermined handle heights with which the locking height adjustment tab 105 may be selectively engaged, so as to fix the handle 11 at the desired height. The chassis fold tab 107 and chassis fold tab actuator 109 are used when the stroller 1 is being folded.

With the stroller 1 in its normal unfolded condition (see FIG. 2), the primary and secondary handle adjustment buttons 93, 95 and the sliding elements 97 are biased by respective biasing elements such as springs (not shown) into their initial positions shown in FIGS. 7A and 7B, and the locking height adjustment tab 105 is similarly biased by a locking height adjustment tab biasing element such as a spring (not shown) to protrude outwardly into engagement with an initial position indent 103a, corresponding to an initial predetermined handle height, as shown in FIG. 8A.

Figure 7D:
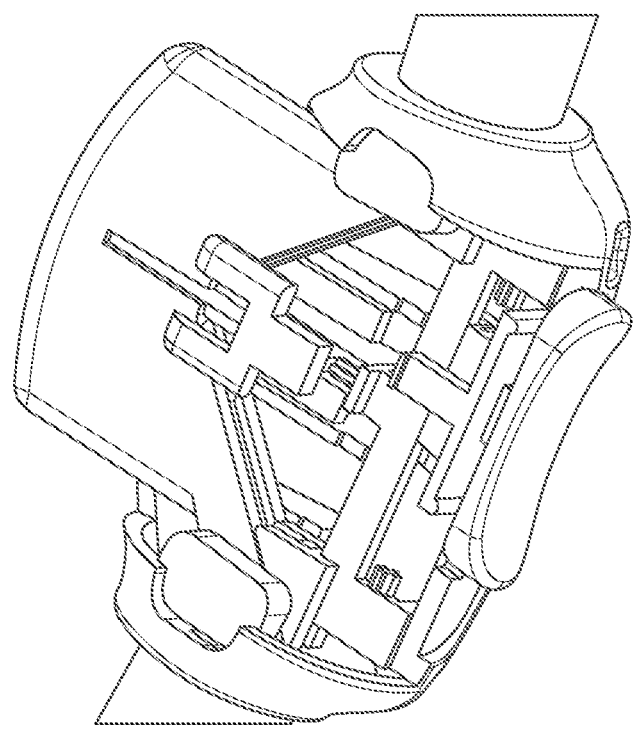
Figure 7C:
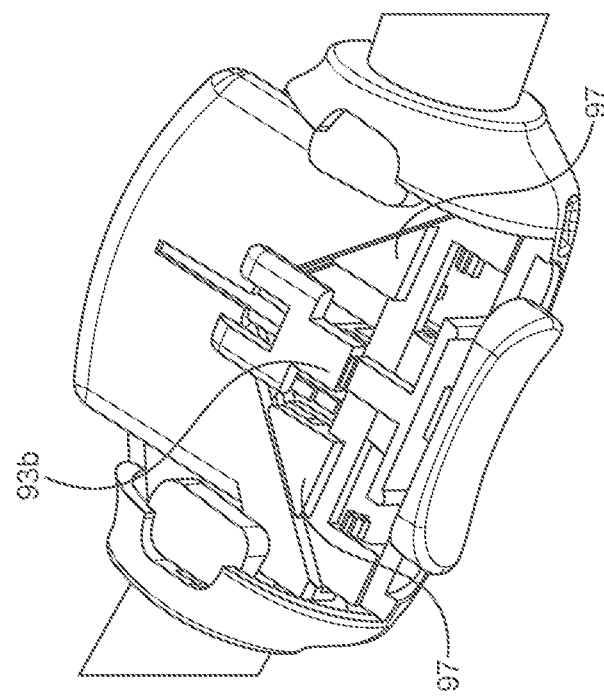

To adjust the height of the handle 11, a user presses the primary handle adjustment button 93 into the button housing 87, which moves the sliding elements 97 towards each other as they slide on the angled inner faces of the primary handle adjustment button 93 (see FIG. 7C). This movement of the sliding elements 97 pulls on the cables within the handle 11, which in turn results in the locking height adjustment tab 105 being retracted from engagement with the initial position indent 103a, thus releasing the handle 11 from fixture at its initial height position. The user may then move the handle 11 to another of the predetermined handle height positions and release the primary handle adjustment button 93, causing the sliding elements 97 to return to their initial positions under bias of their respective biasing elements (not shown). The earlier pull on the cable is now released, causing the locking height adjustment tab 105 to protrude into engagement with the indent 103 at the current handle height position as a result of the bias applied by the locking height adjustment tab biasing element (not shown). The handle 11 is thus secured at its new height position.

Here, it should be noted that the extent of movement of the primary handle adjustment button 93 into the button housing 87 (and therefore the amount by which the cables are pulled by the sliding elements 97) is limited by a projection 95a of the secondary handle adjustment button 95, which acts as an end stop by coming into contact with a corresponding projection 93b provided on the primary adjustment handle 93.

Figure 7E:
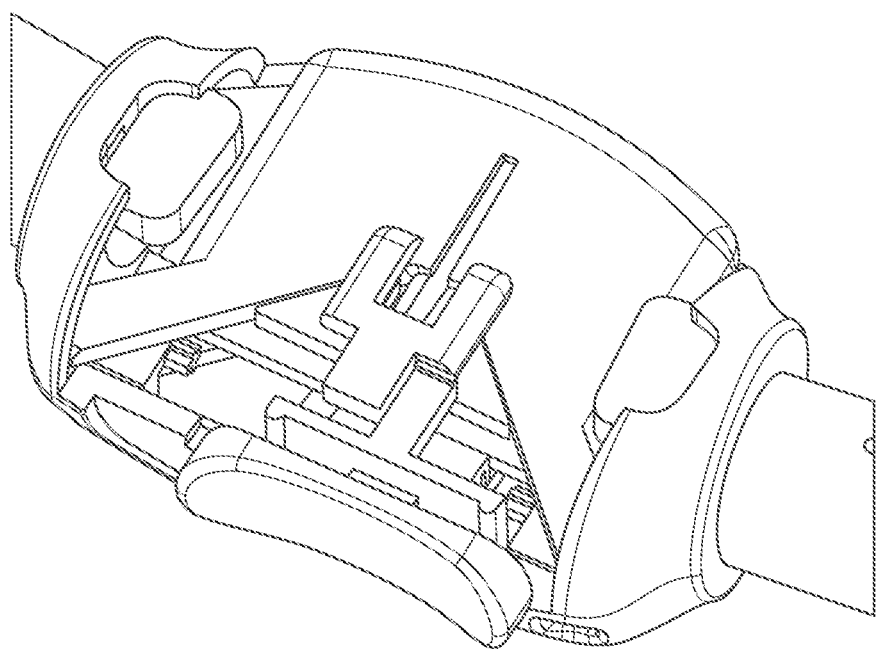
Figure 8C:
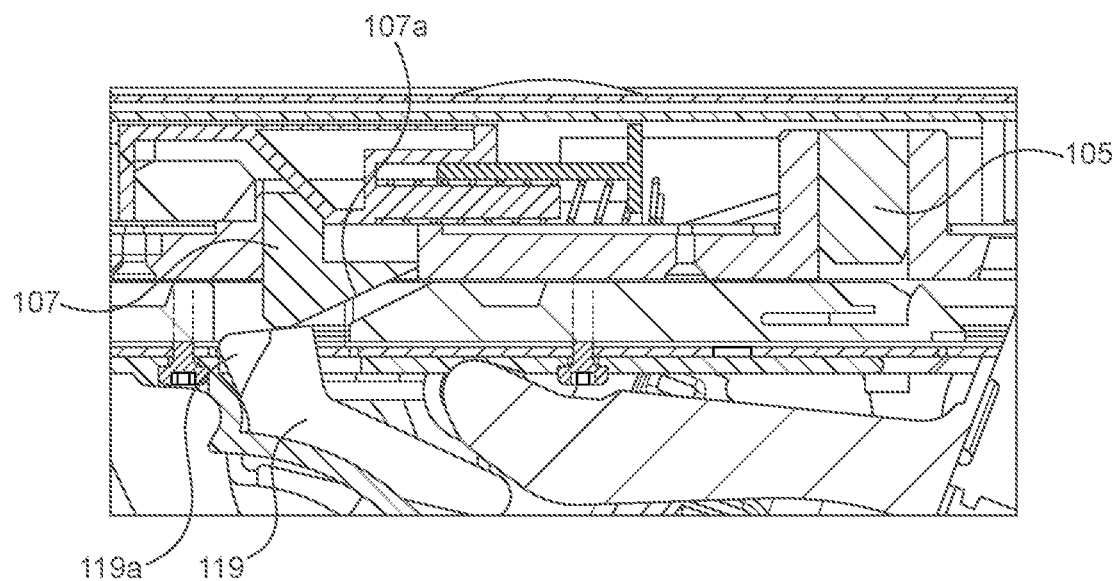

When folding the stroller 1, the user additionally actuates the secondary handle adjustment button 95, by sliding it laterally to a position at which the projections 93a, 95a are not aligned and so do not come into contact, as shown in FIGS. 7D and 7E. This increases the range of movement of the primary handle adjustment button 93 into the button housing 87, and therefore increases the amount by which the cables are pulled by the sliding elements 97. This further pulling of the cables causes an inclined face 109a of the chassis fold tab actuator 109 to contact the chassis fold tab 107, forcing it to protrude outwardly from the inner tube 85 (as shown in FIGS. 8B and 8C, discussed below). The protruding chassis fold tabs 107 of the handle locking systems 101 are then used to unlock locking mechanisms in each of the chassis frame joints 13 (described in greater detail hereinafter), which then allows the foldable chassis 9 to start folding. It will therefore be understood that, by governing this operation, the secondary handle adjustment button 95 acts as a safety mechanism which prevents inadvertent folding of the stroller 1.

FIGS. 9 to 13 show a first of the two chassis frame joints 13, which is located on a first side of the foldable chassis 9; the second of the two joints 13, on the other side of the foldable chassis 9, takes the same configuration. Each joint 13 comprises a joint housing 111 fixed to the outer tube 83 of the handle 11 (and therefore also fixed relative to the front frame portion 59 of the foldable chassis 9) and in which various joint components are contained, as well as the above-mentioned pivot point 63 which serves as the hinged connection between the front and rear frame portions 59, 61. A mounting portion 115, which in the present embodiment takes the form of a generally triangular-shaped protrusion with a rounded apex uppermost, is formed on the outer surface of the joint housing 111 for co-operation with the mounting portion 45 of the corresponding bassinet joint 15, to support and secure the bassinet 7 in place on the foldable chassis 9. An aperture 117 is located to coincide with the position of the mounting portion 115, and in particular to coincide with the location of the bassinet unlocking button 53 in the bassinet joint 15 when the bassinet 7 is supported on the foldable chassis 9. As discussed further below, this enable the bassinet unlocking button 53 to be pressed automatically when the foldable chassis 9 is being folded, thus allowing the bassinet 7 to fold also.

Figure 9B:
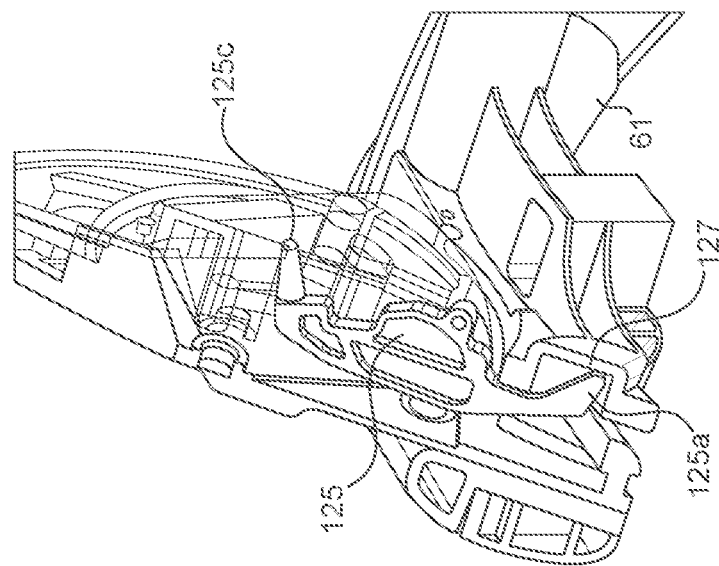
FIGS. 9A to 9D and FIG. 10 show a joint of the chassis of the stroller of FIG. 1.
Figure 9A:
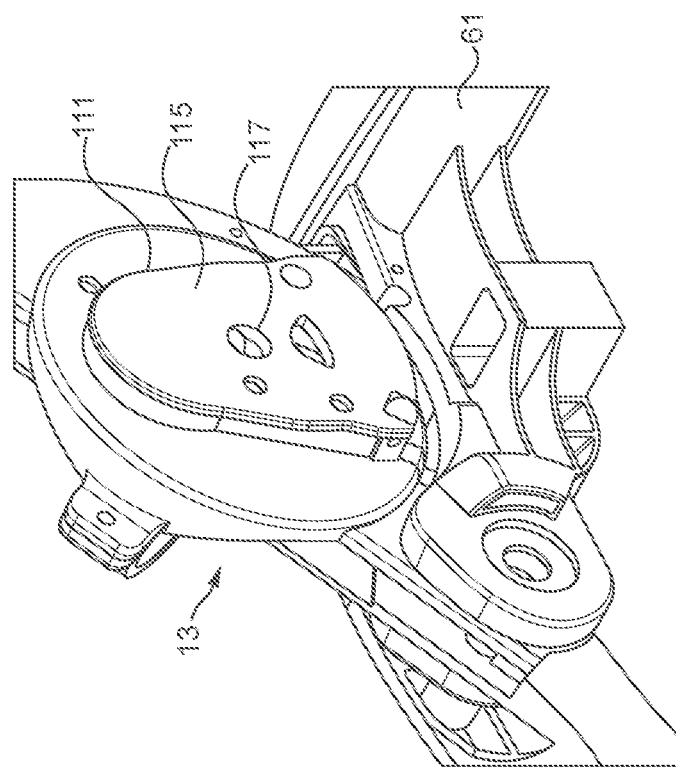
Figure 9D:
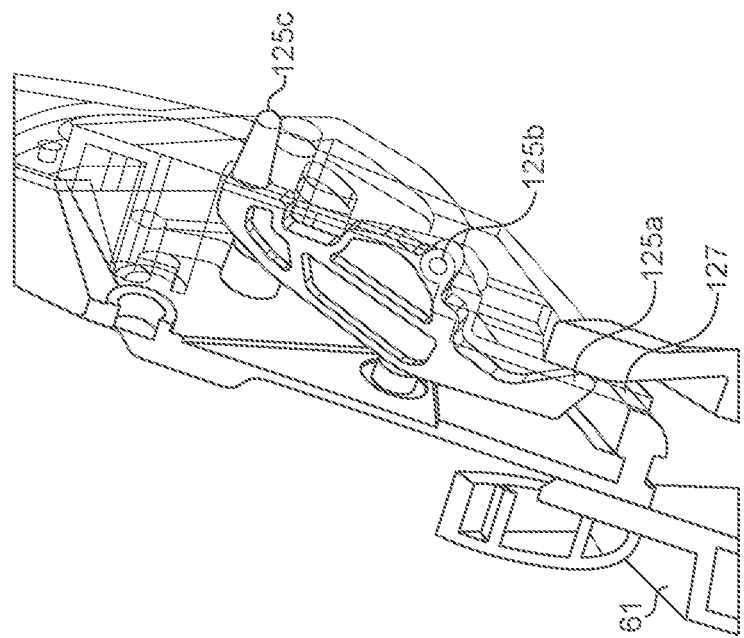
Figure 9C:
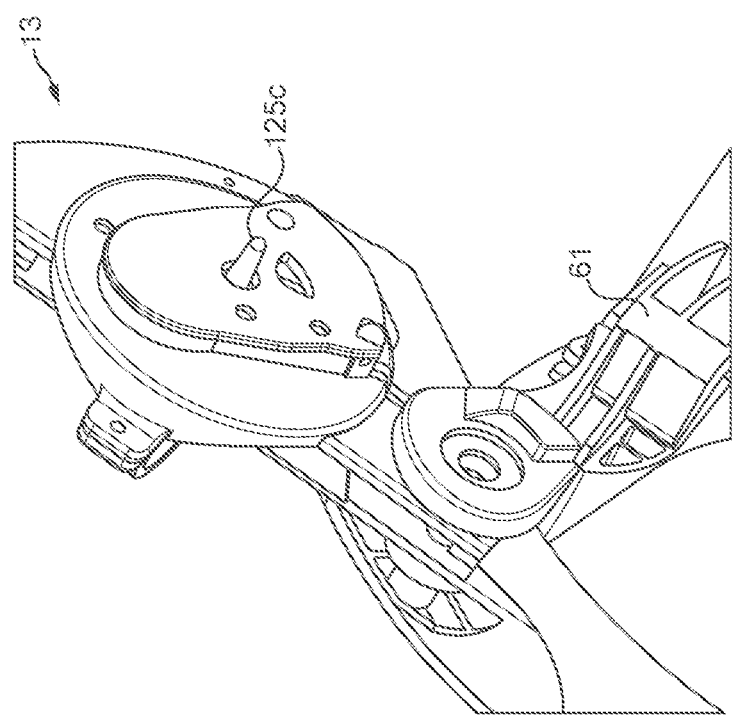

Located within the joint housing 111 are a pivotally-mounted chassis unlocking lever 119 (see FIGS. 10 and 11), a locking beam 121 (see FIG. 10), a locking beam track 123 formed on an internal face of the joint housing 111 (see FIG. 10), and a secondary fold actuator lever 125 which rides on a cam surface 127 formed on the rear frame portion 61 (see FIGS. 9B and 9D).

Figure 12B:
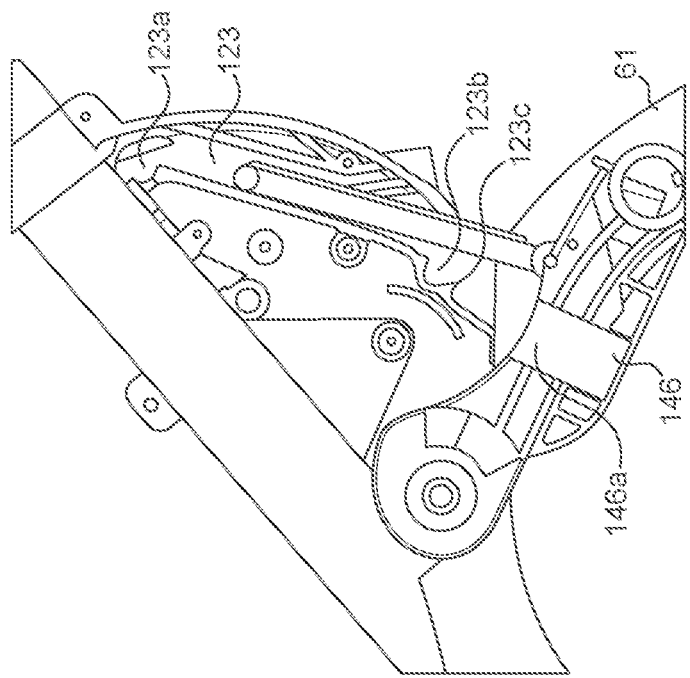
Figure 12A:
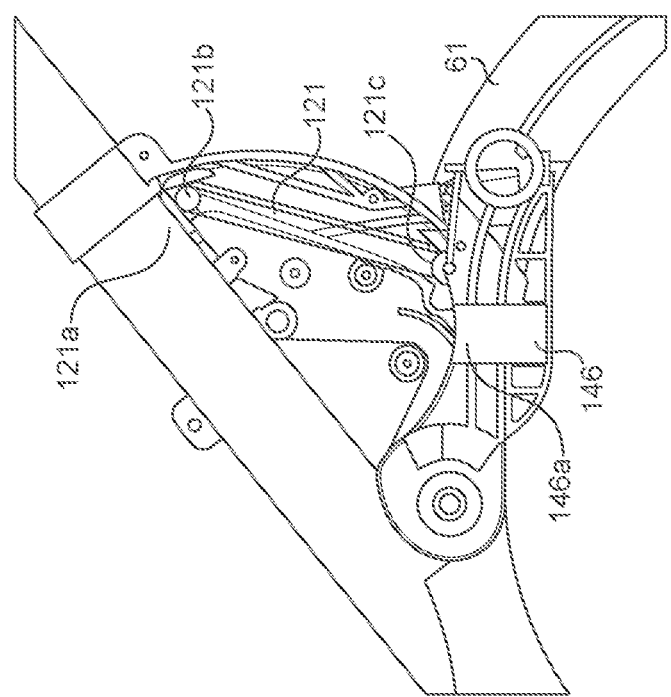

As shown in the various parts of FIG. 12, the locking beam 121 has a floating first end 121a provided with a protrusion 121b and a second end 121c which is pivotally mounted to the upper end of the rear frame portion 61. When the stroller 1 is in its initial unfolded condition (i.e. the condition shown in FIG. 2), the locking beam 121 adopts the initial position shown in FIG. 12A. Here, the protrusion 121b seats within an unfolded condition locking indent 123A at a first (upper) end of the locking beam track 123, thus fixing the rear frame portion 61 in position relative to the handle 11 and front frame portion 59. The locking beam 121 and locking beam track 123 therefore act as a chassis locking mechanism, holding the foldable chassis 9 in its unfolded state until a user choses to fold the stroller 1.

Figure 13B:
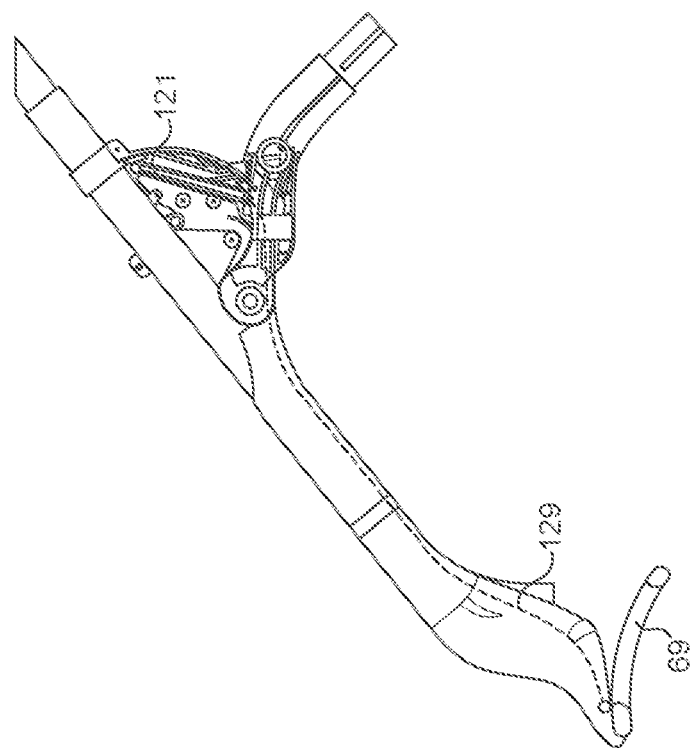
FIGS. 13A to 13D show a self stand feature of the chassis of the stroller of FIG. 1.
Figure 13A:
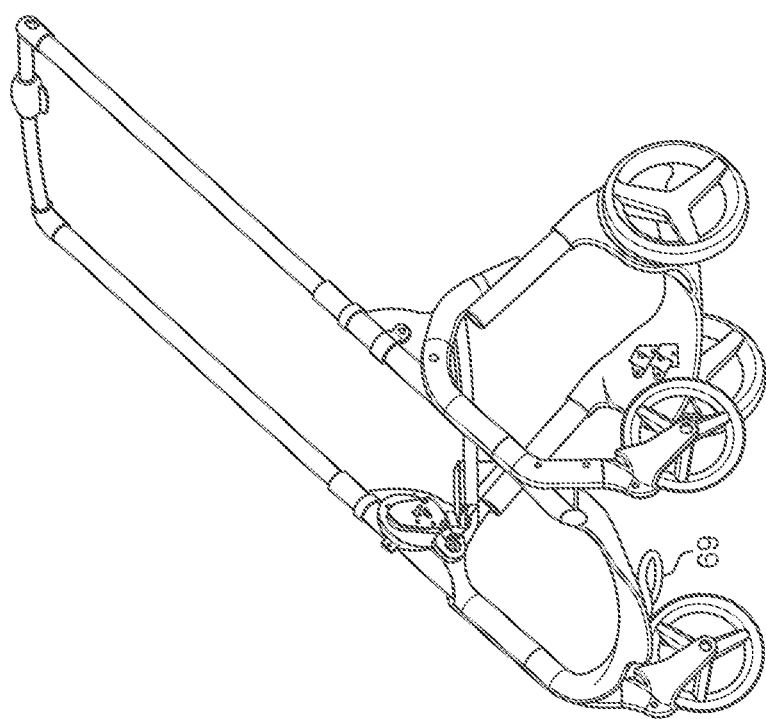
Figure 13D:
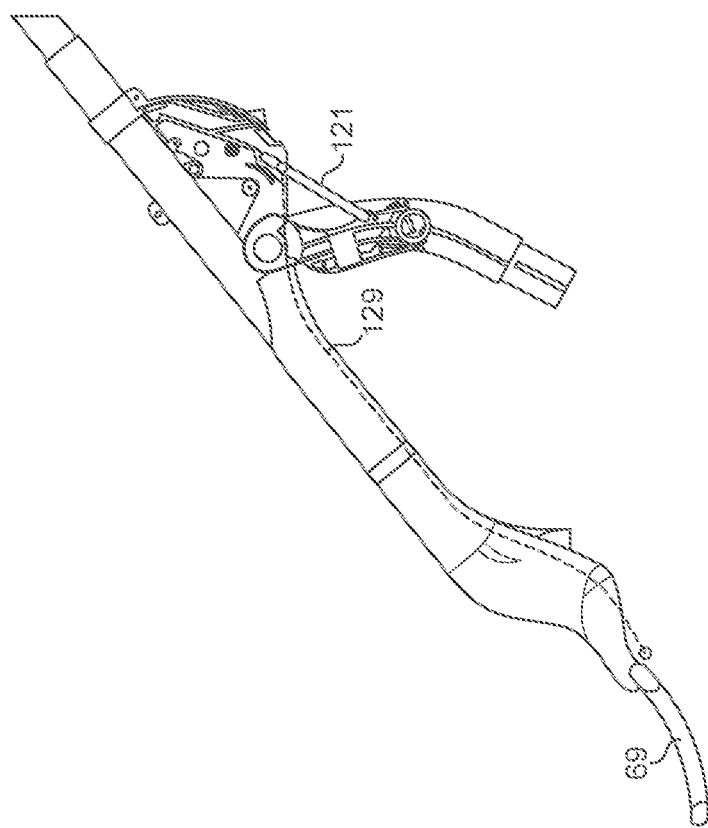
Figure 13C:
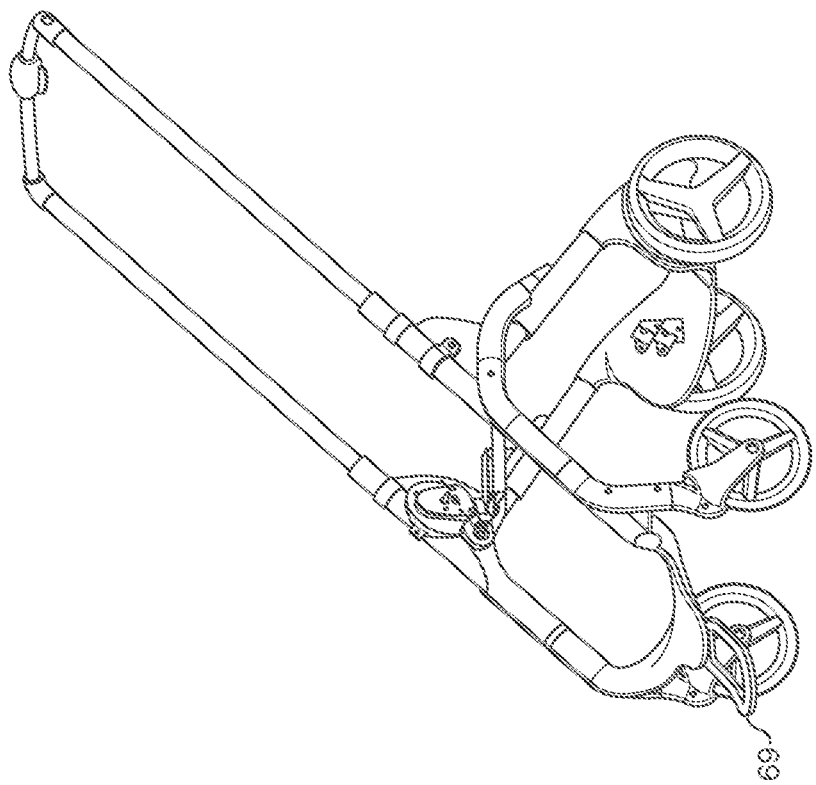

The locking beam 121 is additionally connected to the self stand 69 by a cable 129 (see FIGS. 13B and 13D). The self stand 69 is movable between a retracted condition (see FIGS. 13A and 13B) and an extended condition (see FIGS. 13C and 13D). A biasing element such as a spring (not shown) acts to bias the self stand 69 into the extended condition. However, tension is applied to the cable when the locking beam 121 is in its initial position of FIG. 12A, meaning that the self stand 69 is held in its retracted condition when the stroller 1 is unfolded.

In order to fold the stroller 1, a user first actuates the secondary handle adjustment button 95 in the button housing 87, by sliding it laterally to the position shown in FIG. 7D, and depresses the primary handle adjustment button 93 to the extended position shown in FIG. 7E. This is the initial step shown in FIG. 3A, discussed earlier. As described above, these actions disengage the locking height adjustment tab 105 from the indents 103 on the outer tube 83, enabling the telescopic handle 11 to start to collapse (see FIG. 3B), and cause the chassis fold tab 107 to protrude outwardly from the inner tube 85.

Figure 11B:
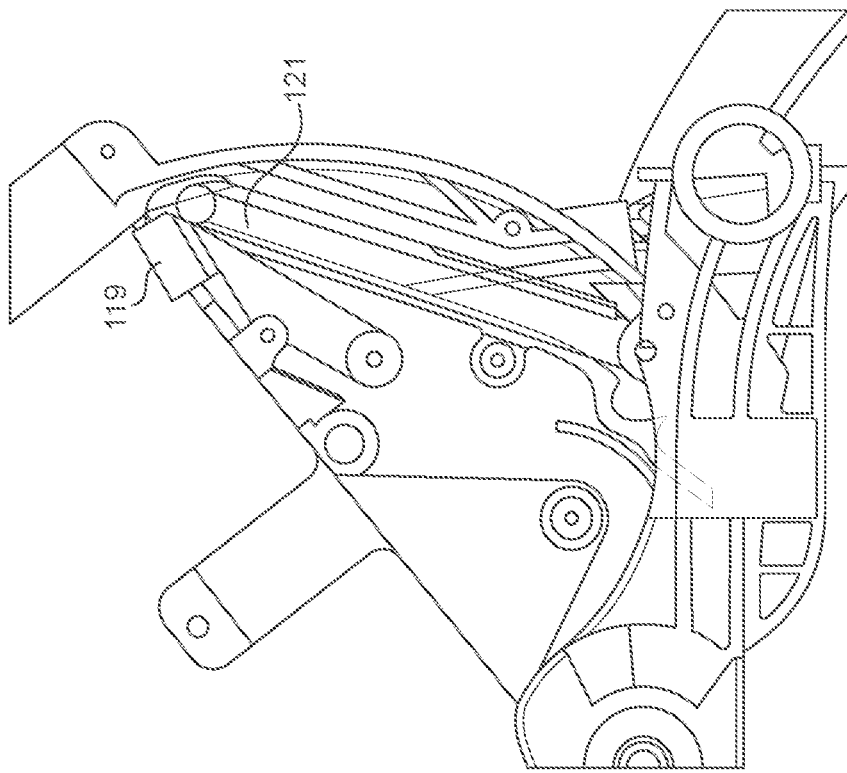
FIGS. 11A and 11B and 12A to 12C show further details of the joint of FIGS. 9 and 10.
Figure 11A:
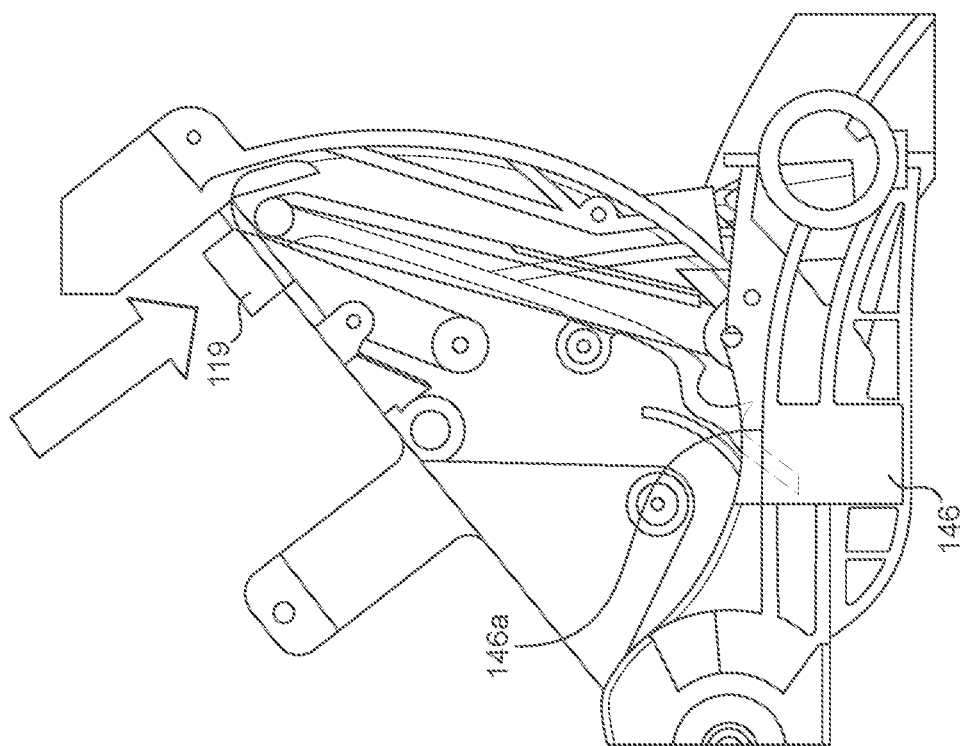

Continued collapse of the telescopic handle 11 (i.e. continued downward movement of the inner tubes into the outer tubes) causes the protruding chassis fold tab 107 to come into contact with and apply pressure having a downward component to the chassis unlocking lever 119 (see FIG. 8C; the arrow in FIG. 11A shows the downward force component applied by the protruding chassis fold tab 107). The protruding chassis fold tab has an inclined face 107a to contact the chassis unlocking lever 119 for smooth actuation of the lever; the leading edge of the chassis unlocking lever 119 may also have a rounded corner 119a (see FIG. 8C) to facilitate smooth contact between the chassis fold tab 107 and the chassis unlocking lever 119.

The downward force applied by the chassis fold tab 107 causes the chassis unlocking lever 119 to pivot such that it contacts the first (upper) end of the locking beam 121 (see FIG. 11B). This contact unseats the locking beam 121 from the unfolded condition locking indent 123a, thus releasing the rear frame portion 61 from its fixed position relative to the telescopic handle 11 and front frame portion 59. The user now simply tilts the stroller 1 forward using the handle 11 (see arrow in FIG. 3C), thus lifting the rear end of the stroller 1 such that the (unlocked) rear frame portion 61 swings forward under gravity, towards the front frame portion 59, and so starting to fold the foldable chassis 9.

Figure 12C:
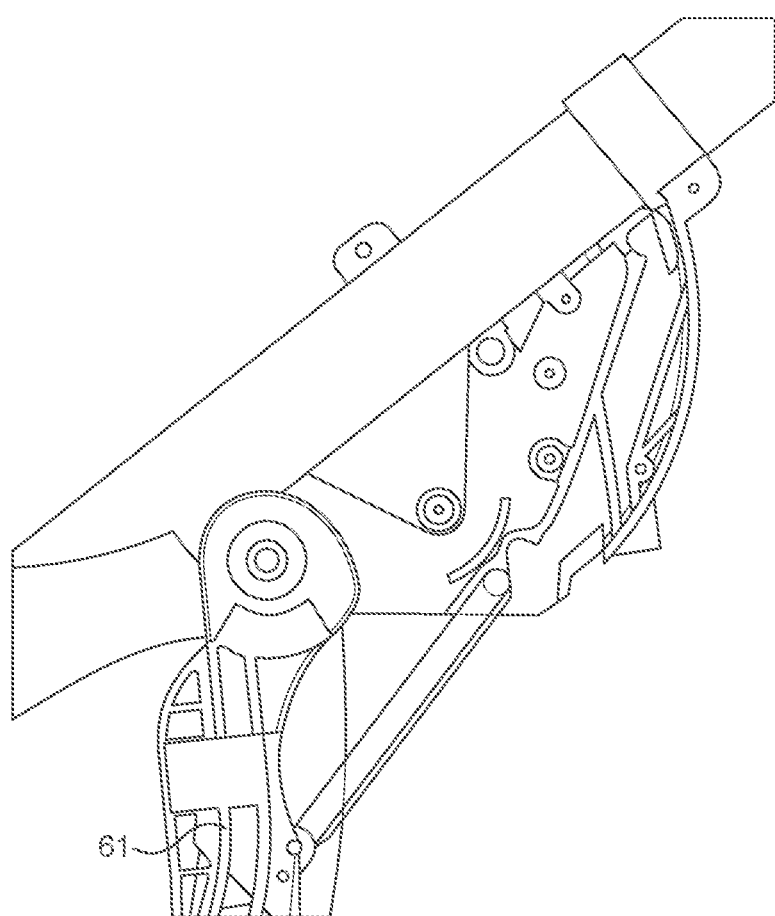

Because the second (lower) end of the locking beam 121 is pivotally mounted to the rear frame portion 61, it is pulled downwardly along the locking beam track 123 by the folding movement of the rear frame portion 61 (see FIGS. 12B and 12C). This downward movement of the locking beam 121 releases the tension on the cable 129, enabling the self stand 69 to adopt its extended condition (see FIGS. 13C and 13D). Hence, as the stroller 1 is tilted forward, the self stand 69 extends and comes into contact with the ground surface, resulting in the front wheels 71 being lifted from the ground surface, as shown in the folding sequence in FIGS. 17F to 17I (albeit there shown with the seat 5 attached to the foldable chassis 9 in place of the bassinet 7). Friction between the self stand 69 and the ground surface assists with tilting the stroller 1 further forward.

Additionally, as the self stand 69 now replaces the front wheels 71 as the load bearing element at the front of the stroller 1, the front wheels 71 are free to rotate around their respective swivel mounts 75 (see FIGS. 17F to 17I). As will be appreciated, the initial horizontal offset X of the center of gravity of each front wheel/stem combination from its associated swivel mount 75, observed when the stroller 1 has all wheels on the ground, gives rise to a turning moment about the swivel mount 75 as the stroller 1 is tilted forward and the front wheels 71 are lifted from the ground. This causes the wheel/stem combinations to flop forwardly under gravity (see FIGS. 17F to 17H), to automatically adopt aligned resting positions such that the vertical planes in which each of the front wheels 71 lie are parallel to each other and are also parallel to the vertical planes in which each of the rear wheels 81 lie (see FIG. 17I). Having the front wheels 71 automatically align under gravity in this way advantageously avoids the possibility of the front wheels 71 otherwise remaining at positions lying in the path of the rear wheels 81 as the rear portion 51 folds forwardly, which would result in the front wheels 71 interfering with the proper folding of the foldable chassis 9. Also, in the present embodiment, a set spacing is ensured between the front wheels 71 in their resting positions, into which spacing the rear wheels 81 can readily swing without contacting the front wheels 71. This enables the foldable chassis 9 to automatically and conveniently adopt a compact folded package (see FIG. 17J). However, the rear wheels 81 could equally swing to locate on either outer side of the aligned front wheel pair 71.

Figure 10:
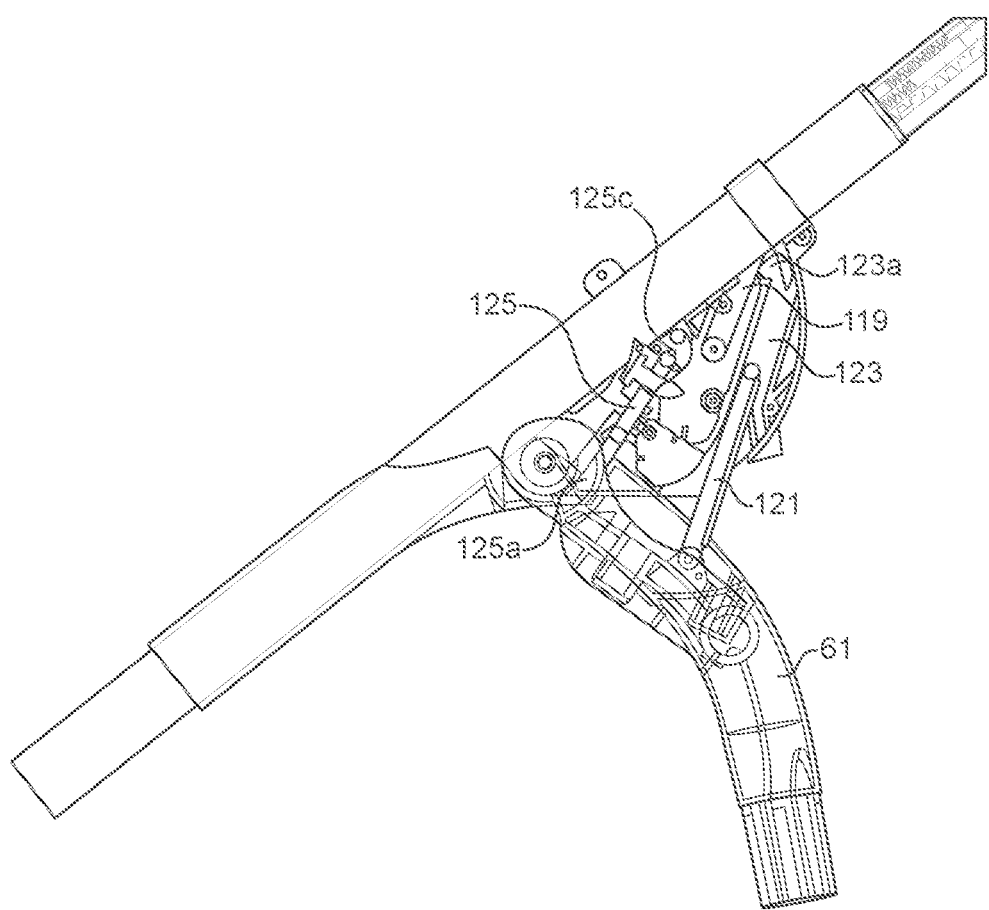

The folding of the foldable chassis 9 also unlocks the bassinet 7 from its unfolded condition. Referring to FIGS. 9 and 10, and as noted above, the secondary fold actuator lever 125 (and more specifically, a first end 125a thereof) rides on a cam surface 127 formed on the rear frame portion 61. It will therefore be appreciated that the forward movement of the rear frame portion 61, as it folds forwardly, results in movement of the secondary fold actuator lever 125 governed by contact between the first end 125a of the secondary fold actuator lever 125 and the cam surface 127. Here, movement of the cam surface 127 relative to the secondary fold actuator lever 125, as the foldable chassis 9 folds, causes the first end 125a of the secondary fold actuator lever 125 to move further into the joint housing 111 (i.e. away from the mounting portion 115), causing the secondary fold actuator lever 125 to pivot about its pivot point 125b, which is located between the first end 125A and a second end 125c of the secondary fold actuator lever 125, such that the second end 125c of the secondary fold actuator lever 125 moves towards and ultimately protrudes through the aperture 117 formed in the joint housing 111 (see FIGS. 9C and 9D), to press the bassinet unlock button 53 in the bassinet joint 15. The bassinet 7 is then released from its unfolded condition, as discussed above, and automatically collapses into its folded condition by gravity acting to pull the (now unlocked) upper frame 29 downward (see FIG. 3D).

It will be noted that the movement of the secondary fold actuator lever 125 results from the folding movement of the rear frame portion 61 (and the rear wheels 81 mounted to the rear frame portion 61), as it swings forward under gravity. As the rear frame portion 61 and rear wheels 81 are relatively heavy, a significant motive force is therefore transmitted to the secondary fold actuator lever 125 via the cam surface 127, readily overcoming any friction between the cam surface 127 and the secondary fold actuator lever 125 and providing a firm and reliable actuation of the bassinet unlock button 53.

To complete the folding process, the user applies further downward pressure on the telescopic handle 11, resulting in the stroller 1 adopting its fully folded condition as shown in FIG. 3E, ready e.g. for convenient transport or storage of the folded package. In the present embodiment, the stroller 1 is stabilized in its folded condition by the forward ends of the telescopic handle 11, which protrude through apertures in the lower side of the folded foldable chassis 9 to support the stroller 1 on the floor (or other support) surface, in tandem with the rear wheels 81 of the stroller 1.

It will therefore be understood that, in the present embodiment, a user need only perform the following actions to fully collapse the stroller 1, including the foldable chassis 9 and the bassinet 7 mounted on the foldable chassis 9: (i) actuate the primary and secondary buttons 93, 95 of the button housing 87 to release the handle 11 (ii) depress the handle 11 while tilting the stroller 1 forward, causing both foldable chassis 9 and bassinet 7 to fold under gravity and iii) continue to press downwardly on the handle 11 until it is fully collapsed. As discussed further below, similar considerations apply also to the collapse of the stroller when in the "seat facing world" or "seat facing parent" configurations.

According to this process, it is not necessary to remove the bassinet 7 (or seat 5) from the foldable chassis 9 before folding. And, folding of the foldable chassis 9 and bassinet 7 (or seat 5) is performed in a single, linked operation, rather than two separate ones. Hence, the problems associated with the prior art discussed in the "Background" section above are overcome.

Additionally, the present embodiment is further convenient as a user may simply and readily perform each of the three operations i) to iii) discussed above (and thus fully collapse the stroller 1, from any of the three configurations shown in FIG. 1) by grasping the handle 11 and operating the button housing 87 with a single hand, leaving the other hand of the user free e.g. to hold the hand of a child previously the passenger of the stroller 1.

The stroller 1 of the present embodiment additionally includes releasable locking mechanisms associated with both the handle 11 and the foldable chassis 9 which advantageously retain the stroller 1 in its folded condition until a user wants to unfold it. The present embodiment also includes a handle locking mechanism to ensure that the handle 11 is prevented from full collapse until an appropriate time in the folding process. The latter handle locking mechanism is more relevant to the stroller with (forward/reverse facing) seat configurations, and hence is described further below in connection with those configurations. For now, the releasable locking mechanisms used to retain the stroller 1 in its folded condition are described in the following.

Figure 14A:
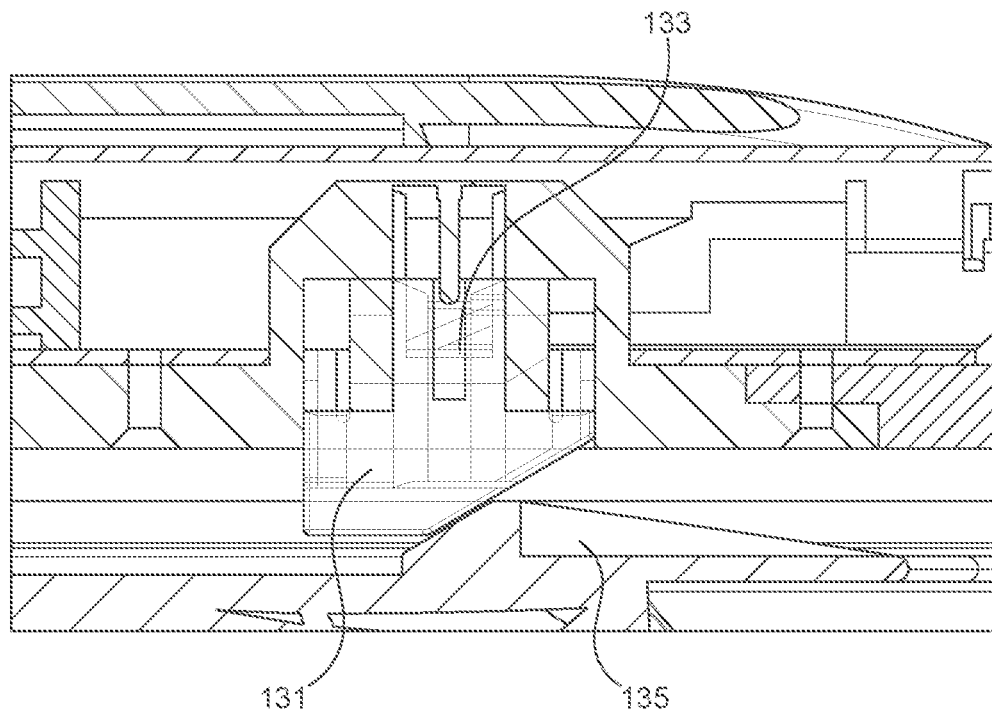
FIGS. 14A and 14B show a handle locking mechanism of the stroller of FIG. 1.
Figure 14B:
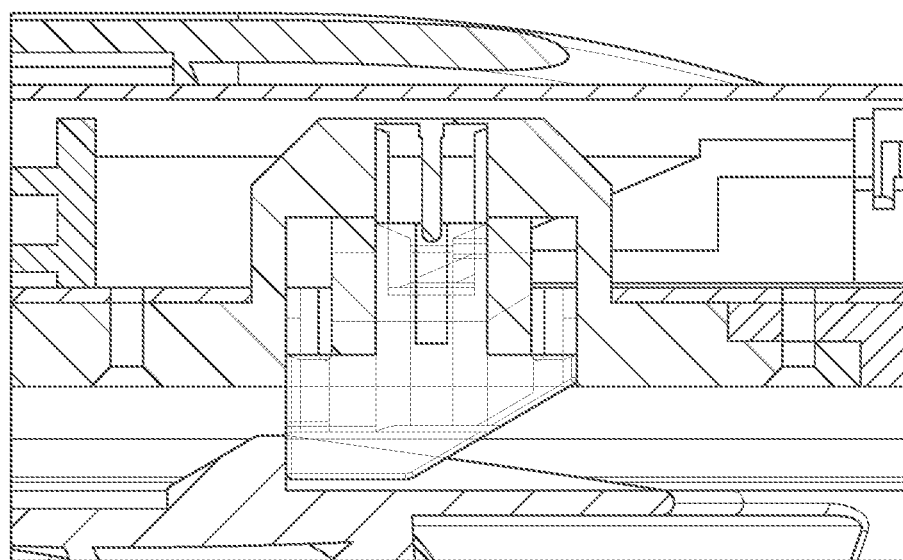

Firstly, and with reference to FIG. 14A, each of the handle locking mechanisms 101 provided within the handle 11 further comprises a handle locking tab 131 mounted on the (slidable) inner tube 85 of the handle 11. The handle locking tab 131 is the same in each case, and hence only one is described here. The handle locking tab 131 is biased to protrude outwardly by spring-loaded resilient element 133. When the handle 11 is slid down to its fully collapsed condition of FIG. 3E, the handle locking tab 131 engages with an end stop indent 135 provided on the (fixed) outer tube side—see FIG. 14B. The handle 11 is now locked in its fully collapsed condition, and the user can conveniently lift and move the folded stroller 1 using the handle 11 in this state, without the stroller 1 unfolding. To release the handle 11 from its locked condition, the user simply need actuate the primary handle adjustment button 93 of the button housing 87, which pulls on the cables (not shown) within the handle 11 and acts to lift the handle locking tab 131 out of engagement with the end stop indent 135, against the bias provided by the spring-loaded resilient element. The user may then extend the handle 11 once more to unfold the stroller 1 (the full unfolding process is further discussed below).

Secondly, and initially with reference to FIG. 12B, it will be noted that in addition to the unfolded condition locking indent 123a at its upper end, the locking beam track 123 also includes a pair of folded condition locking indents 123b, 123c at its lower end. The first of these (123b) is slightly higher up the track 123 than the second, and is for use when luggage or articles present in a storage area of the stroller 1 underneath the bassinet/seat prevents the stroller 1 from being placed into its most folded compact condition, which corresponds to the lowest folded condition locking indent 123c. In either case, it will be appreciated that once the protrusion 121b at the upper end of the locking beam 121 has seated in the folded condition locking indent associated with the most compact folded form achievable, the rear frame portion 61 of the foldable chassis 9 is again locked in place relative to the rest of the foldable chassis 9 i.e. the stroller 1 is kept in its most folded condition.

Figure 15C:
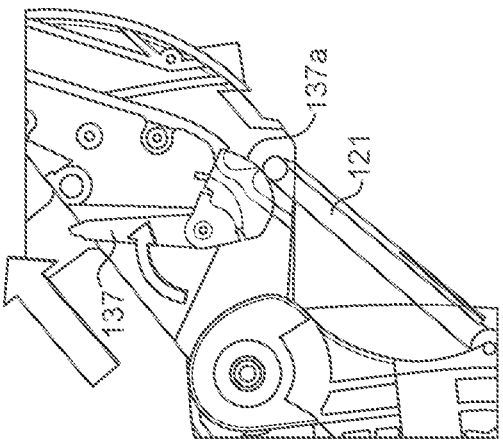
FIGS. 15A to 15C show a further part of the joint of the stroller chassis.
Figure 15B:
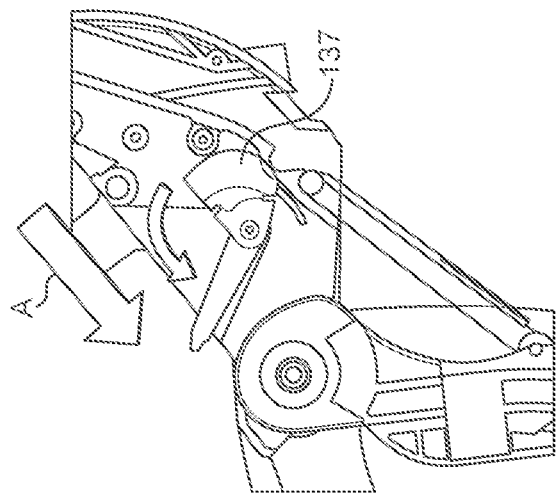
Figure 15A:
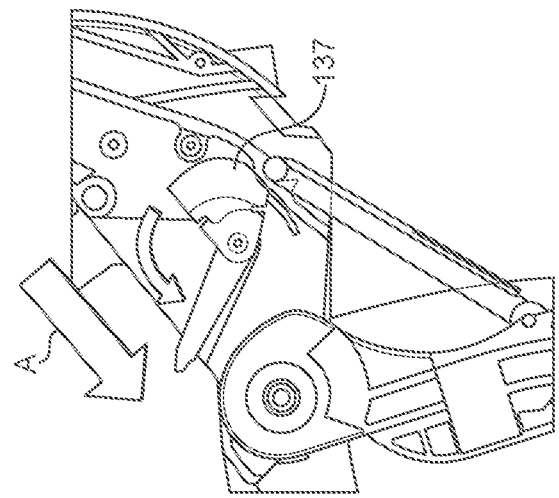

In order to release this engagement, the chassis joint 13 is further provided with a folded chassis release lever 137, shown in the various parts of FIG. 15. When the handle 11 is first moved down in the folding process, in the direction indicated by the arrows "A" in FIGS. 15A and 15B (with the former corresponding to the folded position adopted when luggage on the stroller 1 prevents its further folding, and the latter corresponding to the most compact folded position), the folded chassis release lever 137 is forced to rotate (anticlockwise in the example of FIGS. 15A and B), against the bias of a biasing element (not shown).

Then, and as shown in FIG. 15C, when the handle 11 is again moved upward (after releasing the handlebar locking tab 131, as described above), the folded chassis release lever 137 rotates back to its initial position, under the bias of the biasing element (not shown). In doing so, an outer curved face 137a of the folded chassis release lever 137 contacts the upper end of the locking beam 121, thus unseating it from the folding condition locking indent 123b/123c in which it was previously located when the stroller 1 was folded. The rear frame portion 61 of the foldable chassis 9 is now once more free to move and thus the stroller 1 may be unfolded.

Figure 16C:
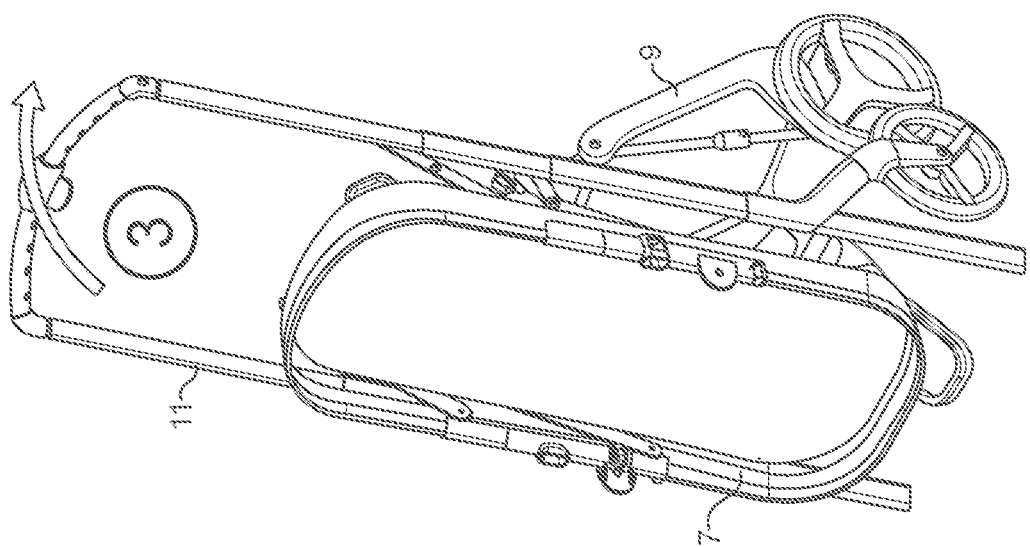
Figure 16B:
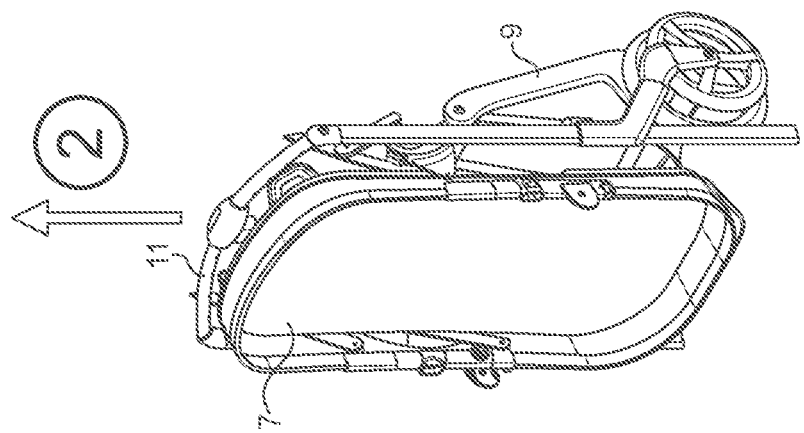
Figure 16A:
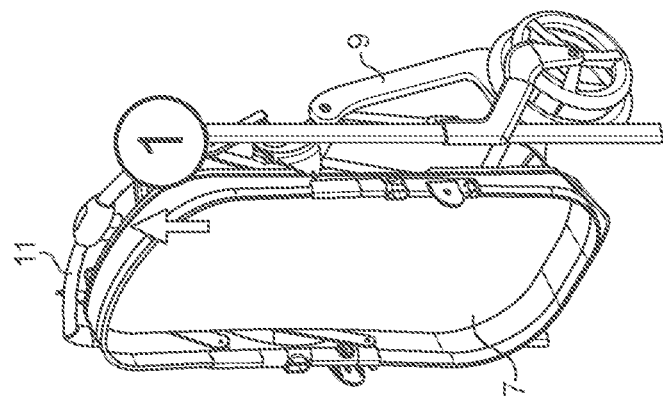

In particular, to unfold the stroller 1, the user reverses the folding process by following the steps shown in FIG. 16, namely:

1. The user actuates the primary and secondary handle adjustment buttons 93, 95 of the button housing 87 (FIG. 16A) to bring the handle locking tab 131 out of engagement with the end stop indent 135, and extends the telescopic handle 11 by pulling upwardly on it (FIG. 16B);
2. The user tilts the stroller 1 rearwardly, causing the front and rear frame portions 59, 61 to separate and unfold (see FIG. 16C). This action causes the locking beam 121 to return back up the locking beam track 123 until it seats once more in the locking condition of FIG. 12(A), such that the foldable chassis 9 is again held in its unfolded condition;
3. The user pulls on the rear part of the upper frame 29 of the bassinet 7 (see arrow in FIG. 16D), until the bassinet 7 is again locked in its unfolded condition by the bassinet locking lever 51; and
4. The user adjusts the telescopic handle 1 to the desired predetermined height, before releasing the primary and secondary handle adjustment buttons 93, 95 to complete the unfolding procedure (FIG. 16E).

The foregoing describes the folding of the bassinet 7 in combination with folding of the foldable chassis 9, but it will be appreciated that the bassinet 7 is usable independently of the foldable chassis 9. For example, a user may disengage the bassinet 7 from the foldable chassis 9 and use it in a nursery or other room, locating the bassinet 7 on the floor or other suitable support surface instead of on the foldable chassis 9.

Figure 6B:
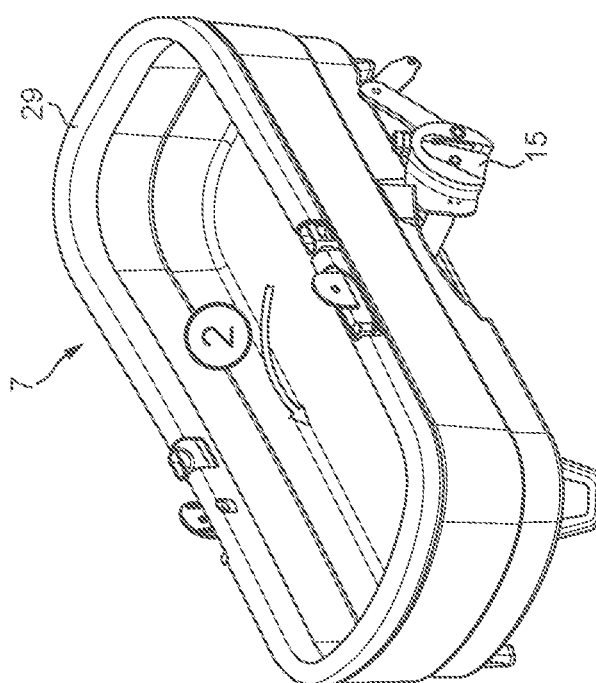
FIGS. 6A to 6C show the process for folding the bassinet independently of the stroller chassis.

The folding process of the bassinet 7, independent of the stroller frame, is now described with reference to FIGS. 6A to 6C.

Figure 6A:
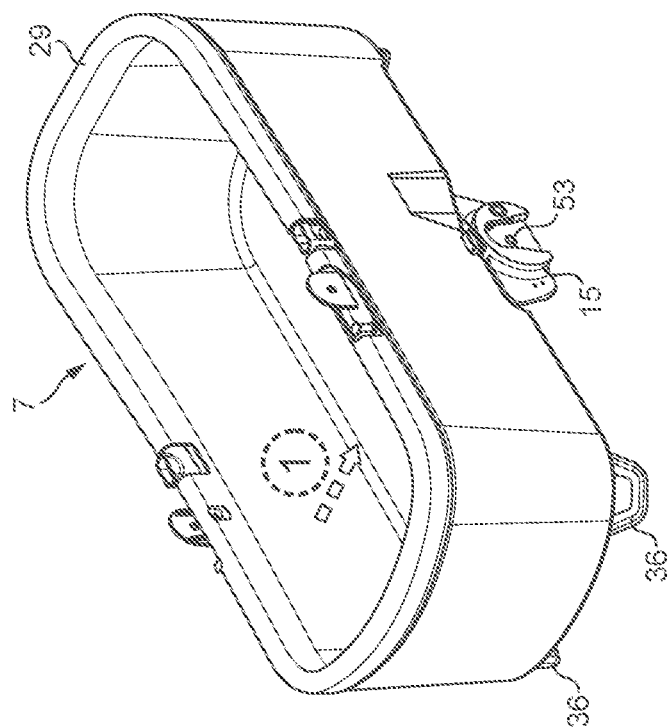
Figure 6C:
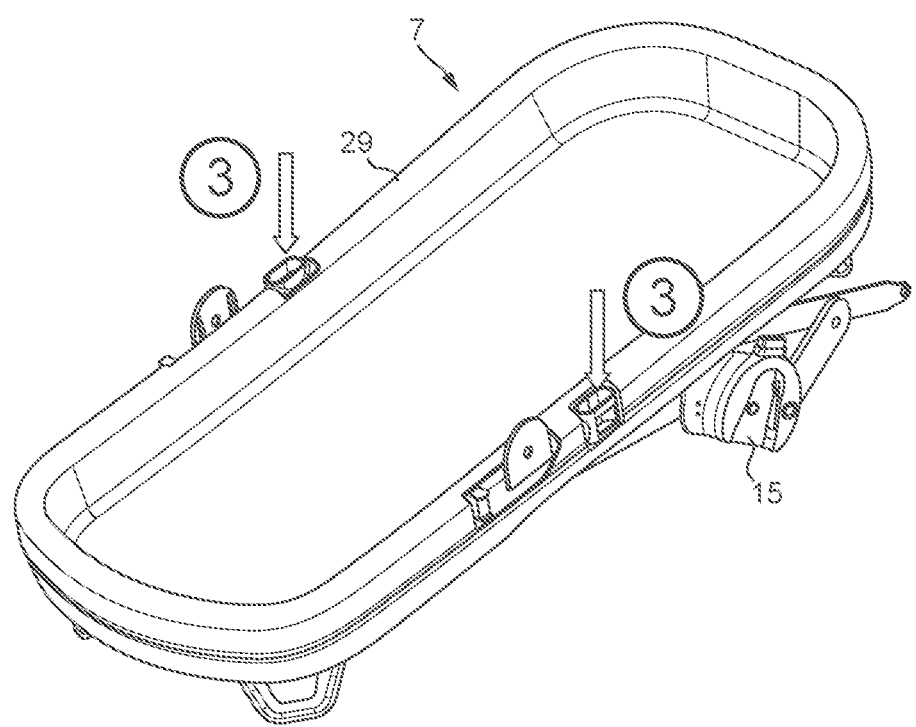

With the bassinet 7 empty, a user first presses the bassinet unlocking button 53 of each bassinet joint 15, using either their fingers or a suitable pressing tool, to release the locking engagement of the bassinet frame 19 and joints 13 (see FIG. 6A). The user then presses downwardly and forwardly on the upper frame 25 (see arrow in FIG. 6B), to encourage the first and second connecting arm pairs 31, 33 of the bassinet frame 19 to start to pivot. Continued vertical downward pressure on the upper frame 29 (see arrow in FIG. 6C) collapses the bassinet 7 entirely, with the bassinet joints 15 sliding rearwardly to absorb longitudinal movement of the pivoting connecting arms 31, as described above, to allow the upper frame 29 to collapse directly downward onto the base frame 25 and provide a compact folded footprint. Here, it will be noted that the feet 36 on the underside of the base frame provide sufficient ground clearance for the joints 15 and pivoting connecting arms 31, 33 to move freely throughout the fold process, without touching the floor surface (or other support surface e.g. table top).

To unfold the bassinet 7, a user need simply lift the upper frame 29, causing the joints 15 and first and second connecting arm pairs 31, 33 to move back towards their initial positions, until the bassinet locking lever 51 of each joint re-engages with its corresponding second connecting arm, preferably with an audible "click", to hold the bassinet 7 in its unfolded condition once more.

It will further be appreciated that the bassinet aspect of the present invention, and therefore its compact folded footprint benefits, may equally be applied to bassinets which are not adapted to be mounted on strollers and are instead solely intended for stand-alone use. Therefore, embodiments of the independent bassinet aspect of the present invention extend beyond stroller-mountable bassinets to stand-alone bassinets not being configured for mounting on a stroller frame or similar.

Having described the stroller with bassinet configuration, the stroller with seat facing world/facing parent configurations will now be described, which similarly may be folded without removing the seat from the chassis frame in a single interconnected process, and in the present embodiment may advantageously be folded with a one-handed user operation.

The various parts of FIGS. 17 and 18 show the stroller 1 being placed into the folded condition from its "seat facing parent" and "seat facing world" configurations, respectively. The folding process is similar to that for the "stroller with bassinet" configuration, in that folding of the foldable chassis 9 of the wheeled chassis 3 results in the secondary fold actuator levers 125 of the frame joints 13 disengaging locking mechanisms within the joints on either side of the seat 5, which in turn enables the seat 5 to fold under gravity as the stroller 1 is tilted forward. Given the similarity in the folding process, the following discussion focusses on the joint of the seat 5, which is shown in the various parts of FIG. 19; as with the bassinet 7, the joints on either side of the seat 5 are identical to each other and hence only one of them will be described.

Figure 19B:
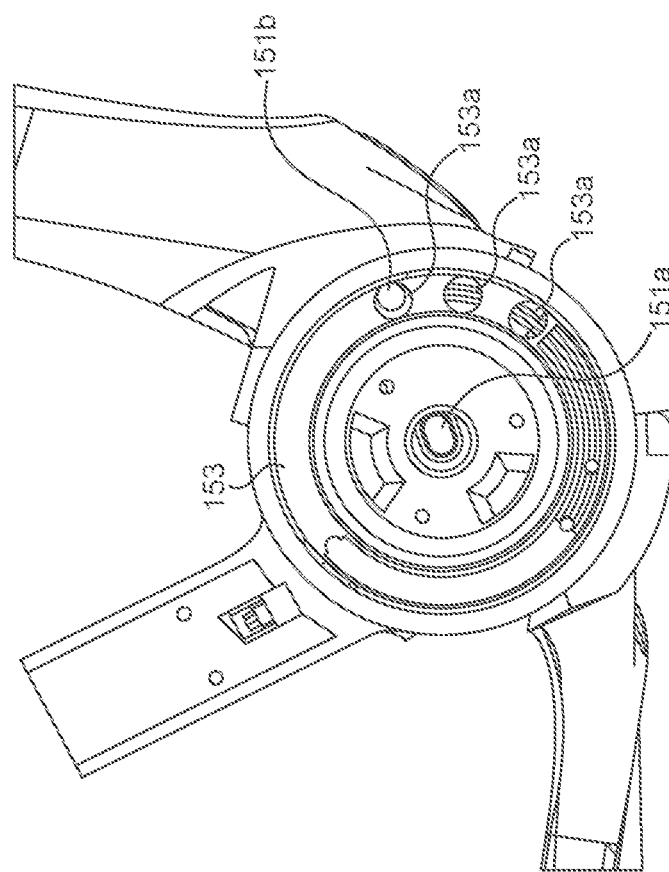
FIGS. 19A to 19C show a joint of a seat of the stroller.
Figure 19A:
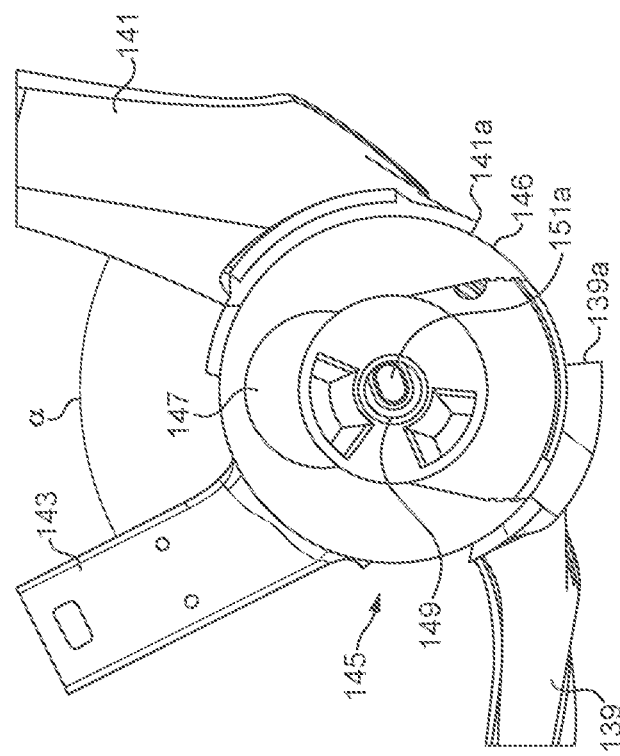

As shown in FIG. 19A, the seat 5 comprises a squab or base frame 139 (of which only the part closest to the joint is shown in the figure), a reclinable seat back frame 141 (of which again only the part closest to the joint is shown in the figure) and a "bumper bar" socket 143, all joined by a central seat joint 145. The seat back frame 141 is releasably engageable with the joint 145, either to rotate around the central seat joint 145 when released to enable the seat 5 to be folded, or to be held in fixed position relative to the seat joint 145 when engaged, so as to place the seat 5 into a fixed upright or reclining position for a child to sit or recline on. The bumper bar socket 143 is initially connected to the seat back frame 141 by a releasable connection (not shown), and so rotates with movement of the seat back frame 141. The base frame 139 is free to rotate around the joint 145, but is supported in its generally horizontal position shown in FIGS. 19A to 19C, when the stroller 1 is unfolded, by resting on the horizontal upper surface 146a of a boss 146 formed on each side of the rear frame portion 61—see FIG. 11A.

A seating portion (whether cushioned surface, netting or similar) is provided on the base frame 139, for the stroller passenger to sit on. The seat back frame 141 similarly mounts a seat back (whether cushioned surface, netting or otherwise) for the stroller passenger to lean back on. The bumper bar socket 143 allows a bumper bar to be removably attached to the seat 5. The bumper bar is omitted in the present figures, for clarity, but an example of a bumper bar 143a is shown mounted to the seat 5 in the various parts of FIGS. 17 and 18. As will be appreciated, this bar 143a provides an element of safety by helping retain a child in the seat 5 (in addition to any seat harnesses (not shown) which may be provided), gives a child a rail to hold on to when the stroller is in use, and further provides a user with an additional handle to assist in manipulating the stroller e.g. when loading the folded stroller into a vehicle after use.

Figure 19C:
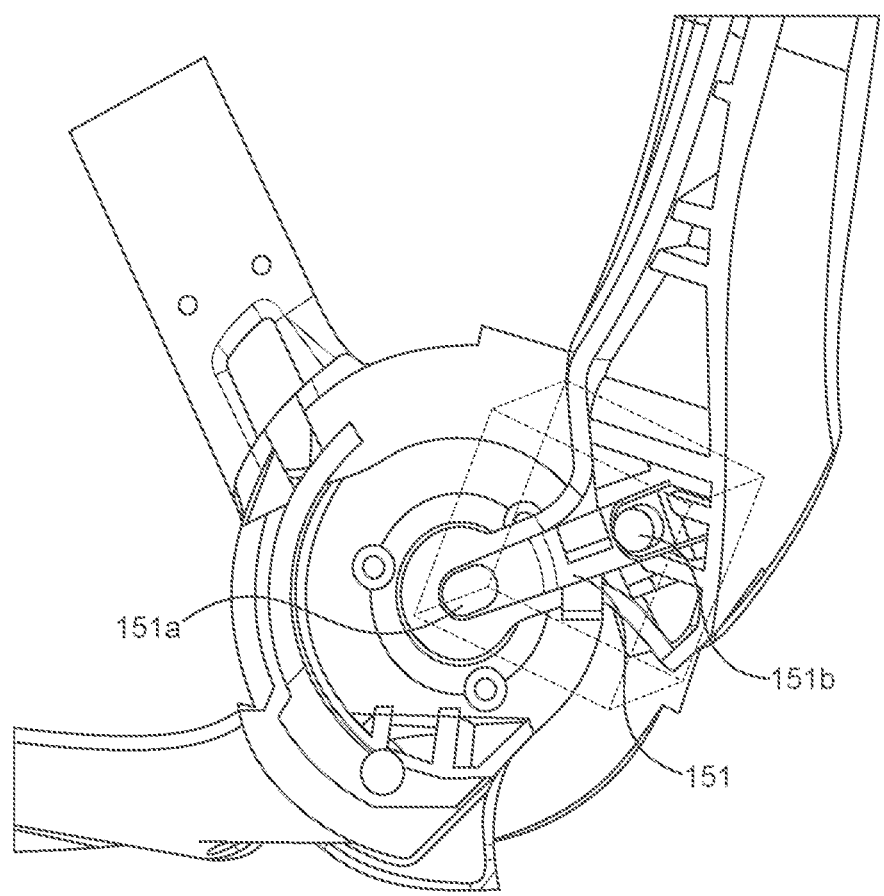

Turning now to the seat joint 145 itself, externally the seat joint 145 comprises a generally cylindrical joint housing 146 having on its circular end face surface a mounting portion 147, which in the present embodiment comprises a generally triangular-shaped recess with a rounded apex uppermost, for co-operation with the mounting portion 115 on the corresponding joint 13 of the foldable chassis 9 to mount the seat 5 on the foldable chassis 9. An aperture 149 is located at the center of the circular end face of the joint housing 146. As further explained below, this enables the secondary fold actuator lever 125 of the foldable chassis joint 13 to contact a first end 151a of a seat locking element 151 located within the seat joint 145 and thus release the seat 5 for folding. The seat locking element 151 is shown in FIG. 19C, and is further provided with a protrusion at its second end 151b, for selective engagement with any one of a plurality of apertures 153a of a seat recline position selector 153 (see FIG. 19B) fixedly mounted within the seat joint 145.

Each of the apertures 153a of the seat recline position selector 153 corresponds to a predetermined recline position of the seat back 141. In normal usage of the unfolded stroller 1, the engagement between the protrusion 151b and the seat recline position selector 153 holds the seat back 141 in fixed position relative to the joint 145, at one of the predetermined recline positions. A handle (not shown) is provided at the top of the seat back frame 141, and is connected to the second end of the seat locking element 151 by a cable (not shown). To adjust the recline position of the seat back, a user simply pulls on the handle to disengage the protrusion 151b from the aperture 153a in the seat recline position selector 153; the seat back may then be rotated relative to the joint 145 to another of the predetermined seat back recline positions, where the protrusion 151b will engage once more with the seat recline position selector 153 at the aperture 153b corresponding to the new seat back position.

As noted above, the secondary fold actuator lever 125 of the chassis joint 13 is able to contact the first end 151a of the seat locking element 151 via the aperture 149. This contact also releases the seat back frame 141 to rotate around the seat joint 145 as part of the seat folding process, as pressing the first end 151a of the seat locking element 151 causes the seat locking element 151 as a whole to move inwardly of the joint housing 146, thus disengaging the protrusion from the seat recline position selector 153. The seat locking element 151 and the seat recline position selector 153 may therefore together be considered as a seat joint locking mechanism.

Advantageously, the aperture 149 and the first end of the seat locking element 151 are centrally located on the end face of the joint housing 146. This means that the seat locking element 151 can simply and readily be actuated by the secondary fold actuator lever 125 of the chassis joint 13, regardless of whether the seat 5 is "facing world" or "facing parent"—in either case, the location at which the secondary fold actuator lever 125 of the chassis joint 13 needs to contact the seat joint 145 is the same (i.e. at the center of the seat joint 145). Hence, the actuation mechanism is kept simple, without need for different actuation processes depending upon the seat orientation.

As noted above, the stroller folding process is similar, mutatis mutandis, to that for the bassinet configuration—by suitably manipulating the buttons 93, 95 of the button housing 87, a user starts to collapse the stroller frame handle 11 with the chassis fold tabs 107 protruding outwardly from the inner tubes 85 of the handle 11, which in turn actuates the chassis unlocking levers 119 of each chassis joint 13 (see FIGS. 11A and 11B) to unseat the locking beam 121 from the unfolded condition locking indent 123a, thus releasing the rear frame portion 61 from its fixed position relative to the telescopic handle 11 and front frame portion 59. The user now simply lifts the rear end of the stroller frame using the handle 11, tilting the stroller 1 forward and causing the (unlocked) rear frame portion 61 to swing forward under gravity, towards the front frame portion 59, such that the foldable chassis 9 starts to fold, with the self stand 69 adopting its extended condition and replacing the front wheels 71 as the load bearing element at the front of the stroller 1, such that the front wheels 71 automatically adopt their aligned positions under gravity as described above, to facilitate folding. And, the folding of the rear frame portion 61 towards the front frame portion 59 again causes the secondary fold actuator lever 125 to move, as governed by contact between the first end of the secondary fold actuator lever 125 and the cam surface 127 on the rear frame portion 61, such that the second end of the secondary fold actuator lever 125 moves towards and ultimately protrudes through the aperture 117 formed in the joint housing 111, this time to press the first end 151a of the seat locking element 151 and thus release the seat back frame 141 to rotate freely around the joint under gravity, as the stroller 1 is tilted forward by the user. When released, the seat back frame 141 is free to rotate both clockwise and anticlockwise around the joint 145. Therefore, in the "facing parent" configuration of FIG. 17, the reclined seat back falls back (see FIGS. 17C to 17I) to adopt a generally downwardly facing condition in the folded stroller (see FIG. 17J). In the "facing world" configuration of FIG. 18, the reclined seat back rotates forward, again to adopt a generally downwardly facing condition in the folded stroller.

As noted above, a releasable connection (not shown) is initially present between the bumper bar socket 143 and the seat back frame 141, meaning that the bumper bar socket 143 (and hence the bumper bar mounted in the socket) initially rotates around the seat joint 145 together with the seat back frame 141. This releasable connection is released (e.g. by a projection, not shown) when the seat back frame 141 is close to its final downward facing position, meaning that the bumper bar socket 143 can then rotate further around the seat joint 145, relative to the seat back frame 141, to adopt a position closer to the seat back frame 141 (i.e. reducing the angle α shown in FIG. 19A), reducing the dimensions of the folded seat still further.

Figure 18B:
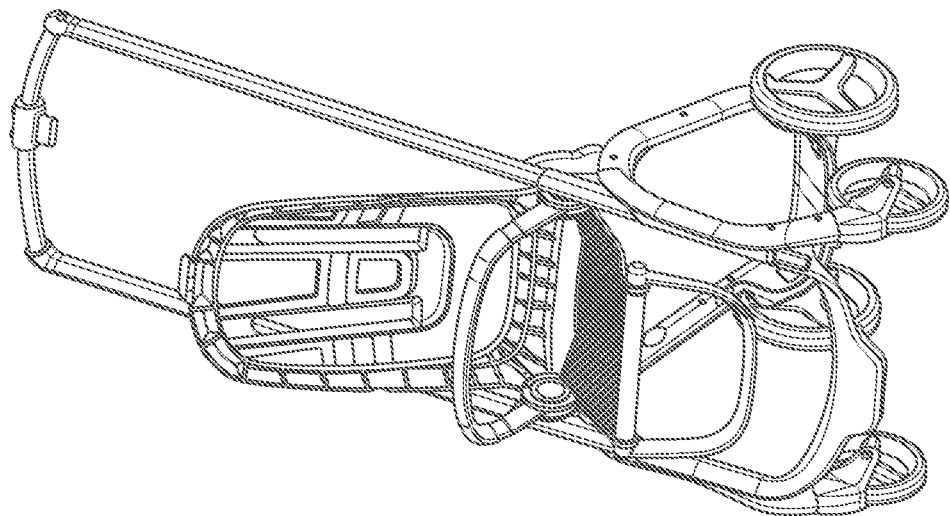
FIGS. 18A to 18H show the process for folding the stroller configuration of FIG. 1A.
Figure 18A:
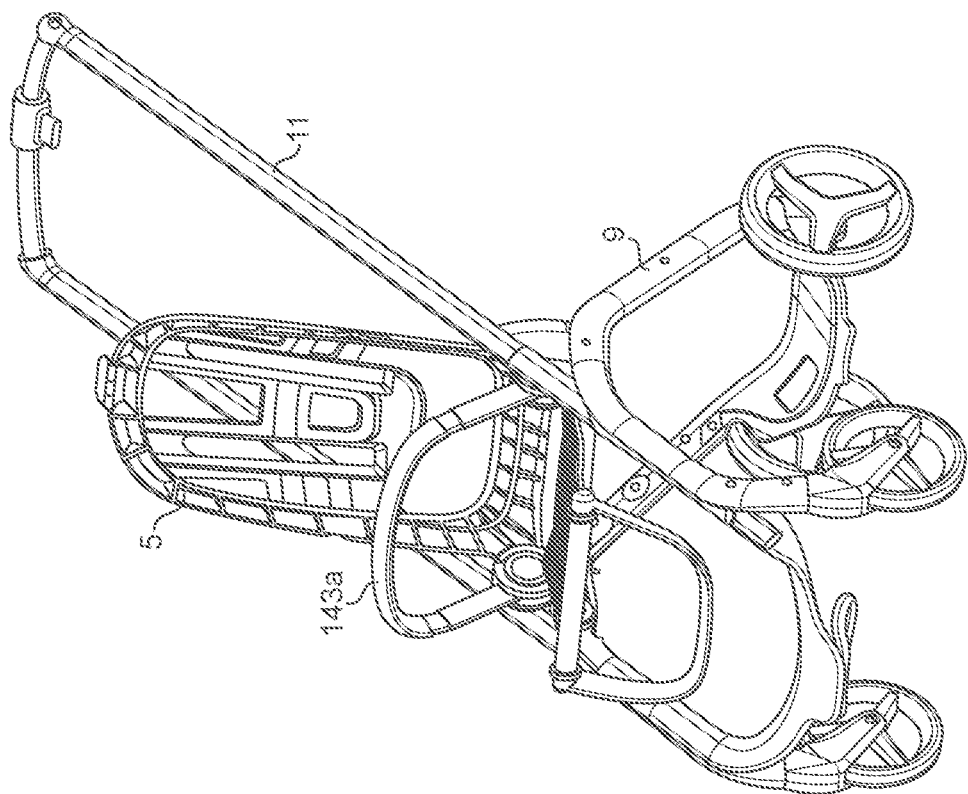
Figure 18D:
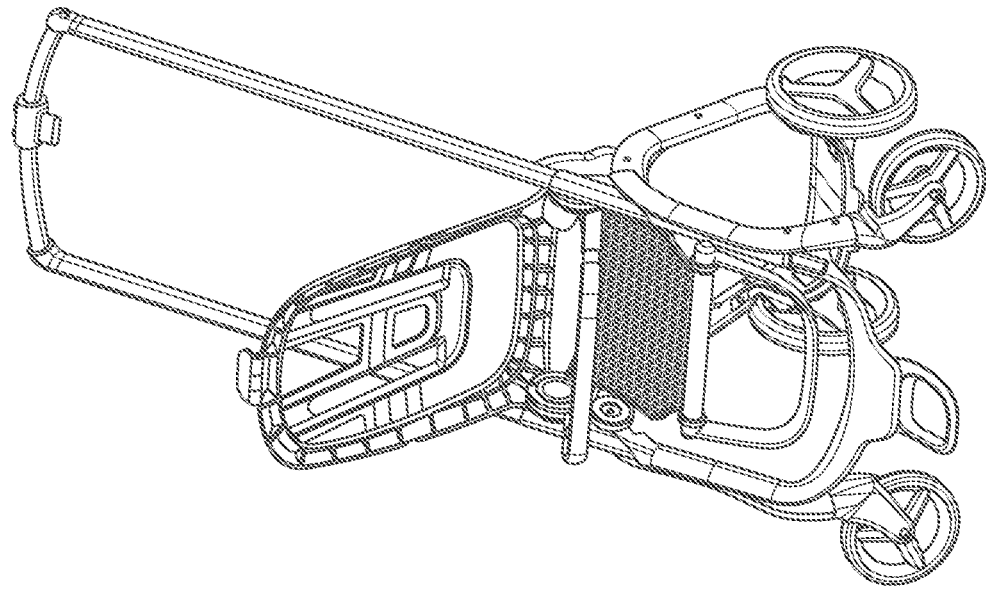
Figure 18C:
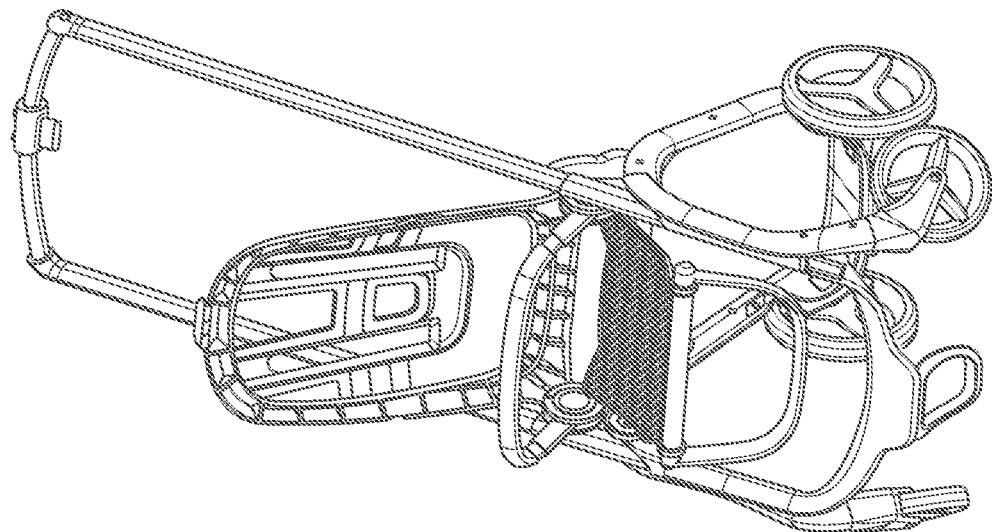
Figure 18F:
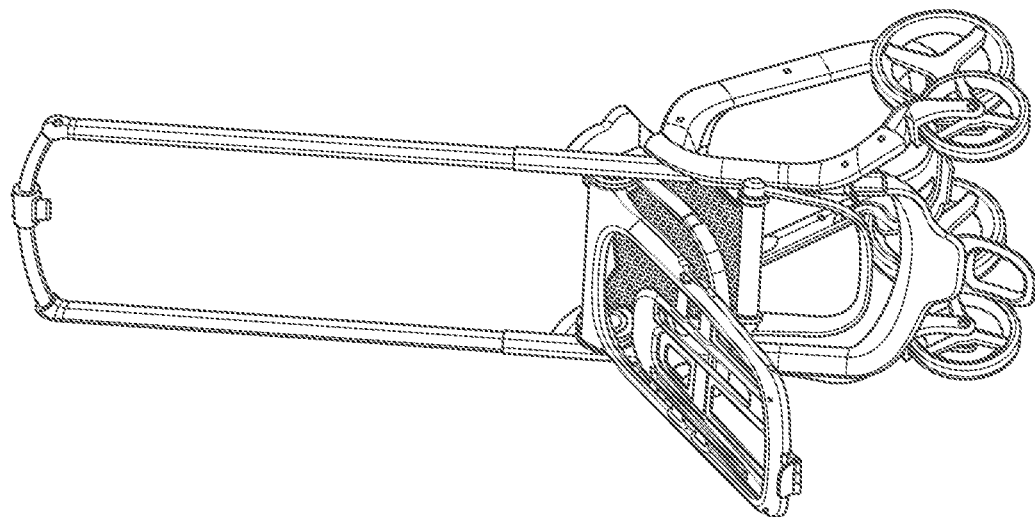
Figure 18E:
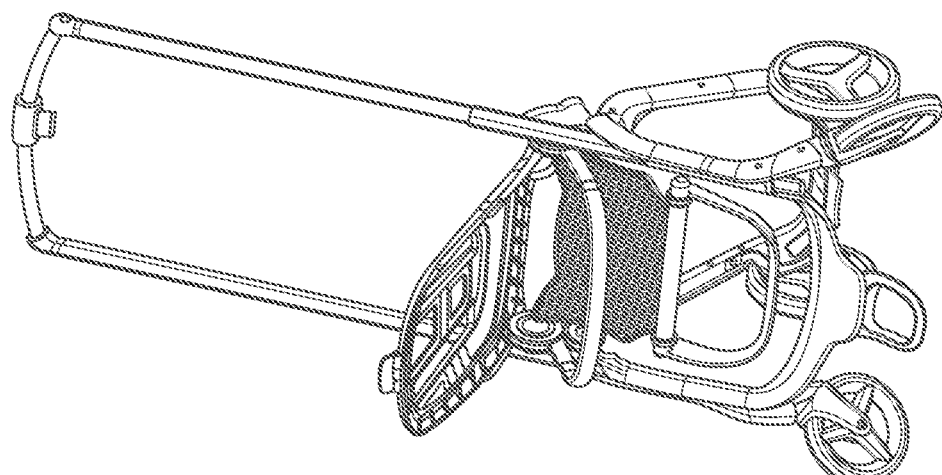
Figure 18H:
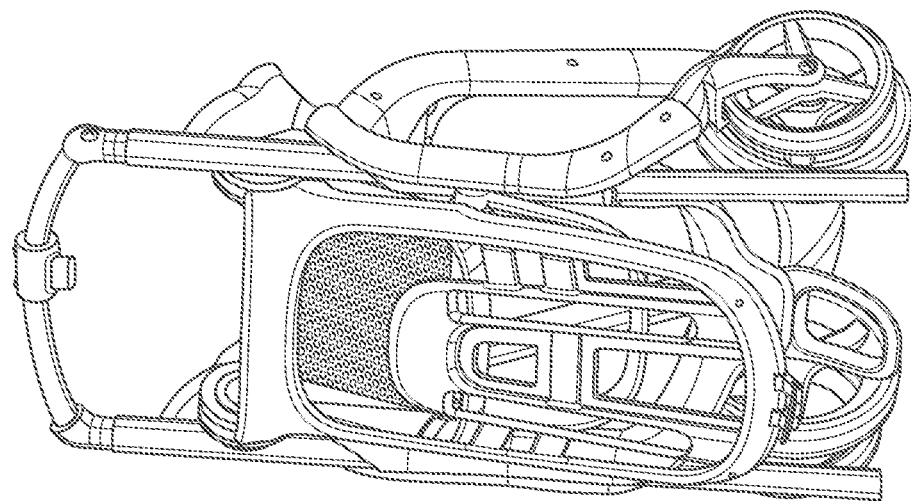
Figure 18G:
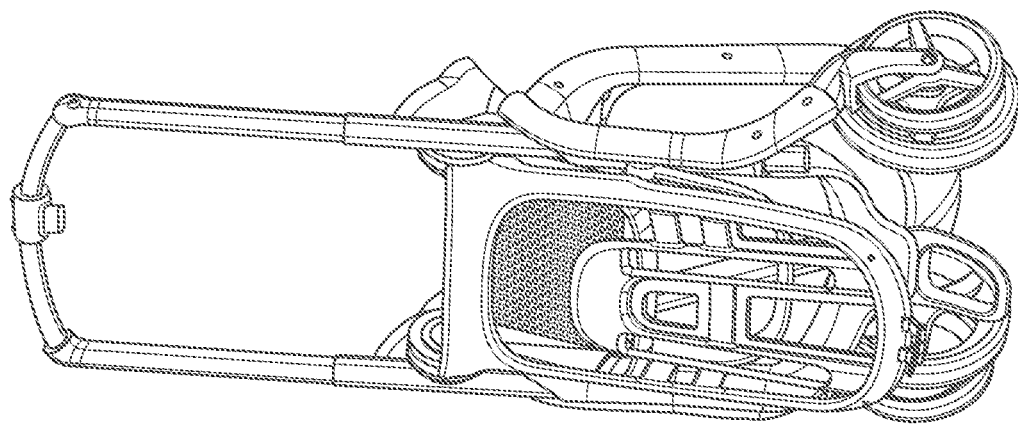

As for the seat base 139, from the "seat facing world" configuration shown in FIG. 18A, the folding movement of the rear frame portion 61 means that the upper surface 146a of the boss 146, which initially supports the seat base frame 139 to be horizontal (see FIG. 12A), moves downwardly (see FIG. 12B), allowing the seat base frame to rotate around the joint to eventually point generally vertically downward, as shown in FIG. 18H.

Figure 17A:
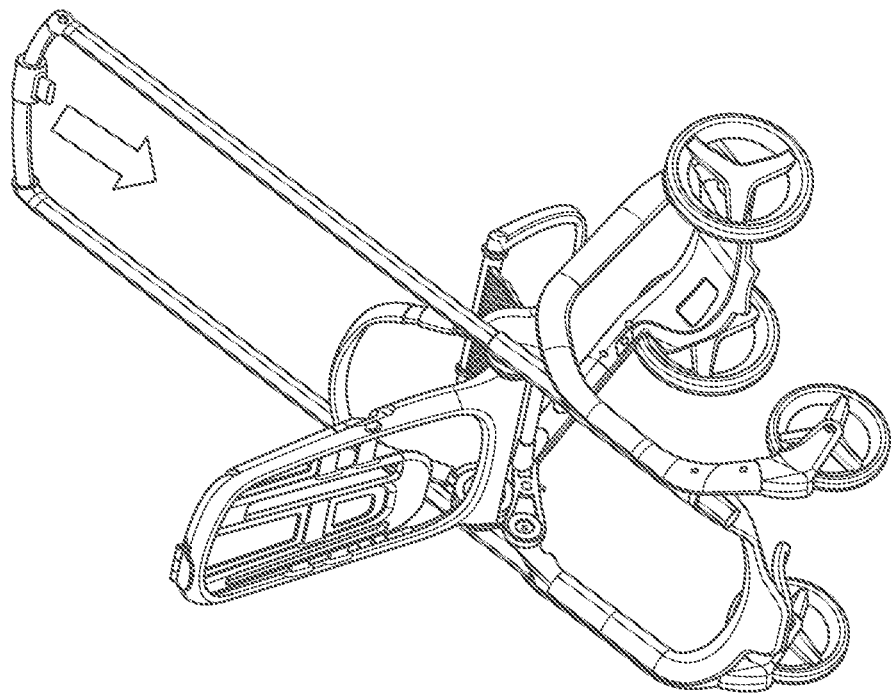
FIGS. 17A TO 17J show the process for folding the stroller configuration of FIG. 1B.
Figure 17B:
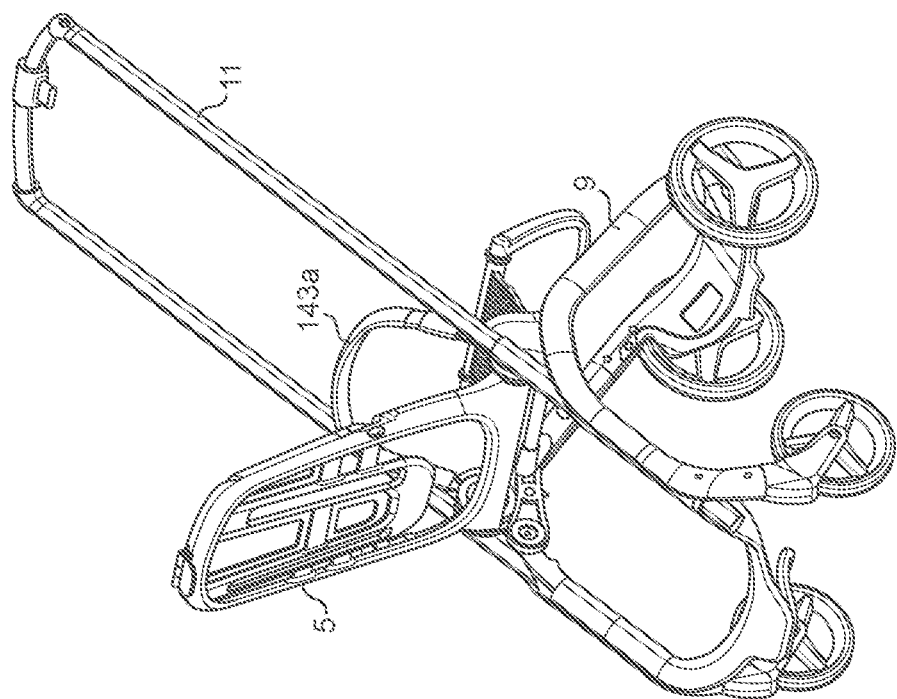
Figure 17D:
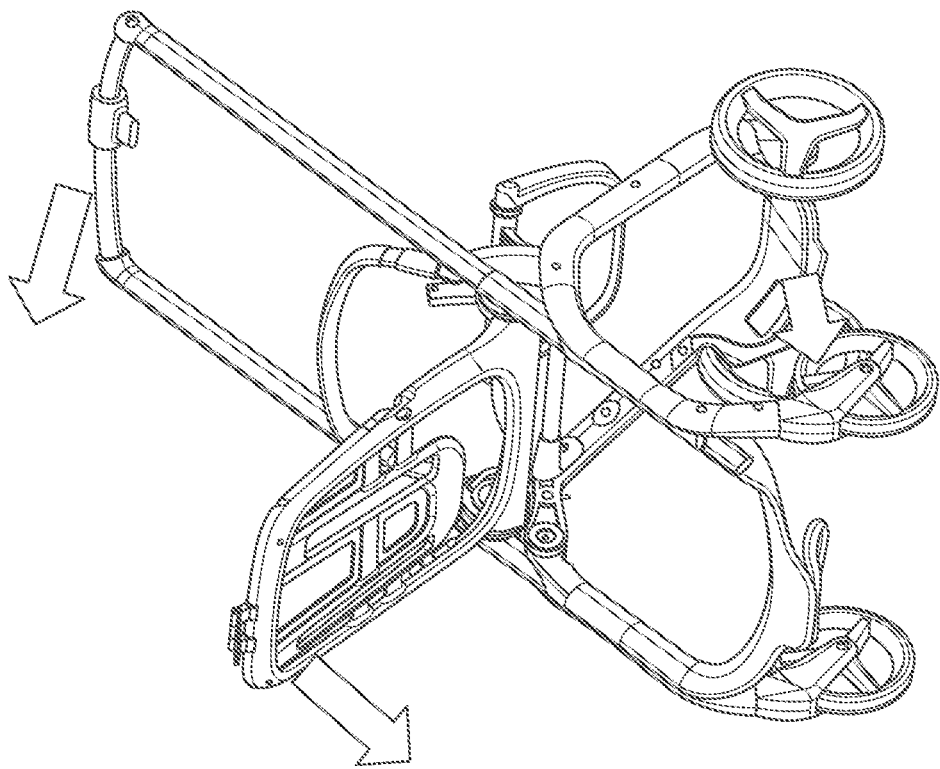
Figure 17C:
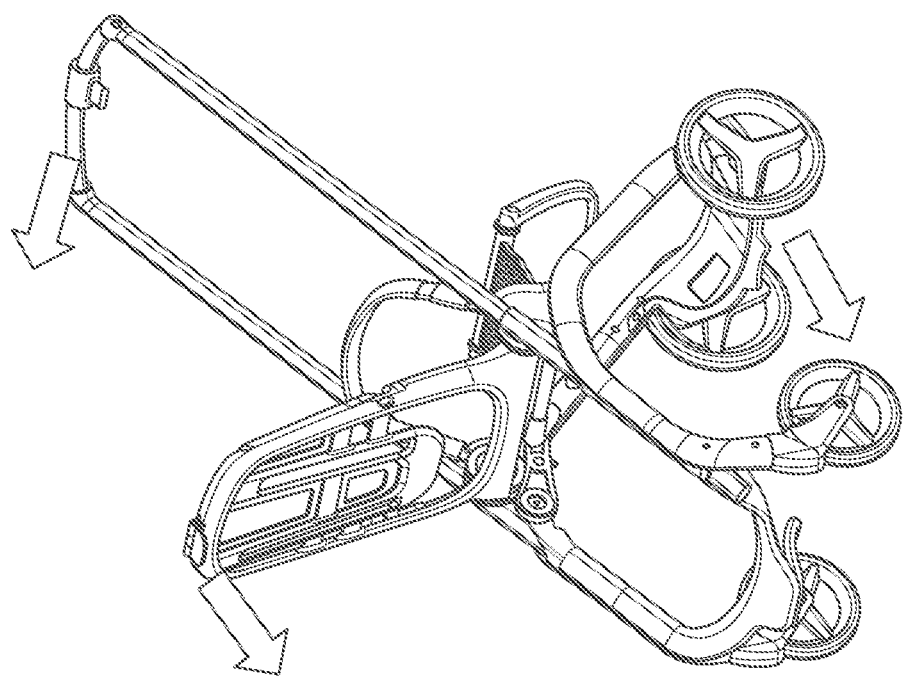
Figure 17F:
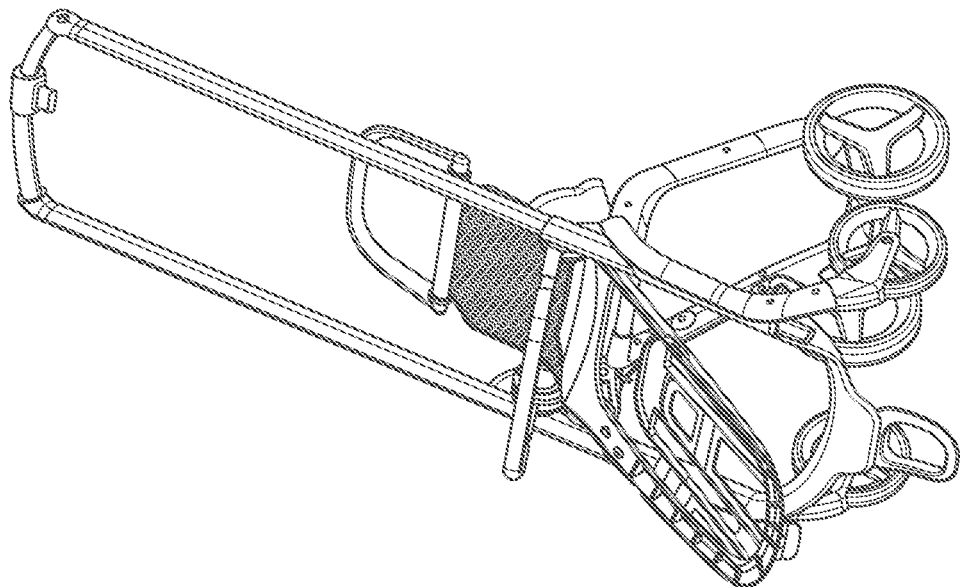
Figure 17E:
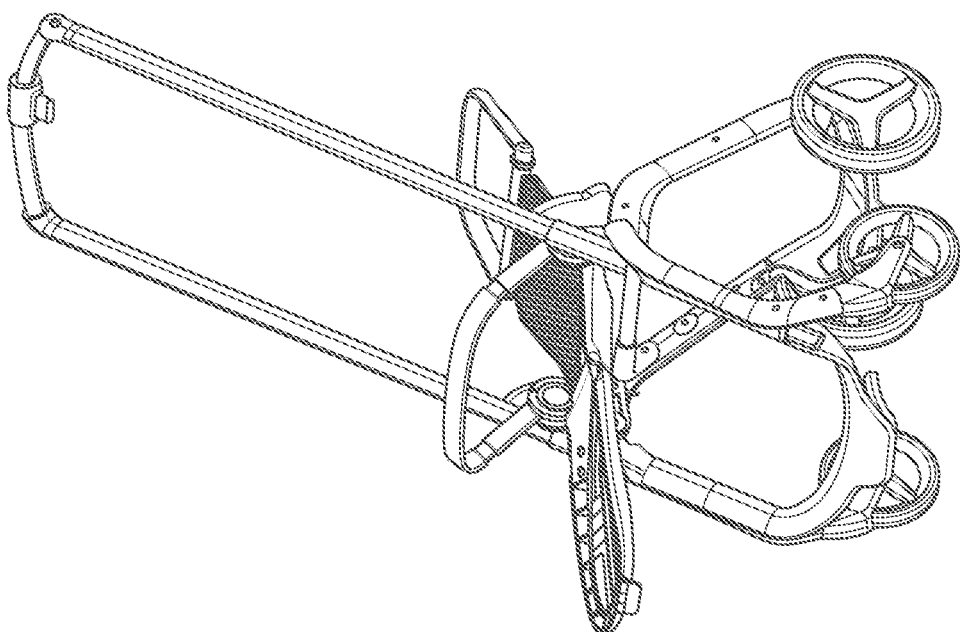
Figure 17H:
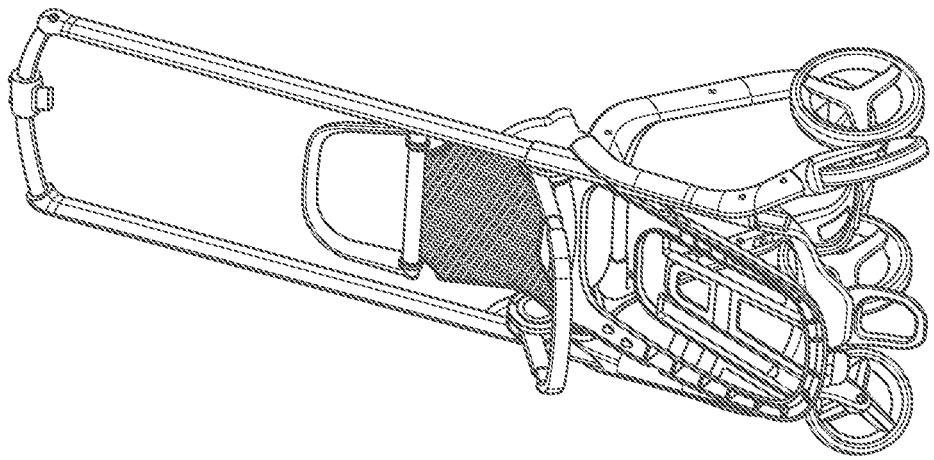
Figure 17G:
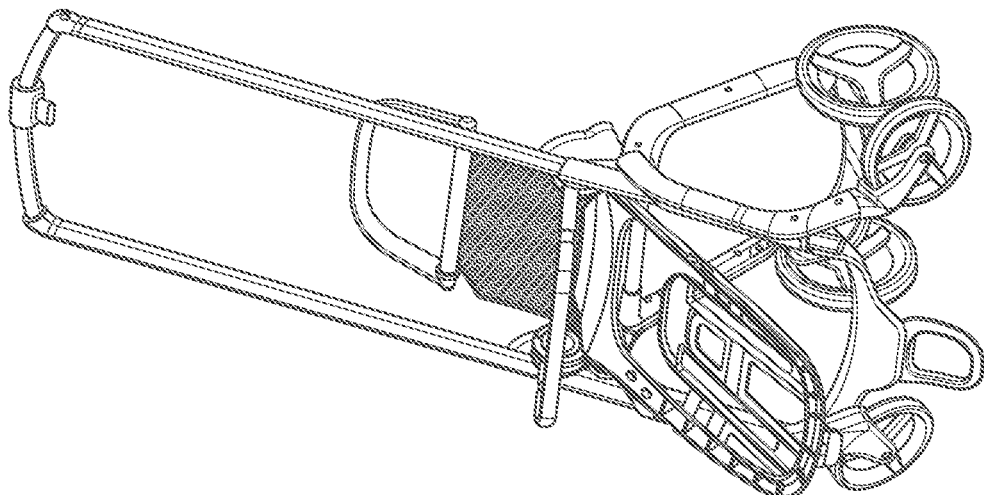
Figure 17I:
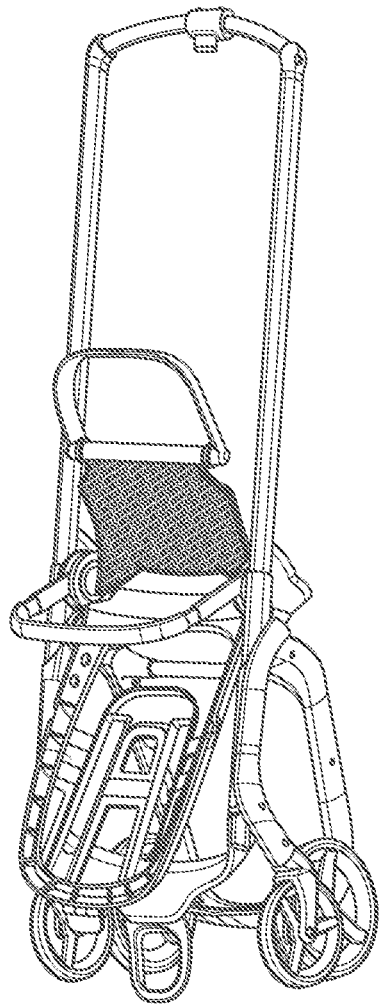
Figure 17J:
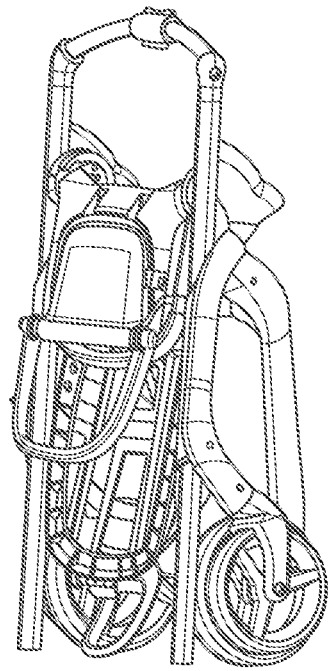

From the "seat facing parent" configuration of FIG. 17, rotation of the seat back frame 141 causes a leading edge 141a of the seat back frame adjacent the joint to strike a corresponding part 139a of the seat base frame (see FIG. 19A), with this impact resulting in the seat base frame rotating around the joint in the same rotational direction as the seat back frame 141, to adopt its folded condition of FIG. 17J.

It will therefore in general be appreciated that the foldable stroller 1 may also be conveniently folded by a user from either of its "seat facing parent" or "seat facing world" configurations, without need to remove the seat 5 from the foldable chassis frame 9 and without the user having to perform separate folding operations for the foldable chassis frame 9 and the seat 5. Again, the stroller 1 of the present embodiment is further beneficial in that it may be placed into its folded condition with a simple one-handed operation from the user, leaving their other hand free e.g. to hold the hand of a child previously the passenger of the stroller 1.

As noted above, the present embodiment further includes a handle locking mechanism to ensure that the handle 11 is prevented from full collapse until an appropriate time in the stroller folding process. In particular, when folding from "seat facing parent" configuration, the seat base frame 139 and bumper bar carried by the bumper bar socket 143 rotate around the seat joint 145 to move from one side of the handle 11 to the other, passing under the cross bar 89 of the handle 11 as they do so (see FIGS. 17E to 17I). The handle locking mechanism is primarily intended to prohibit the handle 11 from interfering with this rotation of the seat back 141 or seat base 139 i.e. to avoid trapping the seat back or base on the "wrong" side of the handle 11, before they have adopted their fully folded conditions. It will however be appreciated that this mechanism may also be useful e.g. in preventing interference between the handle and the folding bassinet 7, particularly where the bassinet 7 has high side walls.

Figure 20D:
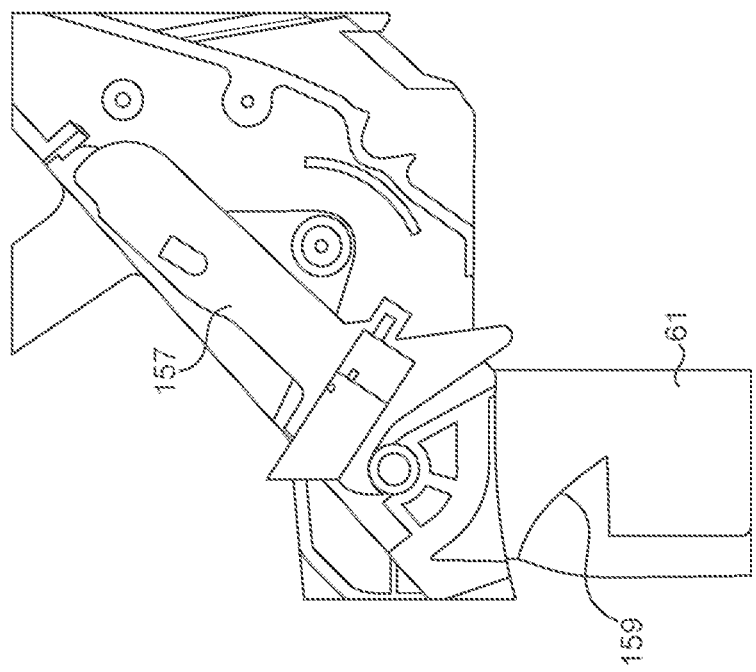
Figure 20C:
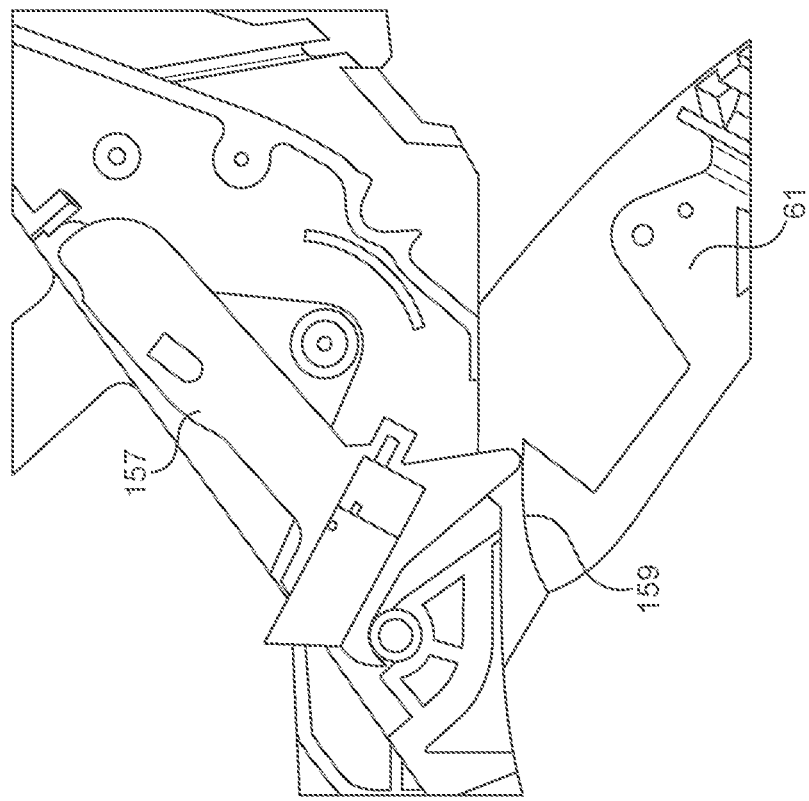

Referring to the various parts of FIG. 20, the handle locking mechanism is shown generally at 155 and comprises a generally "T"-shaped movable handlebar locking element 157 which is pivotally mounted to the chassis frame joint 13 at a first end 157a and has a blocking protrusion 157b and a contact protrusion 157c at opposed extremities of its second end. The contact protrusion 157c rides on a curved surface 159 formed on the rear frame portion 61. When the foldable chassis 9 is in its unfolded condition, contact between the contact protrusion 157c and the curved surface 159 causes the blocking protrusion 157b to protrude upwardly from the chassis joint 13 (see FIG. 20A), preventing the inner tube 85 of the handle 11 from moving further forward of the blocking protrusion 157b and therefore restricting the degree to which the handle 11 may be telescopically collapsed. Subsequent movement of the rear frame portion 61 (when the foldable chassis 9 is being folded) causes the blocking protrusion 157b to move increasingly downward, as a result of the contact protrusion 157c riding on the curved surface 159, until such time as the blocking protrusion 157b no longer protrudes upwardly of the chassis joint 13, thus releasing the handle 11 to fully collapse. By this time, however, the foldable chassis 9 is itself nearly or fully in its folded condition, meaning that the seat 5 (or bassinet 7) supported on the foldable chassis 9 can also be assumed to be nearly or fully in its folded condition. Hence, full collapse of the handle 11 (which could otherwise interfere with folding of the seat 5 or bassinet 7) it prevented until an appropriate point in the folding process.

A luggage aspect of the present invention will now be described. As shown in the various parts of FIG. 21, the wheeled chassis 3 of the above embodiment includes a luggage storage area 161 underneath the seat/bassinet mounting point (seat and bassinet omitted in FIG. 21 for clarity of illustration of luggage storage area). In the present embodiment, the luggage storage area 161 comprises a generally horizontal support surface 161*a* on which luggage or other items may be placed and two lateral side walls 161*b* to help retain the luggage/items on the support surface 161*a*, all extending between the front and rear frame portions 59, 61 of the foldable chassis 9 at a position below the seat/bassinet mounting point. In the present embodiment, the transverse strut 79 of the rear frame portion 61 also helps retain items on the support surface 161*a*, and hence also forms part of the luggage storage area 161. The luggage storage area 161 is foldable in sympathy with the foldable chassis 9. In the present embodiment, this is achieved by forming the horizontal support surface 161*a* and lateral side walls 161*b* of the luggage storage area 161 from a flexible material e.g. foldable cloth fabric or netting, although other examples are possible e.g. the luggage storage area 161 may comprise suitably hinged panels, so as not to interfere with the folding of the foldable chassis 9.

Figure 21B:
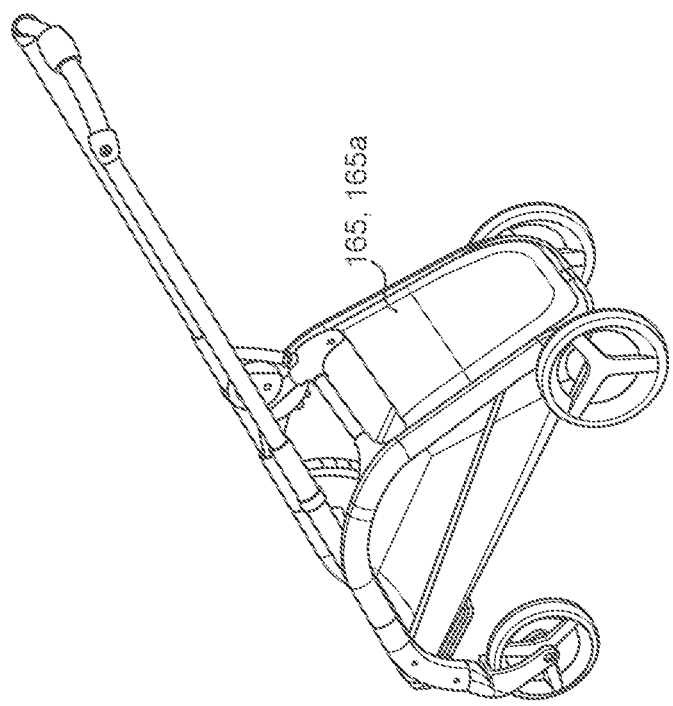
FIGS. 21A to 21D show an embodiment of a luggage aspect of the present invention.
Figure 21A:
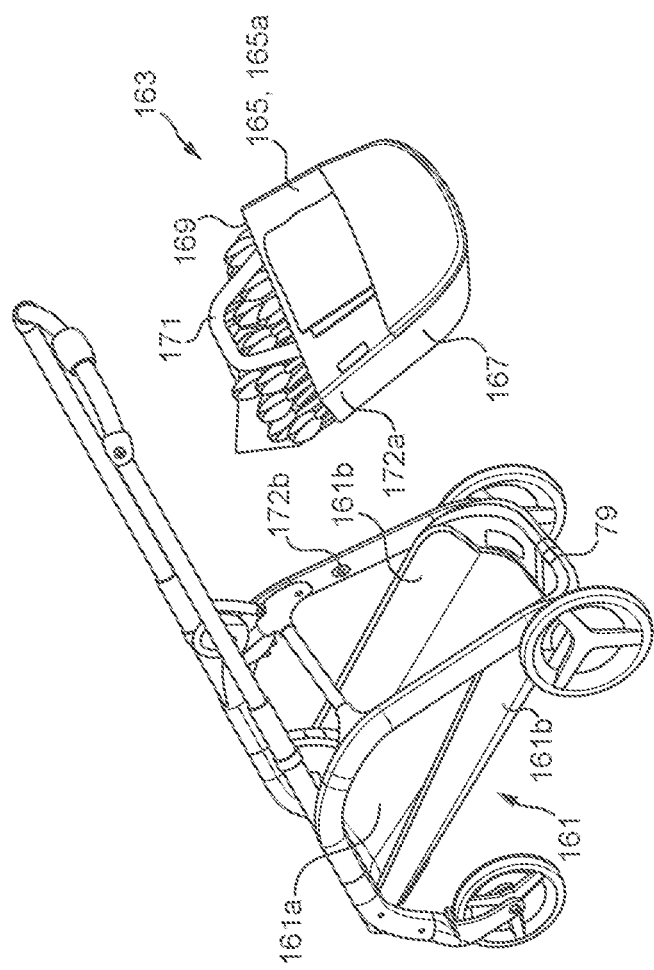

Shown also in FIG. 21A is a luggage item 163 configured for placement on the luggage storage area 161 and which in the present embodiment takes the form of a bag. The bag 163 has front and rear panels 165, side panels 167 and one or more openings 169 to provide one or more cavities or compartments for storing articles within the bag 163. The bag 163 further preferably comprises carry handles 171. In the foregoing respects the bag 163 of the present embodiment may be understood as a generally conventional "tote" style bag. However, the bag 163 further comprises non-conventional features.

Firstly, connection elements 172*a* (of which only one is shown in FIG. 21A; a second is provided at a corresponding position on the other side of the bag 163) are provided on either lateral side of the bag 163, for forming a releasable connection with corresponding connection elements 172*b* (again, only one shown) provided on either lateral side at the rear of the foldable chassis 9. In the present embodiment, the connection elements 172*a,b* comprise co-operating magnetic pieces. For example, the co-operating connection elements 172*a,b* may comprise a pair of magnets which are attracted towards each other, or one of the pair of co-operating connection elements 172*a,b* (for example, each of the connection elements 172*b* on the foldable chassis 9) may be a magnet and the other (each of the connection elements 172*a* provided on the bag 163) may comprise a portion of magnetic material e.g. a piece of ferromagnetic material such as iron or steel which is strongly attracted to the magnet. Although the magnetic connection element 172*a* is provided on the exterior of the bag 163 of the present embodiment, it may be covered e.g. hidden under the fabric of the side panel of the bag 163, so long as the force of magnetic attraction between the connection elements 172*a*, 172*b* remains strong enough to form a reliable, releasable connection between the bag 163 and foldable chassis 9.

A magnetic connection between the bag 163 and foldable chassis 9 is preferred as this is more convenient for a user—the releasable connection between the bag 163 and foldable chassis 9 may be established simply by bringing the connection elements 172*a* of the bag 163 into suitable proximity with the connection elements 172*b* on the chassis 9. However, the connection elements may also take other forms e.g. co-operating popper and socket, patches of hook and loop material (e.g. Velcro®)), or any other suitable releasable attachment means.

Figure 21D:
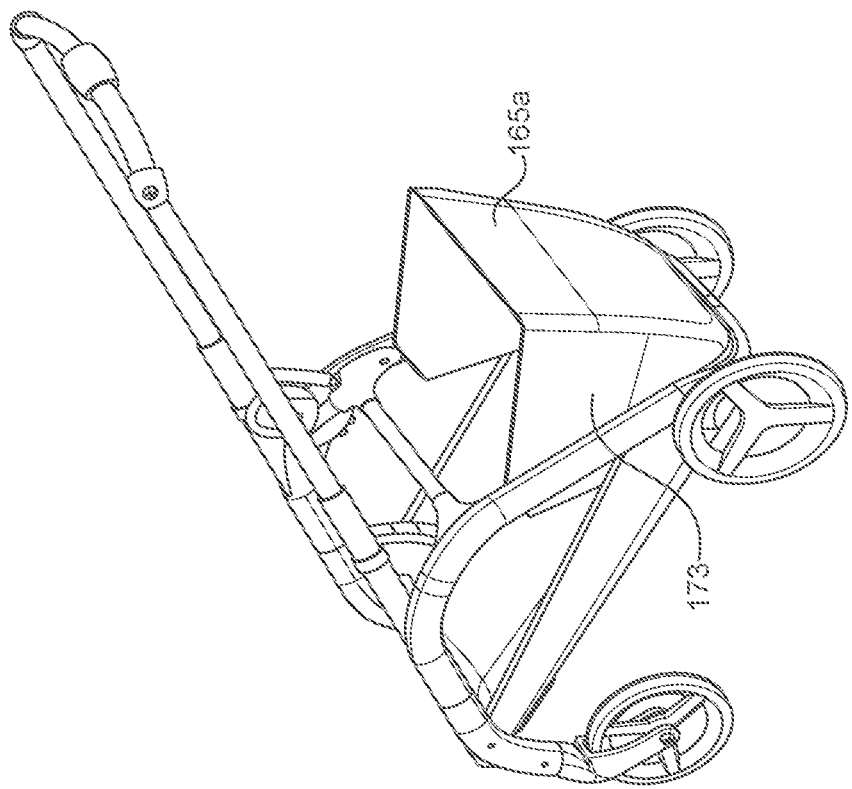

Regardless of the type of connection element used, it will be appreciated that releasably attaching the luggage bag 163 to the rear of the foldable chassis 9 is beneficial, as this means that the bag 163 (and hence its contents) is still accessible to a user when the stroller 1 is folded—as shown in FIGS. 3E and 17G, the rear frame portion 61 is rearmost when the stroller 1 is folded, hence keeping the bag 163 accessible at the rear of the folded stroller 1. It will also be appreciated that mounting the bag 163 to the rear frame portion 61 beneficially also enables ready access to the bag 163 and its contents when the stroller 1 is in its unfolded condition, as shown in FIGS. 21B to 21D.

Secondly, the bag 163 is specifically configured (sized and shaped) to co-operate with the foldable chassis 9 and luggage area 161, and in particular is of a suitable width to bridge the gap between the lateral sides of the rear frame portion 61. This is beneficial, as when the bag 163 is placed on the luggage storage area 161 it acts as an additional rear retaining wall, helping to retain other items or luggage present on the horizontal support surface 161*a*. Additionally, the co-operating bag width ensures that the connection elements 172*a* on the bag 163 are automatically and conveniently positioned in close proximity with the corresponding connection elements 172*b* on the chassis 9 when the bag 163 is placed on the luggage storage area 161.

Thirdly, the side panels 167 of the bag 163 are provided with additional material 173 (see FIGS. 21C, 21D) at the join between the side panels 167 and the front panel 165*a*, which allows the bag (and hence its storage capacity) to be expanded. To keep the bag 163 in its normal, unexpanded configuration of FIG. 21A, the bag 163 is further provided with releasable attachments such as poppers, zips or the like (not shown) which provide a releasable connection between the unexpanded side panels 167 and the front panel 165*a*. When fastened, the releasable attachments keep the front panel 165*a* in fixed position relative to the unexpanded side panel 167, with the extra material of the side panel 167 kept folded within the body of the bag 163; a user simply releases the attachments to allow the bag 163 to be expanded. In addition to increasing storage capacity, expanding the bag 163 creates a larger opening and hence facilitates placement and removal of items into/from the bag 163, when the bag 163 is mounted on the foldable chassis 9.

Figure 21C:
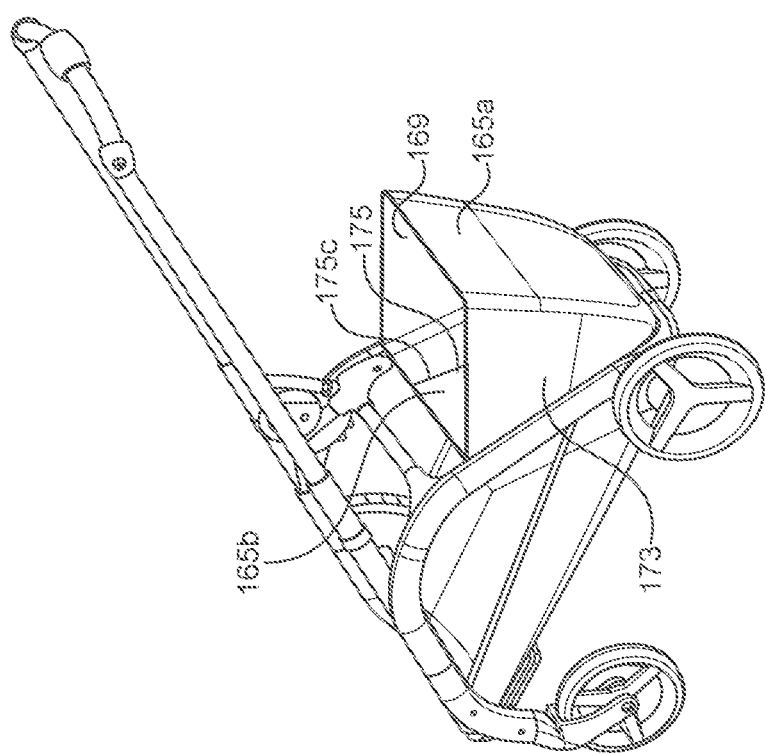

Fourthly, vertical zips 175 (of which one is shown in FIG. 21C) are used to connect the side panels 167 to the rear panel 165*b* of the bag. In normal usage of the bag as in FIG. 21A, these zips are kept fastened, thus keeping the side 167 and rear 165*b* panels in fixed relation. Conveniently, however, the user may undo these zips to lower the rear panel 165*b* of the bag to lie flat on the horizontal support surface 161*a*, such that the luggage storage area 161 effectively extends into and includes the luggage storage area provided by the bag 163. This is particularly beneficial when the side panels 167 of the bag 163 are in their extended condition, as shown in FIG. 21D, as this maximizes the available luggage storage area.

Although the luggage item 163 is described in connection with the folding stroller 1 of the foregoing embodiment, it will be appreciated that the luggage item 163 may be applied also to non-folding strollers having an underslung luggage storage area.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

Thus, the foregoing embodiments of the invention have been described by way of example only. It will be appreciated by a person skilled in the art that various modifications can be made without departing from the scope of the invention as defined by the claims. The following sets out a non-exhaustive selection of modifications, being also embodiments of the present invention.

Exemplary Modifications

In the above-described stroller embodiment, the stroller 1 may be placed into the various configurations of FIG. 1 by providing a wheeled chassis 3 with a removable and repositionable seat 5 and bassinet 7. However, it will be appreciated that according to other embodiments, the stroller need not be provided with this level of adaptability, particularly where a simpler or lower-cost device is preferred. For example, the stroller may be provided with just one of a seat or bassinet, and further, that seat or bassinet may or may not be removable from the wheeled chassis.

In the above-described embodiment, the chassis locking mechanism is contained within the chassis joint housing 111, and the bassinet and seat locking mechanisms are contained within the bassinet and seat joints 15, 145, respectively. However, this need not be the case, and the chassis locking mechanism may be provided in whole or in part by components carried by the bassinet or seat or other part of the stroller, including by the chassis handle, and similarly the bassinet and seat locking mechanisms may be provided in whole or in part by components carried by the foldable chassis or other part of the stroller, including by the chassis handle.

In the above-described embodiment, movement (collapse) of the handle 11 releases the foldable chassis 9 to fold, and the folding movement of the chassis 9 releases the seat 5 or bassinet 7 to fold. In a modification, movement (collapse) of the handle instead releases a bassinet/seat locking mechanism, to permit the bassinet/seat to fold under gravity as the stroller is tilted forward. The folding of the bassinet/seat in turn releases a chassis locking mechanism to then also allow the chassis frame to fold under gravity; it will therefore be understood that in this modification the action of the joint between the bassinet/seat and the chassis frame is effectively reversed such that the folding action of the bassinet/seat is what releases the locking mechanism of the chassis frame.

More generally, the embodiment described above may be modified such that movement of a first of any one of the chassis frame, bassinet/seat or handle from its unfolded/extended condition towards its folded/collapsed condition releases the locking mechanism of a second of those components, to enable the second of those components to move towards its folded/collapsed condition, and movement of the second of those components towards its folded/collapsed condition releases the locking mechanism of the third of those components to enable the third of those components to move to its folded/collapsed condition. For example, in modifications also being embodiments of an aspect of the present invention:

1. User first releases chassis frame locking mechanism and folds chassis frame, which folding movement releases handle locking mechanism to enable handle to collapse/fold, which movement of handle releases bassinet/seat locking mechanism to enable bassinet/seat to fold.
2. User first releases chassis frame locking mechanism and folds chassis frame, which folding movement releases bassinet/seat locking mechanism, bassinet/seat folds to unlock handle locking mechanism to allow handle to collapse/fold.
3. User first releases bassinet/seat locking mechanism and folds bassinet/seat, which folding movement then releases a handle locking mechanism to allow the handle to collapse/fold, which movement in turn releases the chassis frame locking mechanism to allow the chassis frame to fold.
4. User first releases bassinet/seat locking mechanism and folds bassinet/seat, which folding movement then releases a chassis frame locking mechanism, subsequent folding of chassis frame releases the handle locking mechanism to allow the handle to collapse/fold.

In further modifications, also being embodiments of an aspect of the present invention, movement of a first of any one of the chassis frame, bassinet/seat or handle from its unfolded/extended condition towards its folded/collapsed condition releases the locking mechanisms of both the second and third of those components, either simultaneously or sequentially, to enable the second and third of those components to also move to their folded/collapsed conditions. For example, in a modification, a user first collapses the handle, which movement simultaneously or sequentially releases the chassis locking mechanism and bassinet/seat locking mechanism, to permit chassis and bassinet/seat to fold under gravity as stroller is tilted.

References to a "stroller" are to be interpreted as including prams, buggies and pushchairs. Also, although a stroller embodiment intended for a child or infant is described above, it will be appreciated that aspects of the present invention may be applied to a wheelchair for a child or adult. References to a "stroller" are therefore also to be interpreted as including wheelchairs for children or adults.

In a modification of the described embodiment of the luggage aspect of the invention, instead of having a zipped connection between the side walls 167 and rear panel 165b, the side panels may be provided with additional material at their joint with the rear panel to allow the rear panel to move downwardly into the luggage storage area to lie flat on the horizontal support surface. As will be appreciated, this modification also results in the luggage storage area effectively extending into and including the luggage storage area provided by the bag. Additionally, the additional material at the sides, linking to the rear panel, may beneficially assist in retaining items laterally on the luggage storage area.

The invention claimed is:

1. A foldable bassinet comprising a foldable frame which may be moved between an unfolded condition and a folded condition and a support surface on which a passenger may recline or sit when the foldable frame is in its unfolded condition, wherein the foldable frame comprises a base frame on which the support surface is provided, an upper frame which is spaced from the base frame when the foldable frame is in its unfolded condition, and at least one connecting arm which is pivotally connected relative to the base frame and to the upper frame to permit the foldable frame to be moved to its folded condition, wherein the pivotal connection of the at least one connecting arm relative to the base frame and/or the upper frame is a movable connection which is itself movable relative to the foldable frame, wherein the foldable bassinet is elongate to define a longitudinal axis, wherein the movable connection is provided on a joint for mounting the foldable bassinet on to a stroller chassis and wherein the joint is slidably mounted to the foldable frame such that the joint and the movable connection are movable relative to the foldable frame in a direction which is parallel to the longitudinal axis.

2. The foldable bassinet of claim 1, further comprising a locking mechanism which when engaged prevents the at least one connecting arm from pivoting relative to the base frame and upper frame and prevents the movable connection from moving relative to the foldable frame and which when released enables the at least one connecting arm to pivot relative to the base frame and upper frame and permits the movable connection to move relative to the foldable frame.

3. The foldable bassinet of claim 2, wherein the locking mechanism has a button which when pressed releases the locking mechanism.

4. A foldable stroller comprising the stroller chassis and the foldable bassinet of claim 1.

\* \* \* \* \*